(12) United States Patent
Sakamoto

(10) Patent No.: US 8,931,066 B2
(45) Date of Patent: Jan. 6, 2015

(54) INFORMATION PROCESSING APPARATUS AND CONTROL METHOD

(71) Applicant: Fujitsu Limited, Kawasaki-shi, Kanagawa (JP)

(72) Inventor: Takuya Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 17 days.

(21) Appl. No.: 13/952,988

(22) Filed: Jul. 29, 2013

(65) Prior Publication Data

US 2014/0090024 A1    Mar. 27, 2014

(30) Foreign Application Priority Data

Sep. 26, 2012   (JP) .................................. 2012-212874
Mar. 5, 2013    (JP) .................................. 2013-042723

(51) Int. Cl.
| G06F 7/04 | (2006.01) |
| G06F 15/16 | (2006.01) |
| G06F 17/30 | (2006.01) |
| H04L 29/06 | (2006.01) |
| G06F 21/45 | (2013.01) |
| G06F 21/60 | (2013.01) |

(52) U.S. Cl.
CPC .............. *G06F 21/45* (2013.01); *G06F 21/604* (2013.01); *G06F 2221/2111* (2013.01); *G06F 2221/2137* (2013.01)
USPC ............................................................ 726/4

(58) Field of Classification Search
CPC ................... G06F 21/45; G06F 21/604; G06F 2221/2111; G06F 2221/2137
USPC ............................................................ 726/4
See application file for complete search history.

(56) References Cited

FOREIGN PATENT DOCUMENTS

JP   2010-097510   4/2010

*Primary Examiner* — Dant Shaifer Harriman
(74) *Attorney, Agent, or Firm* — Staas & Halsey LLP

(57) ABSTRACT

An information processing apparatus includes a processor configured to determine a location in which a terminal is located, and create a folder to which access authority is given to the terminal, the folder being associated with the location. A control method of an information processing apparatus includes determining a location in which a terminal is located, and creating, using a processor, a folder to which access authority is given to the terminal, the folder being associated with the location.

19 Claims, 54 Drawing Sheets

| FOLDER ID | USER ID |
|---|---|
| /p0001/ | u0001,u0002,u0003,u0004,u0010 |
| /p0002/ | u0005,u0008,u0009 |
| /p0003/ | u0006,u0011 |

```
<xml>
<folder id="/p0001/"action="create"/>
</xml>
```

```
<xml>
<folder id="/p0001/"action="delete"/>
</xml>
```

FIG. 18

| FOLDER ID | ACCESS AUTHORITY USER ID |
|---|---|
| /p0001 2012-8-1-10:00/ | u0001,u0002,u0003,u0004,u0010 |
| /p0001 2012-8-1-13:00/ | u0005,u0008,u0009 |
| /p0004 2012-8-2-10:00/ | u0006,u0011 |

<xml>
<forder id="/p0001 2012-8-2-13:00/"action="create"/>
</xml>

FIG. 25

| LOCATION ID | SENSING INFORMATION | LOCATION TYPE | IP ADDRESS |
|---|---|---|---|
| p0001 | 1234567890123456 | MEETING ROOM | 10.0.0.1 |
| p0002 | 2345678901234567 | MEETING ROOM | 10.0.0.2 |
| p0003 | 3456789012345678 | OFFICE | |

| FOLDER ID | USER ID |
|---|---|
| /p0001/ | u0001, u0002, u0003, u0004, u0005, u0008, u0009, u0010 |
| /p0002/ | u0001, u0002, u0003, u0004, u0005, u0008, u0009, u0010 |
| /p0003/ | u0006, u0011 |

| LOCATION ID | LOGICAL LOCATION |
|---|---|
| p0001 | DEPARTMENTAL MEETING |
| p0002 | SALES PROMOTION MEETING |
| p0003 | PATENT REVIEW MEETING |

| USER ID | NAME | ICON URL |
|---------|------|----------|
| p0001 | xxx | http://192.168.0.1/p0001.icon |
| p0002 | yyy | http://192.168.0.1/p0002.icon |
| p0003 | zzz | http://192.168.0.1/p0003.icon |

FIG. 43
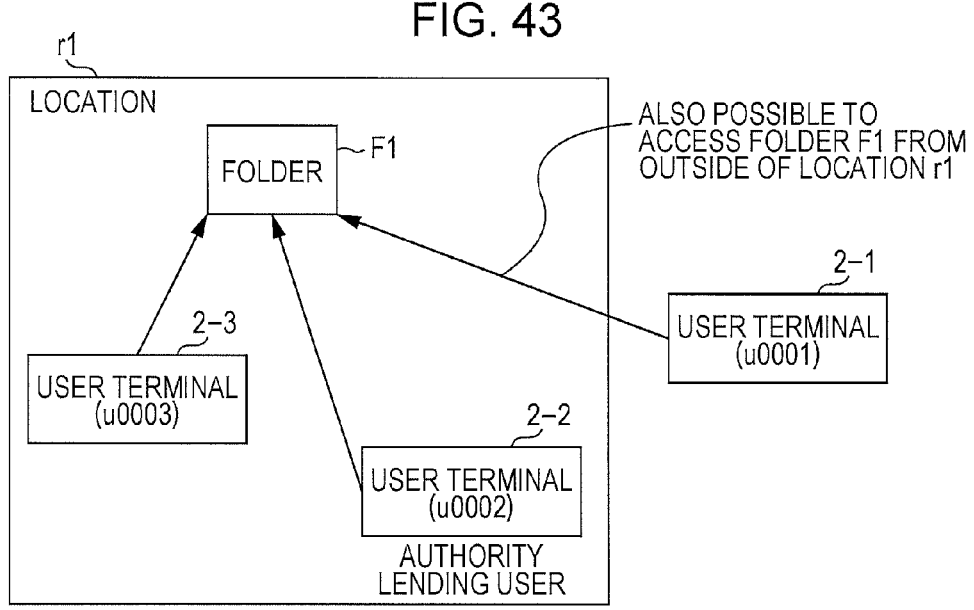
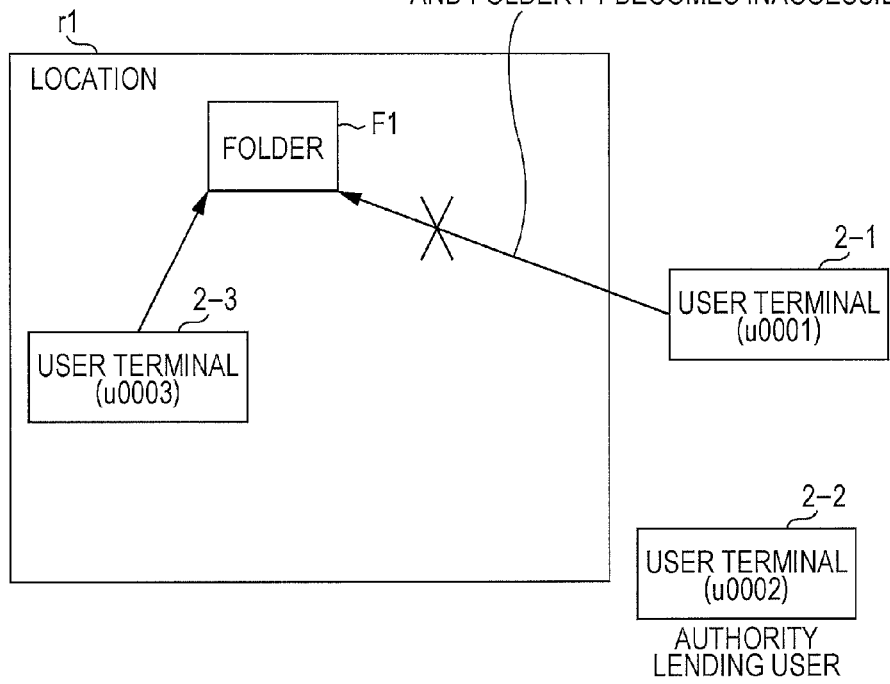

| AUTHORITY BORROWING USER ID | AUTHORITY LENDING USER ID |
|---|---|
| u0001 | u0002 |

INFORMATION PROCESSING APPARATUS AND CONTROL METHOD

CROSS-REFERENCE TO RELATED APPLICATION

This application is based upon and claims the benefit of priority of the prior Japanese Patent Application No. 2012-212874, filed on Sep. 26, 2012, and the prior Japanese Patent Application No. 2013-042723, filed on Mar. 5, 2013, the entire contents of which are incorporated herein by reference.

FIELD

The embodiment discussed herein is related to an information processing apparatus and a control method.

BACKGROUND

In recent years, paperless meetings have become more and more common, and meeting materials are generally referred to using a notebook personal computer (PC), a tablet terminal, or the like. For example, a file of a material is copied on a server and attendees share the file by accessing the server.

When a file is shared on a server, for example, information leakage may occur if anybody is allowed to access the file. Therefore, an access restriction is usually set so that the file on the server is accessible through user authentication.

For example, a folder for which access authority is given to attendees of a meeting is created on a server and a file of a meeting material is placed in the folder, and then only the attendees of the meeting are allowed to access the file.

As related art, a technique is proposed by which location information on the position of a user is transmitted to an authentication server and access authority for the user is set in the authentication server in accordance with the received location information.

See, for example, Japanese Laid-open Patent Publication No. 2010-97510.

SUMMARY

According to an aspect of the invention, an information processing apparatus includes a processor configured to determine a location in which a terminal is located, and create a folder to which access authority is given to the terminal, the folder being associated with the location.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 illustrates a configuration example of an access authority list table;

FIG. 20 illustrates an example of a notification format of folder creation information;

FIG. 25 illustrates a configuration example of a sensing location correspondence information table;

FIG. 27 illustrates a configuration example of an access authority information table;

FIG. 38 illustrates a configuration example of a logical location information table;

FIG. 40 illustrates a configuration example of a user list information table;

FIG. 43 is an illustration for explaining the operations according to the fifth variation;

FIG. 44 illustrates a configuration example of an authority lending information table;

DESCRIPTION OF EMBODIMENT

An embodiment according to the present application is described below with reference to the drawings.

While inventing the present embodiment, observations were made regarding a related art. Such observations include the following, for example.

In the related art, file sharing only among people who attend a meeting typically involves troublesome work, such as creating a folder for which access authority is given to the attendees for each of various meetings after preparing an attendee list.

Figure 1:
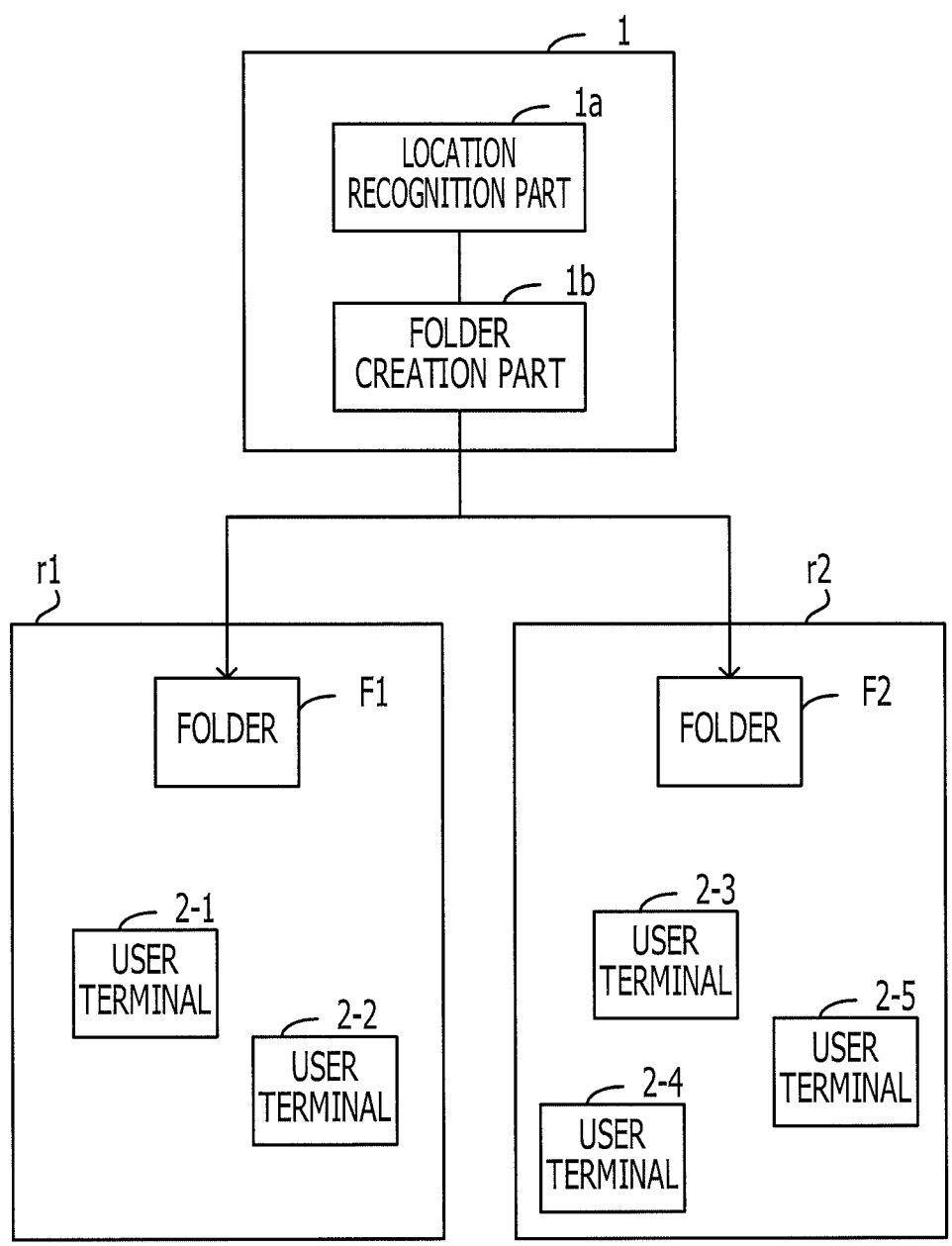
FIG. 1 illustrates a configuration example of an information processing unit.

FIG. 1 illustrates a configuration example of an information processing unit 1 as an information processing apparatus. The information processing unit 1 includes a location recognition part 1a and a folder creation part 1b. The location recognition part 1a recognizes a location in which a user terminal is positioned. The folder creation part 1b creates a folder for which access authority is given to a user terminal while causing the folder to correspond to a location in which the user terminal is currently positioned. A folder may also be referred to as a directory.

It is assumed in the example of FIG. 1 that there are locations r1 and r2, user terminals 2-1 and 2-2 are positioned in the location r1, and user terminals 2-3 to 2-5 are positioned in the location r2.

In this case, the location recognition part 1a recognizes the location r1 in which the user terminals 2-1 and 2-2 are positioned. The folder creation part 1b creates a folder F1 for which access authority is given to the user terminals 2-1 and 2-2 with respect to the location r1 in which the user terminals 2-1 and 2-2 are currently positioned. It is assumed, for example, that the user terminal 2-1 moves to the location r1 first and then, the user terminal 2-2 moves to the location r1. In this case, the folder creation part 1b creates the folder F1 for which access authority is given to the user terminal 2-1 when the user terminal 2-1 moves to the location r1. Further, the folder creation part 1b gives access authority for the folder F1 to the user terminal 2-2 when the user terminal 2-2 moves to the location r1.

Similarly, the location recognition part 1a recognizes the location r2 in which the user terminals 2-3 to 2-5 are positioned. The folder creation part 1b creates a folder F2 for which access authority is given to the user terminals 2-3 to 2-5 with respect to the location r2 in which the user terminals 2-3 to 2-5 are currently positioned.

Thus, in the information processing unit 1, a folder for which access authority is given to a user is automatically created while causing the folder to correspond to a location in which the user is currently positioned. The access authority for the created folder is given to a user terminal that is positioned in the location corresponding to the folder. Accordingly, a plurality of user terminals positioned in the same location may share a folder and share a file in the folder. Thus, simple and easy file sharing may be achieved while an appropriate access restriction is set for users.

Although a folder is created based on a position of a user terminal in the description above, the folder may be created based on a position of a user himself or herself. That is, the location recognition part is recognizes the locations r1 and r2 of users who use the user terminals 2-1 to 2-5. The folder creation part 1b creates folders for which access authority is given to the user terminals 2-1 to 2-5 while causing the folders to correspond to the locations r1 and r2 in which the users are currently positioned. Thus, from a human-centric perspective, it is also possible to create a folder based on a location of a user himself or herself.

Figure 2:
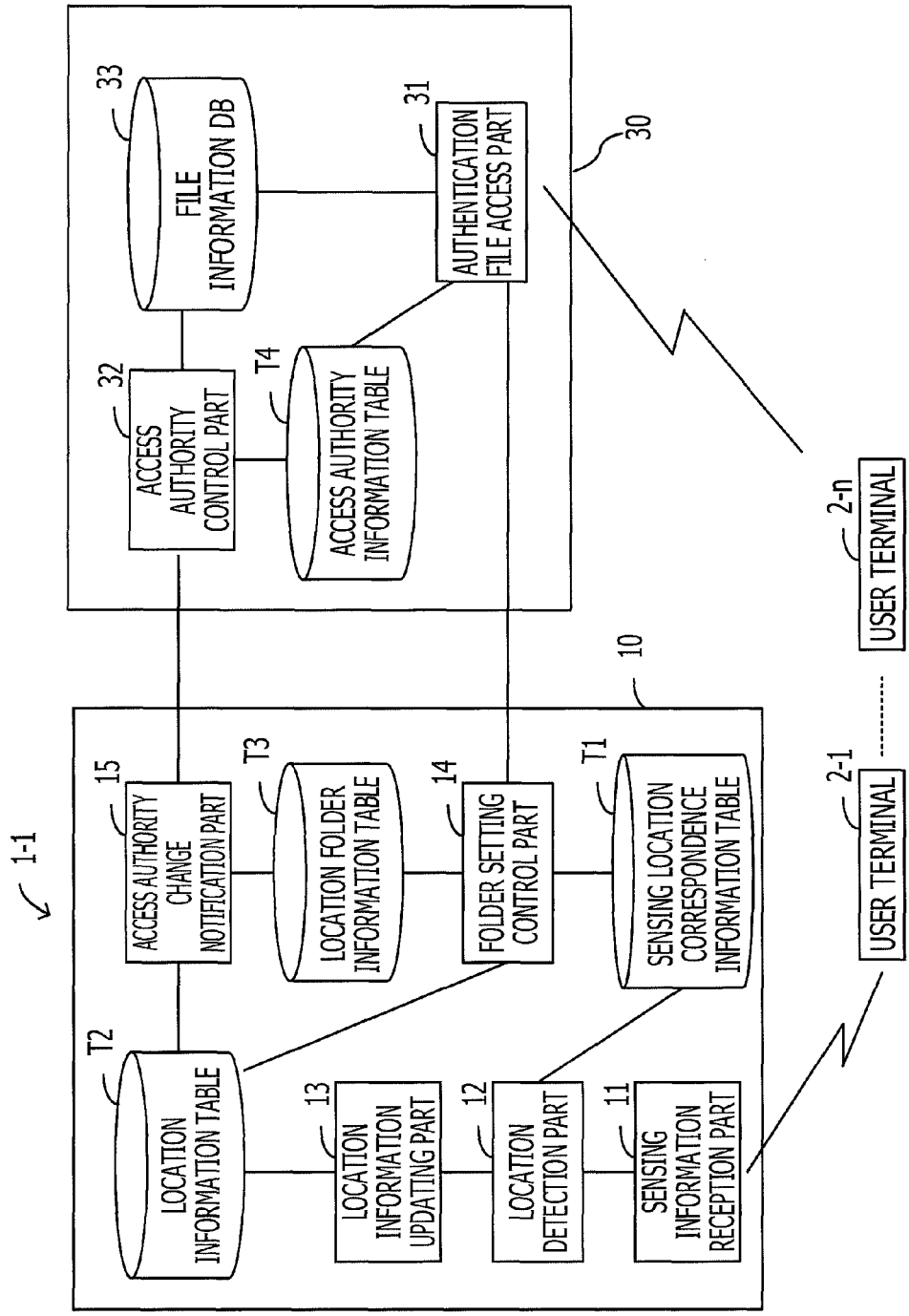
FIG. 2 illustrates a configuration example of a client server system.

Next, a specific configuration that implements a function of a server when the server is used as an example of the information processing unit 1 is described. FIG. 2 illustrates a configuration example of a client server system 1-1. The client server system 1-1 includes an access authority control server 10, the user terminals 2-1 to 2-n, and a file server 30.

Although in this example, the server function is divided into the access authority control server 10 and the file server 30, one server may be caused to have functions of the access authority control server 10 and the file server 30.

The file server 30 includes an authentication file access part 31, an access authority control part 32, a file information database (DB) 33, and an access authority information table T4.

The access authority control server 10 includes a sensing information reception part 11, a location detection part 12, a location information updating part 13, a folder setting control part 14, an access authority change notification part 15, a sensing location correspondence information table T1, a location information table T2, and a location folder information table T3.

The location recognition part 1a in FIG. 1 includes functions of the sensing location correspondence information table T1, the location information table T2, the sensing information reception part 11, the location detection part 12, and the location information updating part 13. The folder creation part 1b in FIG. 1 includes functions of the folder setting control part 14, the access authority change notification part 15, the location folder information table T3, and the file server 30.

In the file server 30, the file information DB 33 stores file information of a meeting material or the like. In this case, folders for which access authority is appropriately given to the user terminals 2-1 to 2-*n* are generated and files are stored in the folders. Access authority information is tabulated as the access authority information table T4 and held. A table configuration example is described below with reference to FIG. 6.

The authentication file access part 31 is accessed from applications on the user terminals 2-1 to 2-*n* and performs user authentication on each. Further, the authentication file access part 31 accesses file information and performs a certain process after confirming access authority information.

Examples of the certain process performed by the authentication file access part 31 include sending a response to the user terminals 2-1 to 2-*n* together with a list of folders or files, receiving files transmitted from the user terminals 2-1 to 2-*n*, and transmitting files to the user terminals 2-1 to 2-*n*.

The access authority control part 32 performs setting control of access authority for each folder in terms of which of the user terminals 2-1 to 2-*n* is allowed to access the folder. In this case, the access authority control part 32 receives access authority change information transmitted from the access authority control server 10 and updates the access authority information registered in the access authority information table T4.

In the access authority control server 10, sensing location correspondence information indicating a correspondence relation between the sensing information, which is information on the positions of the user terminals 2-1 to 2-*n*, and the locations in which the user terminals 2-1 to 2-*n* are positioned is tabulated as the sensing location correspondence information table T1 and held.

Location information on the correspondence relations between the locations and identities (IDs) of the user terminals 2-1 to 2-*n*, that is, user IDs, is tabulated as the location information table T2 and held. Location folder information on the correspondence relations between the locations and the folders is tabulated as the location folder information table T3 and held. Each table configuration example is described below with reference to FIGS. 3 to 5.

The sensing information reception part 11 receives the sensing information and the user IDs notified from the user terminals 2-1 to 2-*n*. The location detection part 12 detects the locations in which the user terminals 2-1 to 2-*n* are currently positioned based on the received sensing information and the information registered in the sensing location correspondence information table T1.

The location information updating part 13 updates the location information based on the locations in which the user terminals 2-1 to 2-*n* are positioned, which are detected by the location detection part 12. The folder setting control part 14 determines whether to create or delete a folder based on the updated location information and notifies the file server 30 of information on the folder creation or the folder deletion. Further, the folder setting control part 14 updates the correspondence relations between the locations and the folders.

The updating of the location information leads the access authority change notification part 15 to determine whether or not it is desired to change the access authority. When it is determined to change the access authority, the access authority change notification part 15 generates access authority change information and notifies the file server 30 of the change in the access authority.

Figure 3:
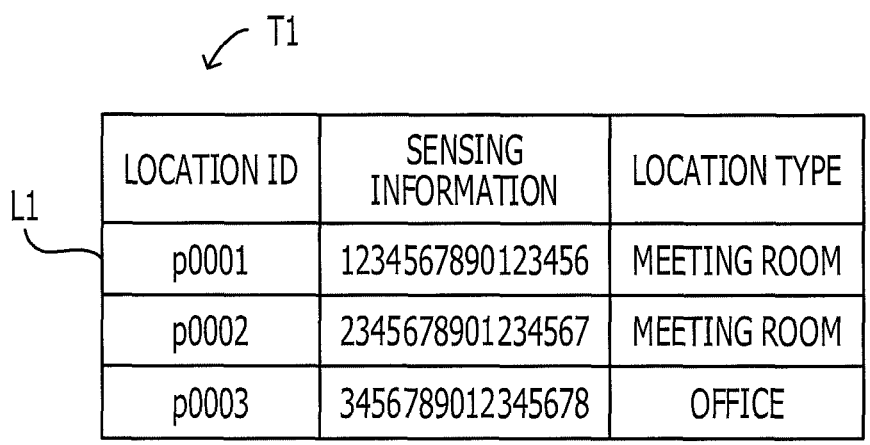
FIG. 3 illustrates a configuration example of a sensing location correspondence information table.

Next, each table configuration is described. FIG. 3 illustrates a configuration example of the sensing location correspondence information table T1. The sensing location correspondence information table T1 includes items of a location ID, sensing information, and a location type.

The location ID is, for example, an ID of a location, which serves to identify a location, such as a meeting room. The sensing information is information on the position of a user terminal, and for example, a basic service set identifier (BSSID), which is identification information on an access point of a wireless local area network (LAN), may be used. The location type indicates a type of a location, that is, indicates that the location is, for example, a meeting room or an office.

In the sensing location correspondence information table T1 in FIG. 3, a row L1 indicates that the location ID is p0001, the BSSID of the access point within the location is 1234567890123456, and the location type is a meeting room.

Figure 4:
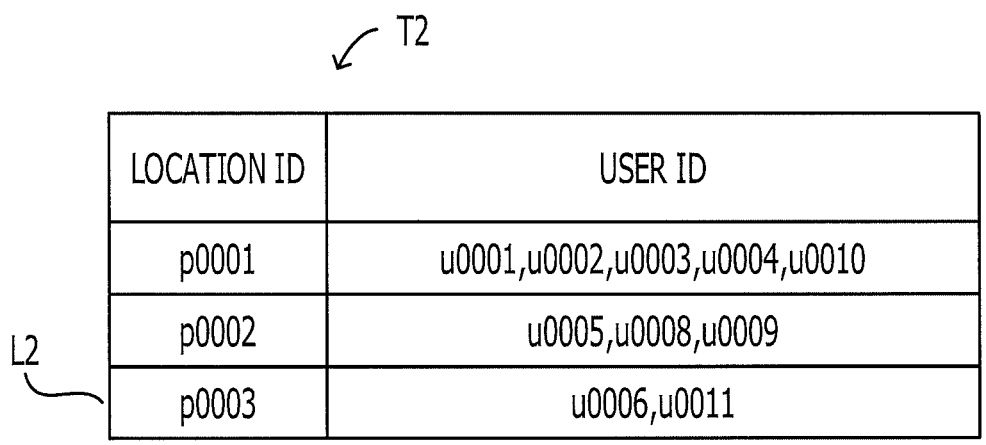
FIG. 4 illustrates a configuration example of a location information table.

FIG. 4 illustrates a configuration example of the location information table T2. The location information table T2 includes items of a location ID and a user ID. In the location information table T2 in FIG. 4, a row L2 indicates that two user terminals that have user IDs u0006 and u0011 are currently positioned in the location that has a location ID p0003.

Figure 5:
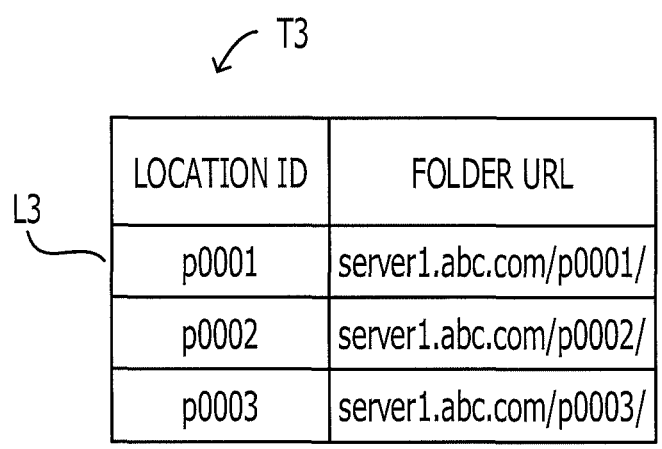
FIG. 5 illustrates a configuration example of a location folder information table.

FIG. 5 illustrates a configuration example of the location folder information table T3. The location folder information table T3 includes items of a location ID and a folder uniform resource locator (URL).

In the location folder information table T3 in FIG. 5, a row L3 indicates that a material for a meeting held in the location that has the location ID p0001 is placed at a folder URL server1.abc.com/p0001/, where server1.abc.com represents a domain name of the file server 30.

Figure 6:
FIG. 6 illustrates a configuration example of an access authority information table.

FIG. 6 illustrates a configuration example of the access authority information table T4. The access authority information table T4 includes items of a folder ID and a user ID, and indicates a list of the user IDs to which access authority for corresponding one of the folder IDs is given. The values used for the folder IDs are the same as the values of the location IDs.

Accordingly, the table contents of the access authority information table T4 are substantially the same as the table contents of the location information table T2 in FIG. 4. However, the location information table T2 is managed on the side of the access authority control server 10, and the access authority information table T4 is managed on the side of the file server 30.

Figure 7A:
FIG. 7A illustrates an example of a notification format of folder creation information.

Next, notification formats of the folder creation and deletion information and the access authority change information are described. FIG. 7A illustrates an example of a notification format of folder creation information d1 and FIG. 7B illustrates an example of a notification format of folder deletion information d2.

The folder creation information d1 in FIG. 7A includes attributes of a folder ID, a folder name, and a folder setting state. In the example of FIG. 7A, it is described that the folder ID=p0001, the folder name=action, and the folder setting state=create. That is, it is indicated that a folder that has the folder ID p0001 and is named action is created.

Figure 7B:
FIG. 7B illustrates an example of a notification format of folder deletion information.

The folder deletion information d2 in FIG. 7B includes attributes of a folder ID, a folder name, and a folder setting state. In the example of FIG. 7B, it is described that the folder ID=p0001, the folder name=action, and the folder setting state=delete. That is, it is indicated that the folder that has the folder ID p0001 and is named action is deleted.

The value used for the folder ID in the folder creation information d1 is the same as, for example, the value of the location ID of the location to which a user terminal has moved. The value used for the folder ID in the folder deletion information d2 is the same as, for example, the value of the location ID of the location from which the user terminal has moved.

Figure 8:
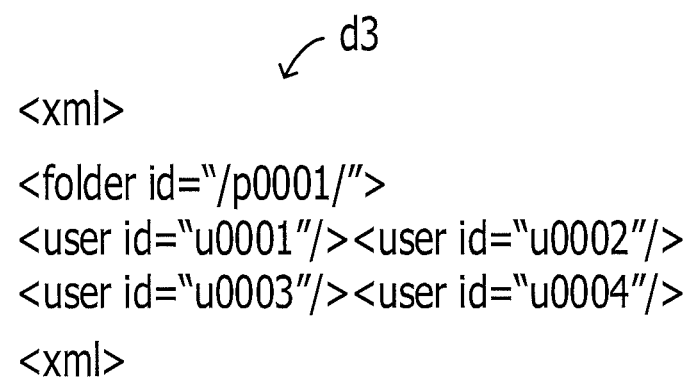
FIG. 8 illustrates an example of a notification format of access authority change information.

FIG. 8 illustrates an example of a notification format of access authority change information d3. The access authority change information d3 includes attributes of a folder ID and a user ID. In the example of FIG. 8, it is indicated that the folder ID=p0001, and the user IDs=u0001, u0002, u0003, and u0004. That is, the access authority for the folder that has the folder ID p0001 is currently given to the user terminals that have user IDs u0001, u0002, u0003, and u0004.

Figure 9:
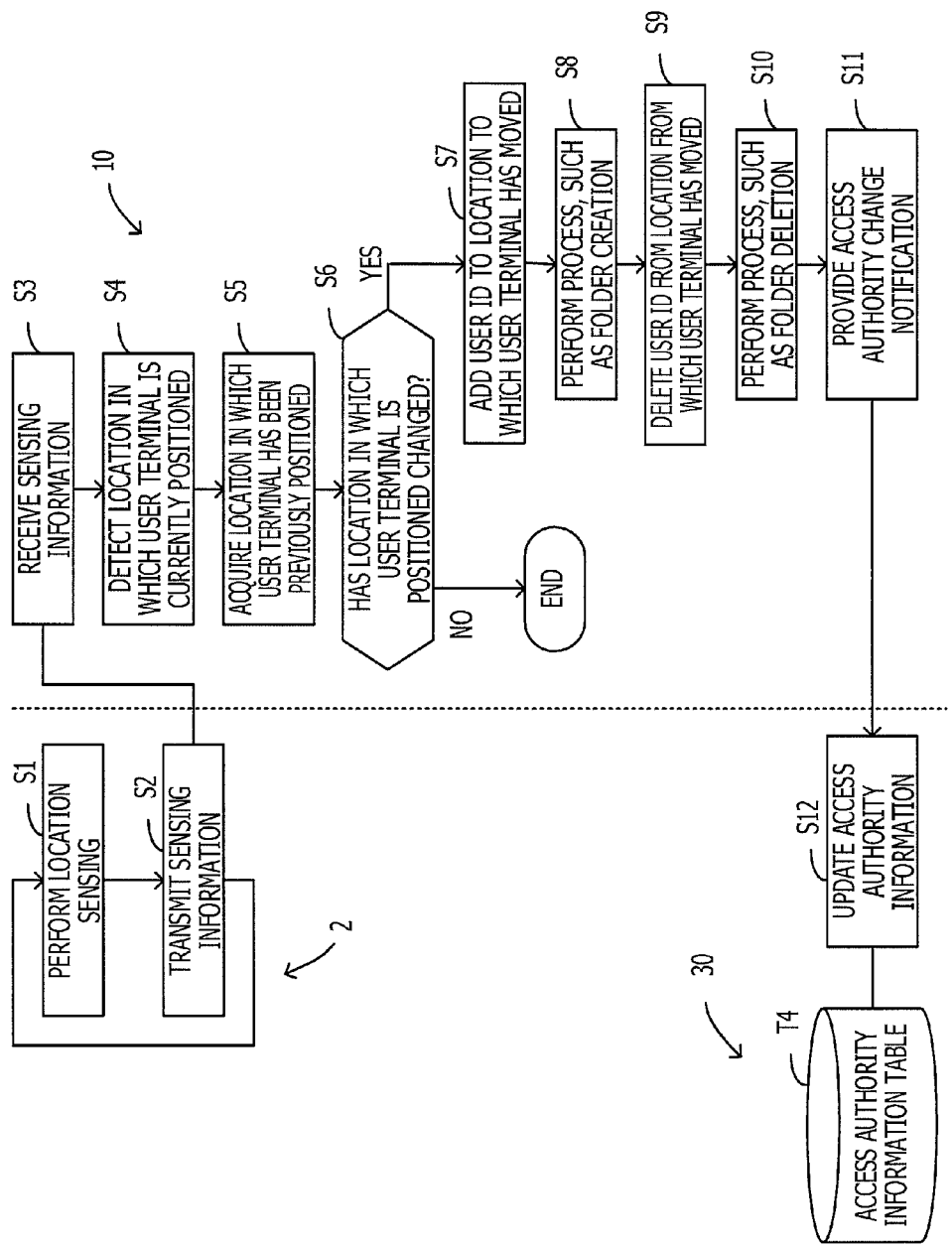
FIG. 9 is a flowchart illustrating an overall operation from location recognition to updating of access authority.

Next, an overall operation from location recognition to updating of the access authority is described. FIG. 9 is a flowchart illustrating the overall operation from the location recognition to the updating of the access authority.

[S1] The user terminal 2 performs location sensing regarding the location in which the user terminal 2 is positioned and acquires sensing information. As an example of a method of the location sensing, the user terminal 2 scans an access point of a wireless LAN within a meeting room and acquires a BSSID, which indicates identification information of the access point, and the value of radio field intensity of the access point as the sensing information.

Alternatively, a radio frequency identifier (RFID) or the like is provided in advance in a location, such as a meeting room. After that, as another method, a user terminal that has an RFID reader function for reading information from the RFID may be used to acquire information on the location identification read from the RFID as the sensing information at the time of entering and leaving the location.

[S2] The user terminal 2 transmits the acquired sensing information to the access authority control server 10 together with the user ID. Even if the user ID is not transmitted to the access authority control server 10 directly, it is sufficient when the access authority control server 10 may identify the user in the end.

Accordingly, as another method, the user terminal 2 may send some signal to the access authority control server 10 to make a correspondence between the signal and a user ID and hold the correspondence on the side of the access authority control server 10, and then may convert the signal into the user ID.

[S3] The sensing information reception part 11 in the access authority control server 10 receives the sensing information and the user ID transmitted from the user terminal 2.

[S4] The location detection part 12 detects the location in which the user terminal 2 is currently positioned based on the sensing information and the information registered in the sensing location correspondence information table T1.

[S5] The location information updating part 13 acquires information on the location in which the user terminal 2 has been previously positioned based on the user ID from the information registered in the location information table T2.

[S6] The location information updating part 13 determines whether or not the location of the user terminal 2 has been changed, based on the location in which the user terminal 2 is currently positioned and the location in which the user terminal 2 has been previously positioned.

When the location information updating part 13 determines that the user terminal 2 is currently positioned still in the same location as the location in which the user terminal 2 has been previously positioned, it is undesired to change the access authority and the process ends. When it is determined that the user terminal 2 is currently positioned in a location different from the location in which the user terminal 2 has been previously positioned, the process proceeds to step S7.

[S7] The location information updating part 13 adds the user ID of the user terminal 2 to a user ID cell in the location information table T2, which corresponds to the location ID of the location to which the user terminal 2 has moved, and updates the location information table T2.

[S8] The folder setting control part 14 determines whether or not a folder URL for the location ID of the location to which the user terminal 2 has moved is registered by referring to the location folder information table T3.

When no folder URL is registered for the location ID of the location to which the user terminal 2 has moved, the folder setting control part 14 creates a new folder URL and updates the location folder information table T3. After that, the folder setting control part 14 notifies the file server 30 of the folder creation information. The detailed process relating to the operation of step S8 is described below with reference to FIG. 12.

[S9] The location information updating part 13 deletes the user ID of the user terminal 2 from a user ID cell in the location information table T2, which corresponds to the location ID of the location from which the user terminal 2 has moved, and updates the location information table T2.

[S10] The folder setting control part 14 determines whether or not another user ID is registered for the location ID of the location from which the user terminal 2 has moved by referring to the location information table T2.

When the deletion of the user ID of the user terminal 2 causes an unregistered state of the user ID for the location ID of the location from which the user terminal 2 has moved, the folder setting control part 14 deletes the folder URL concerned and updates the location folder information table T3.

After that, the folder setting control part 14 notifies the file server 30 of the folder deletion information. The detailed process relating to the operation of step S10 is described below with reference to FIG. 14.

[S11] The updating of the location information table T2 leads the access authority change notification part 15 to create access authority change information and notify the file server 30 of the access authority change information.

[S12] The access authority control part 32 in the file server 30 receives the transmitted access authority change information and updates the information registered in the access authority information table T4.

Figure 10:
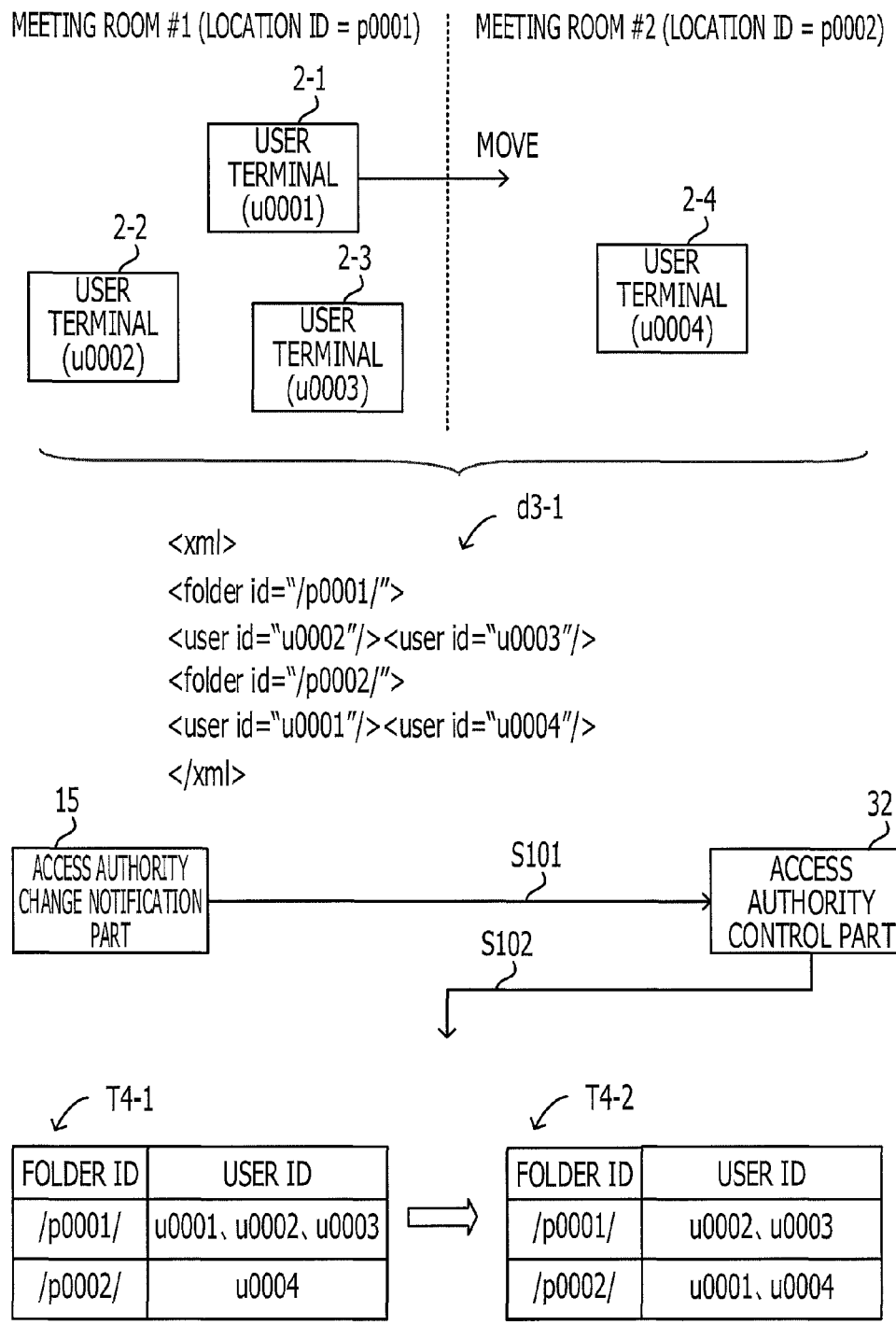
FIG. 10 is an illustration for explaining a specific example of a change in the access authority.

FIG. 10 is an illustration for explaining a specific example of the change in the access authority. It is assumed here that there are a meeting room #1 that has the location ID p0001 and a meeting room #2 that has a location ID p0002.

It is also assumed that the user terminals 2-1 to 2-3 are positioned in the meeting room #1 and the user terminal 2-4 is positioned in the meeting room #2, originally.

Further, it is assumed that from this state, the user terminal 2-1 positioned in the meeting room #1 moves to the meeting room #2. The user IDs of the user terminals 2-1 to 2-4 are u0001, u0002, u0003, and u0004, respectively.

[S101] The access authority change notification part 15 creates access authority change information d3-1 and notifies the access authority control part 32 in the file server 30 of the access authority change information d3-1. In the access authority change information d3-1, it is indicated that the user IDs for the folder ID p0001=u0002 and u0003, and the user IDs for a folder ID p0002=u0001 and u0004.

[S102] The access authority control part 32 receives the transmitted access authority change information d3-1 and updates the registered contents of the access authority information table T4. In FIG. 10, an access authority information table T4-1 indicates a state before the updating, and an access authority information table T4-2 indicates a state after the updating.

In the access authority information table T4-1, the user ID u0001 is registered for the folder ID /p0001/. In the access authority information table T4-2, however, the user ID u0001 for the folder ID /p0001/ is deleted while the user ID u0001 is added for the folder ID /p0002/, and the access authority information table T4-2 is updated.

Thus, when the user terminal 2-1 having the user ID u0001 moves from the meeting room #1 having the location ID p0001 to the meeting room #2 having the location ID p0002, the above-described access authority change information d3-1 is transmitted and the access authority information table T4 is updated.

As a result, the user terminal 2-1 automatically loses the access authority for the folder ID p0001 when the user terminal 2-1 moves from the meeting room #1 having the location ID p0001 to the meeting room #2 having the location ID p0002, and obtains the access authority for the folder ID p0002.

As described above, the file server 30 receives the access authority change information, updates the access authority information table T4, and gives access authority only to the updated user ID. In the file server 30, authentication is performed when a folder concerned is accessed by a user terminal, and when the user terminal is set as a user to which access authority is given, a response is sent together with file information in the folder, or when the user terminal is not set as a user to which access authority is given, a response is sent as an error.

In order for a user to access a created folder more easily, the user may be notified of a folder URL. In this case, the sensing information reception part 11 in the access authority control server 10 includes a folder access notification function, which is hereinafter referred to as a folder access notification part 11*a*.

Figure 11:
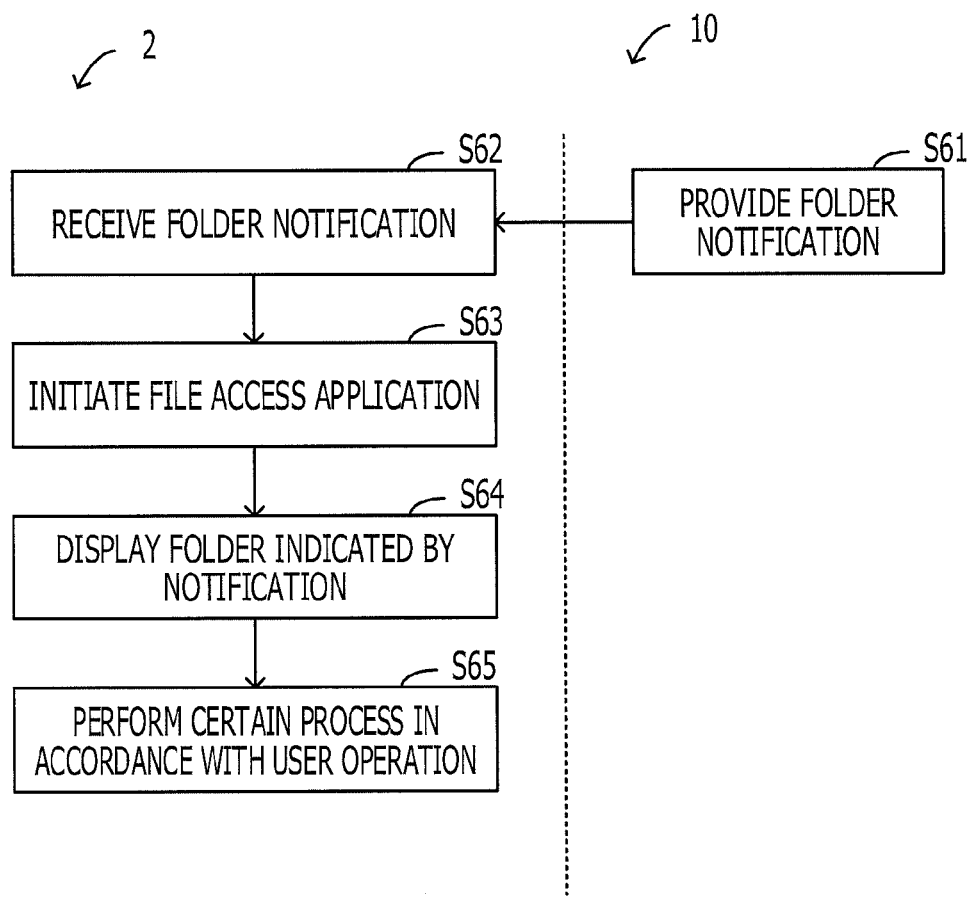
FIG. 11 illustrates an example of a folder notification process for a user terminal.

FIG. 11 illustrates an example of the folder notification process for a user terminal.

[S61] The folder access notification part 11*a* notifies the user terminal 2 of a folder URL. For example, when the user terminal 2 enters the location with the location ID p0001, the folder access notification part 11*a* notifies the user terminal 2 of a folder URL in the location folder information table T3, which indicates server1.abc.com/p0001/.

[S62] The user terminal 2 receives the folder URL.

[S63] The user terminal 2 initiates a file access application.

[S64] The file access application of the user terminal 2 causes the notified folder URL to be displayed on a screen.

[S65] File copying or the like is performed in accordance with a user operation.

The folder notification is performed not only when a folder is created but also when the location of a user terminal changes without creating any folder. Further, as a notification method, an email may be used.

Figure 12:
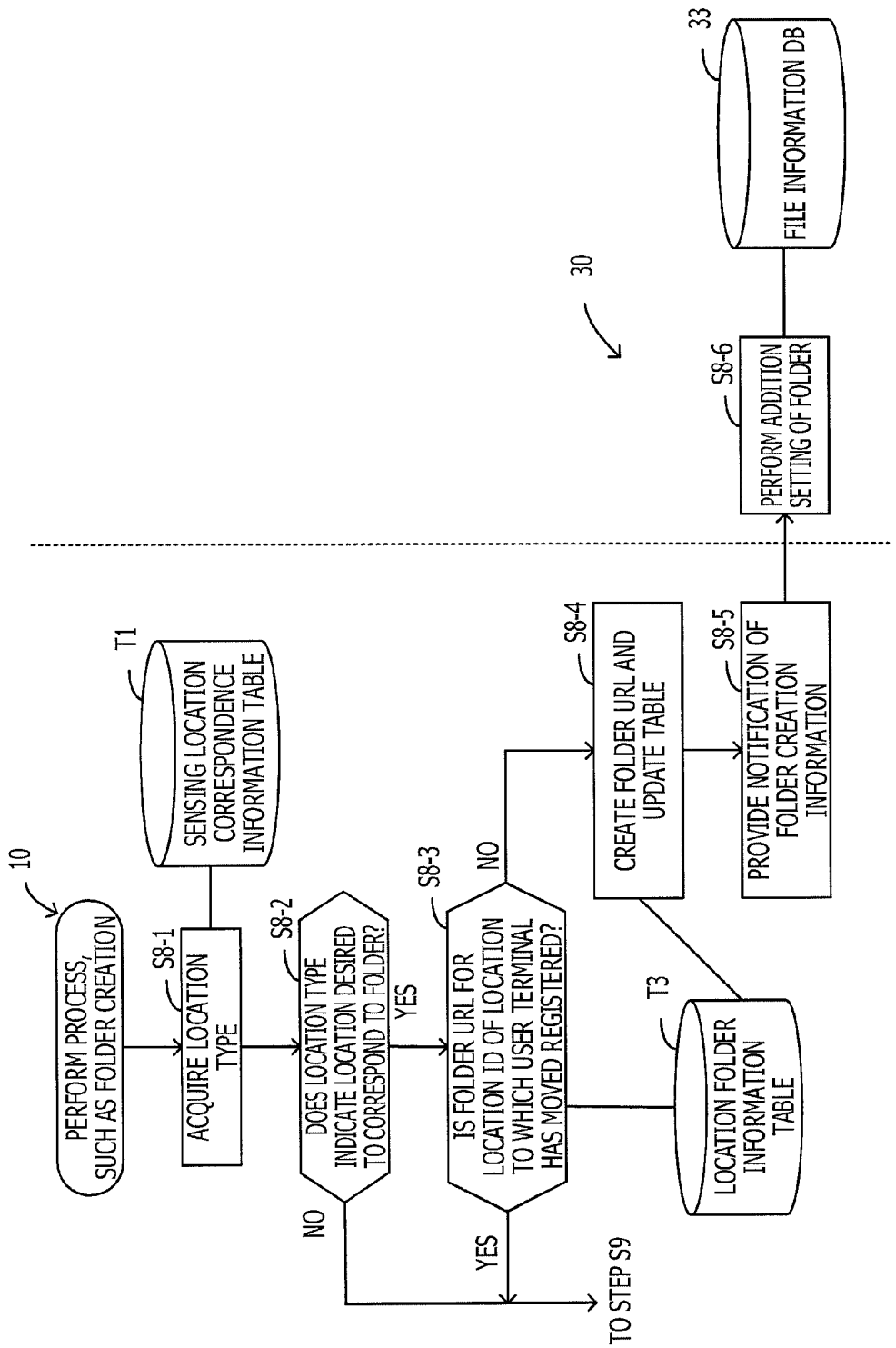
FIG. 12 is a flowchart illustrating operations of a process, such as folder creation.

Next, the detailed process relating to the above-described operation of step S8 is described. FIG. 12 is a flowchart illustrating operations of a process, such as the folder creation.

[S8-1] When the location information table T2 is updated, based on the updated location ID, the folder setting control part 14 acquires the corresponding location type from the sensing location correspondence information table T1.

[S8-2] The folder setting control part 14 determines whether or not the acquired location type indicates a location desired to be caused to correspond to a folder. When the location is not desired to be caused to correspond to the folder, the process proceeds to step S9 in FIG. 9, or when the location is desired to be caused to correspond to the folder, the process proceeds to step S8-3.

Examples of the location desired to be caused to correspond to a folder includes a meeting room. Accordingly, in the example of the sensing location correspondence information table T1 described above with reference to FIG. 3, when the location IDs are p0001 and p0002, the locations are meeting rooms for which a folder is used and thus, the process proceeds to step S8-3. When the location ID is p0003, the location is an office for which a folder is not used and thus, the process proceeds to step S9 in FIG. 9.

The operations of steps S8-1 and S8-2 relating to the location type may be omitted. When the operations of steps S8-1 and S8-2 are omitted, the operation of step S8-3 and the operations after step S8-3 are performed whatever type the location is, and a folder not to be used is created.

[S8-3] The folder setting control part 14 determines whether or not the folder URL for the location ID of the location to which the added user terminal 2 has moved is registered by referring to the location folder information table T3.

When the folder URL already exists for the location ID of the location for which the user ID is added, that is, the location to which the user terminal 2 has moved, the process proceeds to step S9 in FIG. 9. When the folder URL does not exist for the location ID of the location for which the user ID is added, the process proceeds to step S8-4.

[S8-4] The folder setting control part 14 creates a new folder URL. After that, the folder setting control part 14 registers the freshly-created folder URL in a folder URL cell in the location folder information table T3, which corresponds to the location ID of the location for which the user ID is added, and updates the location folder information table T3.

[S8-5] The folder setting control part 14 generates folder creation information, which indicates that the new folder URL is created, and notifies the file server 30 of the folder creation information. In the folder creation information, the location ID of the location for which the user ID is added is set as the folder ID of the freshly-added folder.

[S8-6] The authentication file access part 31 in the file server 30 receives the folder creation information and then recognizes the folder URL based on the folder ID included in the folder creation information. After that, the authentication file access part 31 sets the folder that has this folder URL in the file information DB 33.

Figure 13:
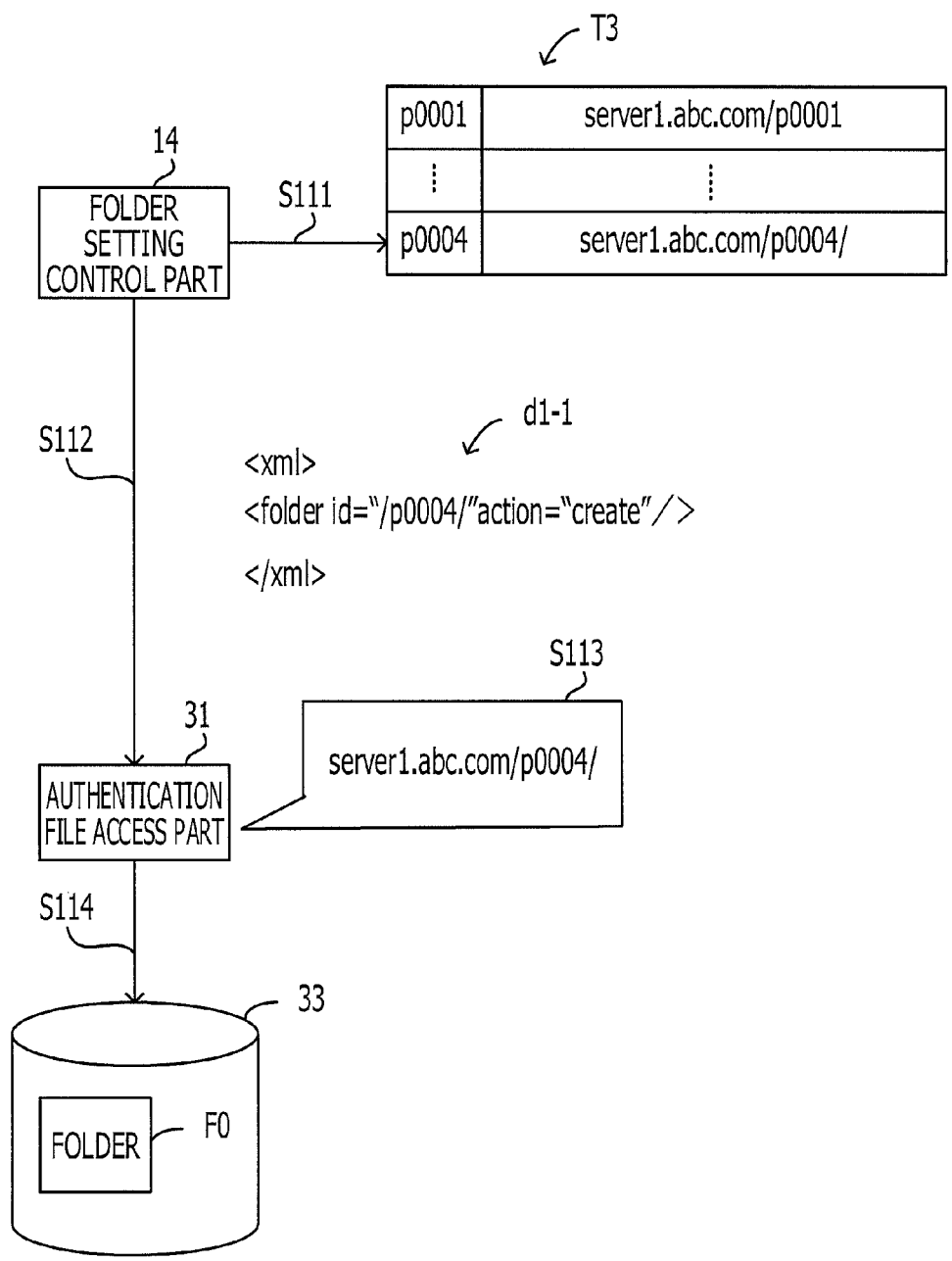
FIG. 13 is an illustration for explaining a specific example of the folder creation process.

FIG. 13 is an illustration for explaining a specific example of the folder creation process. For example, it is assumed that the folder setting control part 14 creates server1.abc.com/p0004/as a new folder URL.

[S111] The folder setting control part 14 adds a location ID p0004 and the folder URL server1.abc.com/p0004/to the location folder information table T3 and updates the location folder information table T3.

[S112] The folder setting control part 14 creates folder creation information d1-1 and notifies the file server 30 of the folder creation information d1-1. In the folder creation information d1-1, it is described that the folder ID=p0004, the folder name=action, and the folder setting state=create.

[S113] The authentication file access part 31 receives the folder creation information d1-1 and then recognizes the folder URL server1.abc.com/p0004/based on the folder ID included in the folder creation information d1-1.

In the folder URL, server1.abc.com indicates a domain name of the file server 30. Accordingly, when the authentication file access part 31 learns the folder ID p0004 described in the folder creation information d1-1, the authentication file access part 31 may recognize the folder URL server1.abc.com/p0004/, which is freshly added.

[S114] The authentication file access part 31 sets a folder F0 that has the recognized folder URL, server1.abc.com/p0004/in the file information DB 33.

Figure 14:
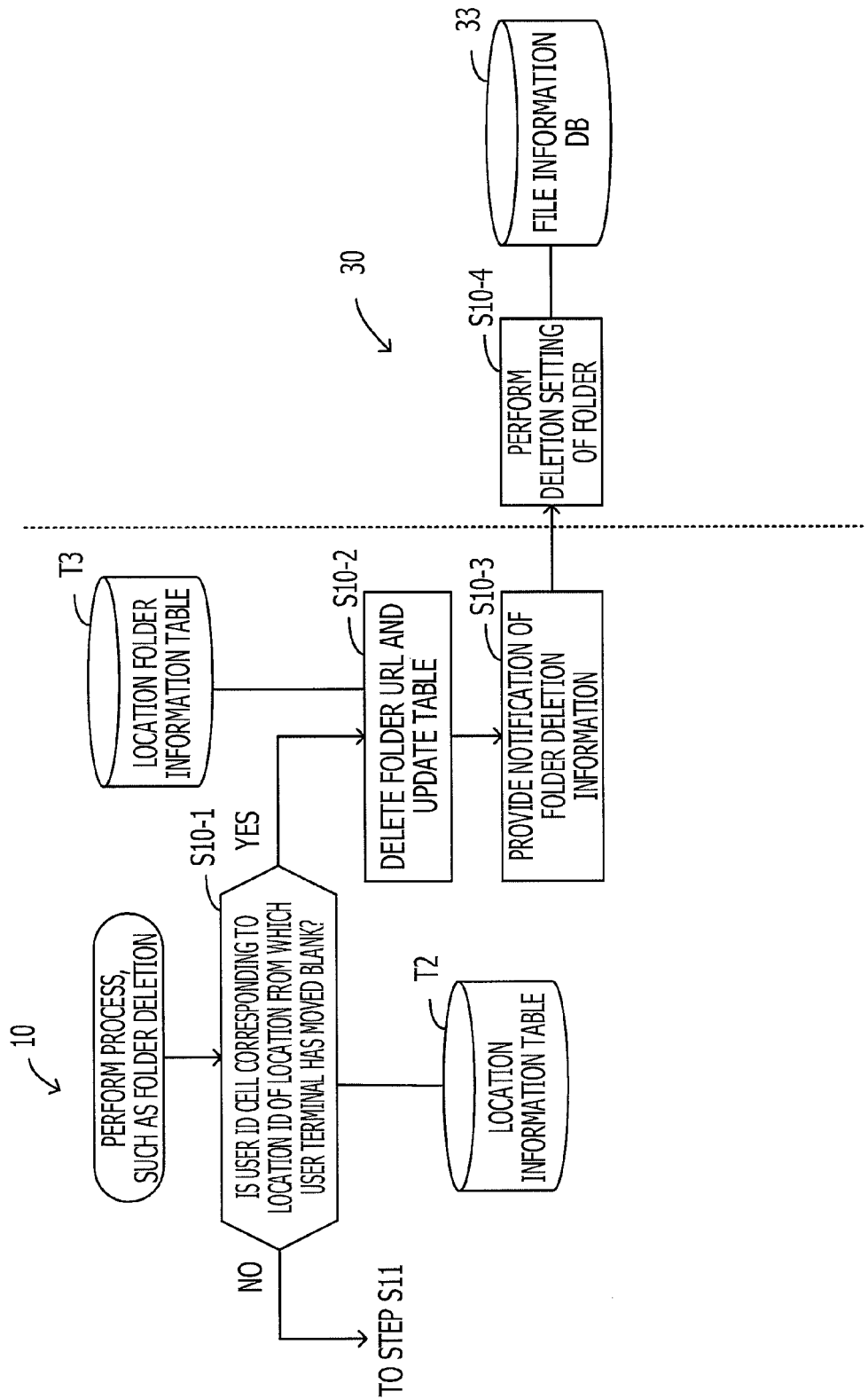
FIG. 14 is a flowchart illustrating operations of a process, such as folder deletion.

Next, the detailed process relating to the above-described operation of step S10 is described. FIG. 14 is a flowchart illustrating operations of a process, such as folder deletion.

[S10-1] The folder setting control part 14 determines whether or not another user ID is registered for the location ID of the location from which the user terminal 2 has moved by referring to the location information table T2.

When in the location information table T2, the user ID cell corresponding to the location ID of the location from which the user ID is deleted is not blank, that is, another user ID is still registered, the process proceeds to step S11 in FIG. 9.

When in the location information table T2, the user ID cell corresponding to the location ID of the location from which the user ID is deleted is blank, that is, no other user ID is registered, the process proceeds to step S10-2.

[S10-2] The folder setting control part 14 deletes the folder URL corresponding to the location ID of the location of the deleted user terminal 2, that is, the location from which the user terminal 2 has moved, from the location folder information table T3, and updates the location folder information table T3.

[S10-3] The folder setting control part 14 generates folder deletion information indicating that the folder URL is deleted and notifies the file server 30 of the folder deletion information. In the folder deletion information, the location ID of the location from which the user ID is deleted is set as the folder ID of the deleted folder.

[S10-4] The authentication file access part 31 in the file server 30 receives the folder deletion information and then recognizes the folder URL based on the folder ID included in the folder deletion information. After that, the authentication file access part 31 deletes the folder that has this folder URL from the file information DB 33.

Figure 15:
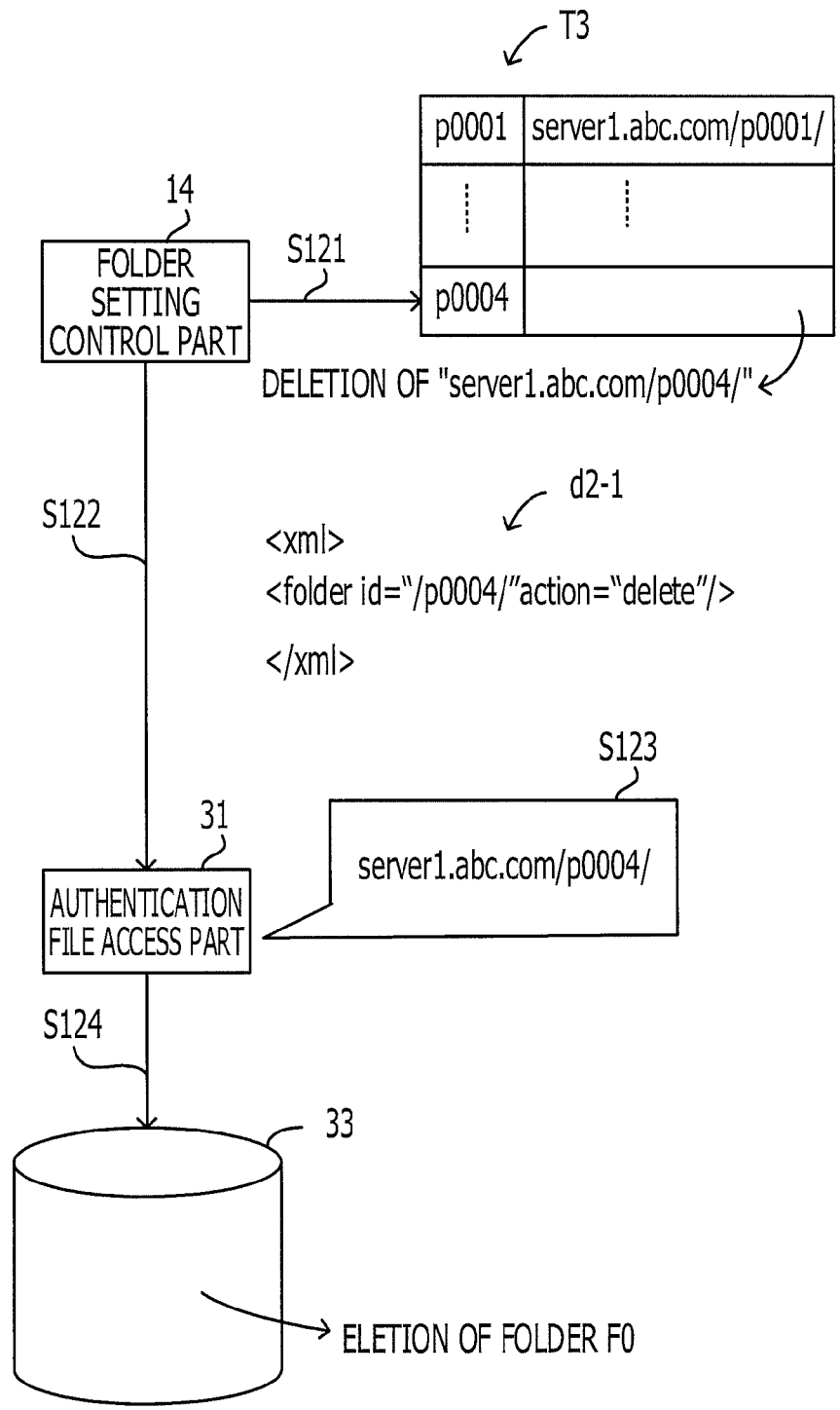
FIG. 15 is an illustration for explaining a specific example of the folder deletion process.

FIG. 15 is an illustration for explaining a specific example of the folder deletion process. It is assumed that the folder setting control part 14 deletes the folder URL server1.abc.com/p0001/as the folder URL for the location ID p0004.

[S121] The folder setting control part 14 deletes the folder URL server1.abc.com/p0004/for the location ID p0004 from the location folder information table T3, and updates the location folder information table T3.

[S122] The folder setting control part 14 notifies the authentication file access part 31 of folder deletion information d2-1. In the folder deletion information d2-1, it is described that the folder ID=p0004, the folder name=action, and the folder setting state=delete.

[S123] The authentication file access part 31 receives the folder deletion information d2-1 and then recognizes the folder URL indicating server1.abc.com/p0004/based on the folder ID included in the folder deletion information d2-1.

In the folder URL, server1.abc.com represents a domain name of the file server 30. Accordingly, when the authentication file access part 31 learns the folder ID p0004 described in the folder deletion information d2-1, the authentication file access part 31 may recognize the deleted folder URL, server1.abc.com/p0004/.

[S124] The authentication file access part 31 deletes the folder F0 that has the folder URL server1.abc.com/p0004/ from the file information DB 33.

Next, a variation of the embodiment is described. In the above-described embodiment, when attendees leave a meeting room, the folder in which a meeting material is placed is automatically deleted. In the variation of the embodiment, however, a plurality of folders are placed in one location, which may be a meeting room, without deleting any folder, and different folder IDs are set and used.

Figure 16:
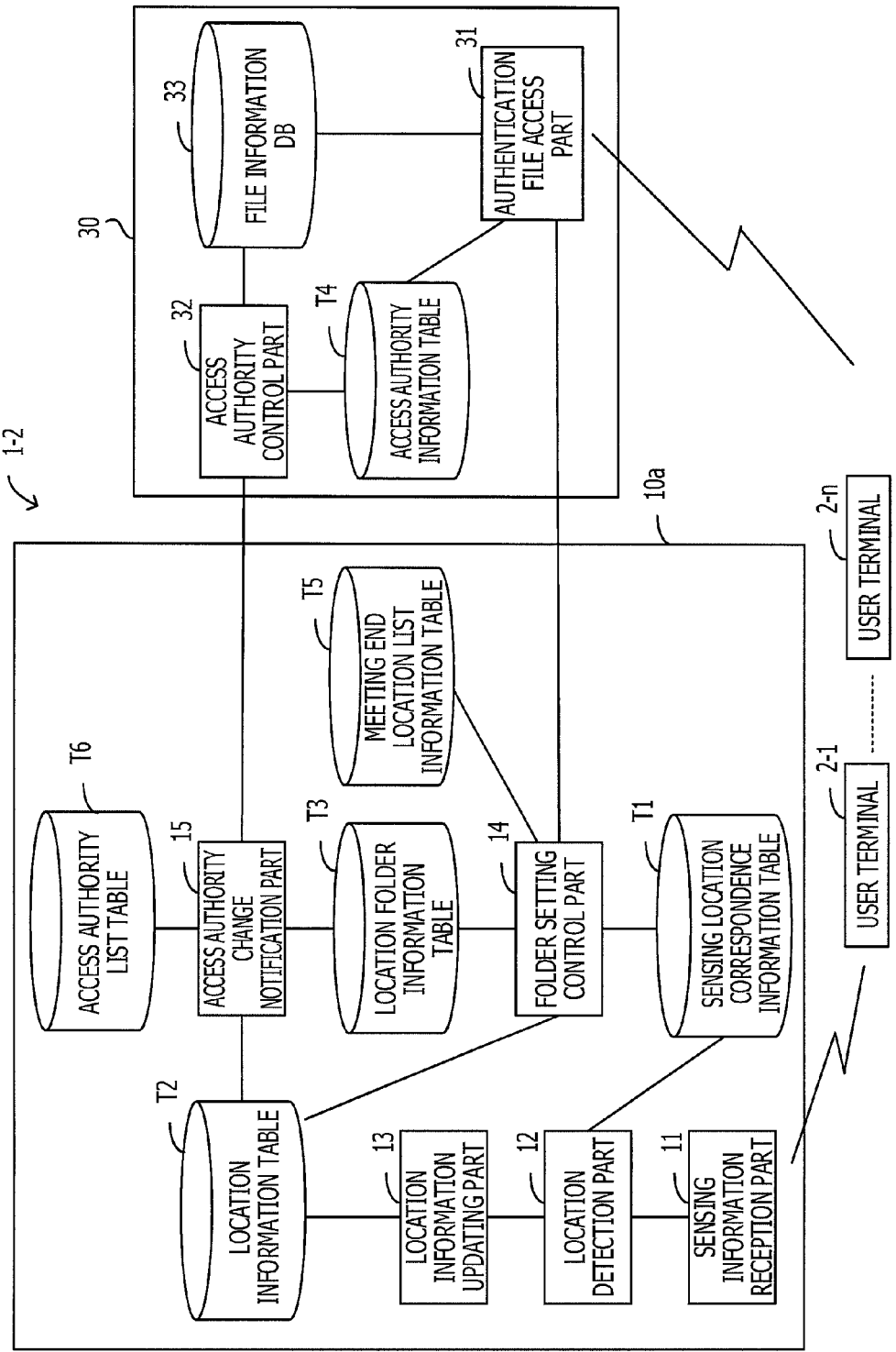
FIG. 16 illustrates a configuration example of a client server system.

A configuration according to the variation of the embodiment is described. FIG. 16 illustrates a configuration example of a client server system 1-2. The client server system 1-2 includes an access authority control server 10*a*, user terminals 2-1 to 2-*n*, and a file server 30.

The configuration illustrated in FIG. 16 is different from the configuration illustrated in FIG. 2 in that the access authority control server 10*a* includes two new tables, which are a meeting end location list information table T5 and an access authority list table T6. The rest of the configuration is the same.

Figure 17:
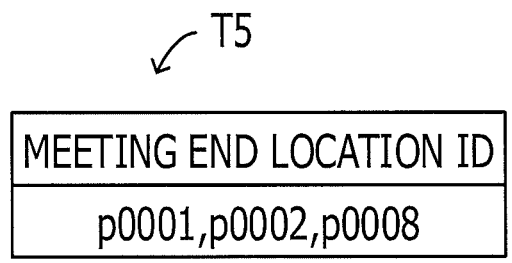
FIG. 17 illustrates a configuration example of a meeting end location list information table.

FIG. 17 illustrates a configuration example of the meeting end location list information table T5. The meeting end location list information table T5 includes an item of a meeting end location ID. In the meeting end location ID, a location ID of a location in which a meeting ends and another meeting is not started is registered. In the example of FIG. 17, meetings have ended in the locations having the location IDs p0001, p0002, and p0008.

FIG. 18 illustrates a configuration example of the access authority list table T6. The access authority list table T6 includes items of a folder ID and an access authority user ID.

In the access authority list table T6, the folder ID includes the location ID and a variable parameter. A cell L5 indicates that the location ID=p0001 and the variable parameter=2012-8-1-13:00. The variable parameter, 2012-8-1-13:00 indicates that a meeting is started at 1 pm on Aug. 1, 2012.

Thus, a plurality of folder IDs identifiable for one location ID may be set by including a date or a time when a meeting is started in the folder ID as a variable parameter and changing the value of the variable parameter.

When no overlapped folder ID is caused, IDs may be assigned in any manner. For example, a folder ID for a new meeting may be generated by setting a variable parameter as a count value and incrementing the previous count value.

Figure 19:
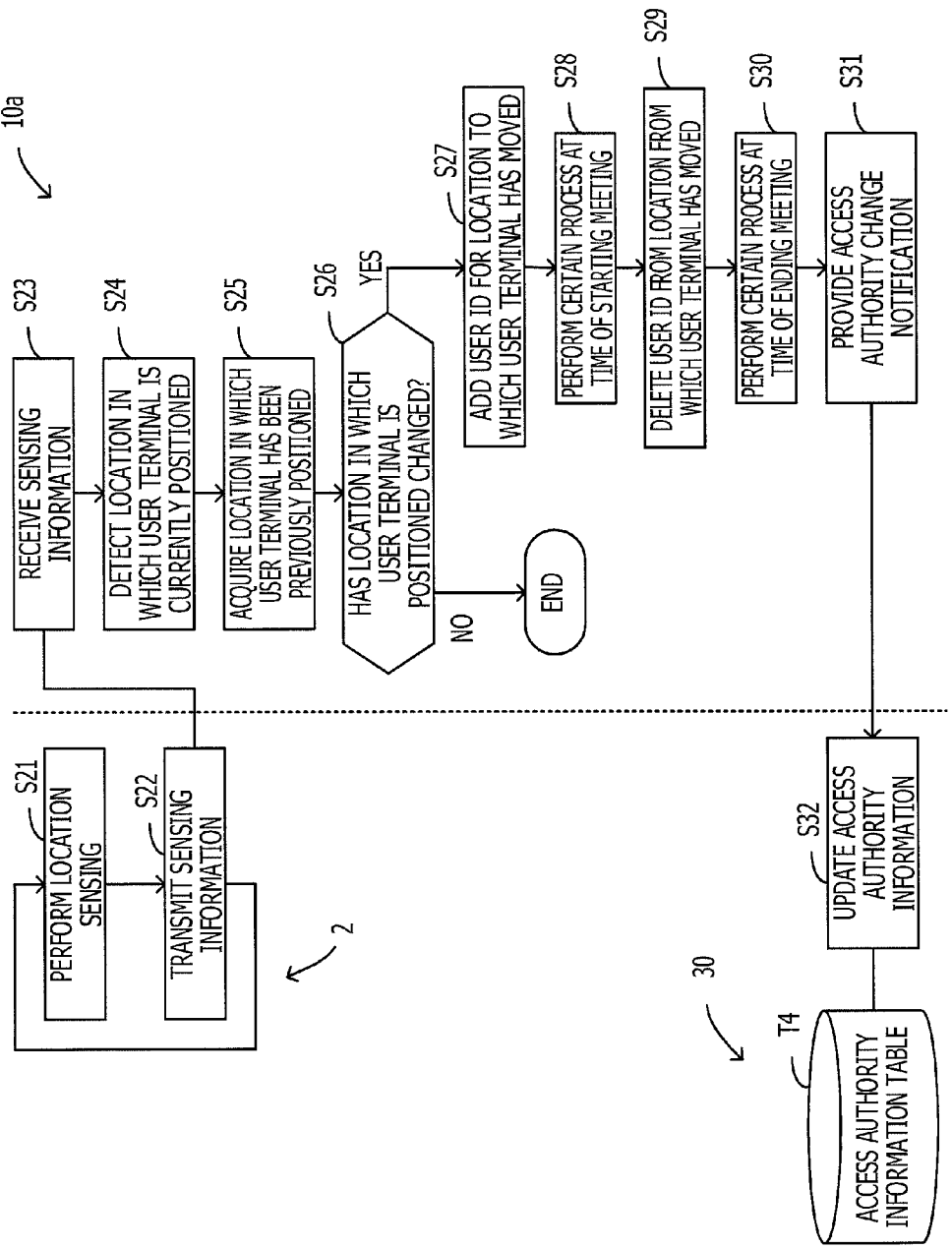
FIG. 19 is a flowchart illustrating an overall operation from location recognition to updating of access authority.

Next, an overall operation from location recognition to updating of the access authority according to the variation of the embodiment is described. FIG. 19 is a flowchart illustrating the overall operation from the location recognition to the updating of the access authority.

[S21] The user terminal 2 performs location sensing regarding the location in which the user terminal 2 is positioned and acquires sensing information.

[S22] The user terminal 2 transmits the acquired sensing information to the access authority control server 10*a*, together with the user ID.

[S23] The sensing information reception part 11 in the access authority control server 10*a* receives the sensing information and the user ID transmitted from the user terminal 2.

[S24] The location detection part 12 detects the location in which the user terminal 2 is currently positioned based on the sensing information and the information registered in the sensing location correspondence information table T1.

[S25] The location information updating part 13 acquires information on the location in which the user terminal 2 has been previously positioned based on the user ID from the information registered in the location information table T2.

[S26] The location information updating part 13 determines whether or not the location of the user terminal 2 has been changed, based on the location in which the user terminal 2 is currently positioned and the location in which the user terminal 2 has been previously positioned.

When the location information updating part 13 determines that the user terminal 2 is currently positioned still in the same location as the location in which the user terminal 2 has been previously positioned, it is undesired to change the access authority and the process ends. When it is determined that the user terminal 2 is currently positioned in a location different from the location in which the user terminal 2 has been previously positioned, the process proceeds to step S27.

[S27] The location information updating part 13 adds the user ID of the user terminal 2 to the user ID cell in the location information table T2, which corresponds to the location ID of the location to which the user terminal 2 has moved, and updates the location information table T2.

[S28] The folder setting control part 14 determines whether or not the location ID of the location for which the user ID is added is registered by referring to the meeting end location list information table T5.

It is assumed that the location ID of the location for which the user ID is added is registered in the meeting end location list information table T5 and a folder URL for the location ID concerned is unregistered in the location folder information table T3.

In this case, the folder setting control part 14 creates a new folder URL for the location ID concerned and updates the location folder information table T3 by assuming that a meeting will be started in a location corresponding to the location ID concerned. After that, the folder setting control part 14 notifies the file server 30 of the folder creation information.

Further, the folder setting control part 14 deletes the location ID concerned from the meeting end location list information table T5. The detailed process relating to the operation of step S28 is described below with reference to FIG. 21.

[S29] The location information updating part 13 deletes the user ID of the user terminal 2 from the user ID cell in the location information table T2, which corresponds to the location ID of the location from which the user terminal 2 has moved, and updates the location information table T2.

[S30] The folder setting control part 14 determines whether or not the location ID of the location from which the user ID is deleted is registered by referring to the meeting end location list information table T5. It is assumed that the location ID of the location from which the user ID is deleted is unregistered in the meeting end location list information table T5.

In this case, the folder setting control part 14 registers the location ID of the location from which the user ID is deleted in the meeting end location list information table T5 by assuming that a meeting has previously ended in the location corresponding to the location ID concerned. The detailed process relating to the operation of step S30 is described below with reference to FIG. 23.

[S31] The updating of the location information table T2 leads the access authority change notification part 15 to create access authority change information and notify the file server 30 of the access authority change information. In this case, access authority is given to the user terminal of the freshly-added user ID by comparing the updated location information table T2 and the access authority list table T6. The detailed process relating to the operation of step S31 is described below with reference to FIG. 24.

[S32] The access authority control part 32 in the file server 30 receives the transmitted access authority change information and updates the information registered in the access authority information table T4.

Next, a notification format of the folder creation information is described. FIG. 20 illustrates an example of a notification format of folder creation information d4. The folder creation information d4 includes attributes of a folder ID, a folder name, and a folder setting state. In the example of FIG. 20, it is described that the folder ID=/p0001 2012-8-2-13:00/, the folder name=action, and the folder setting state=create.

Figure 21:
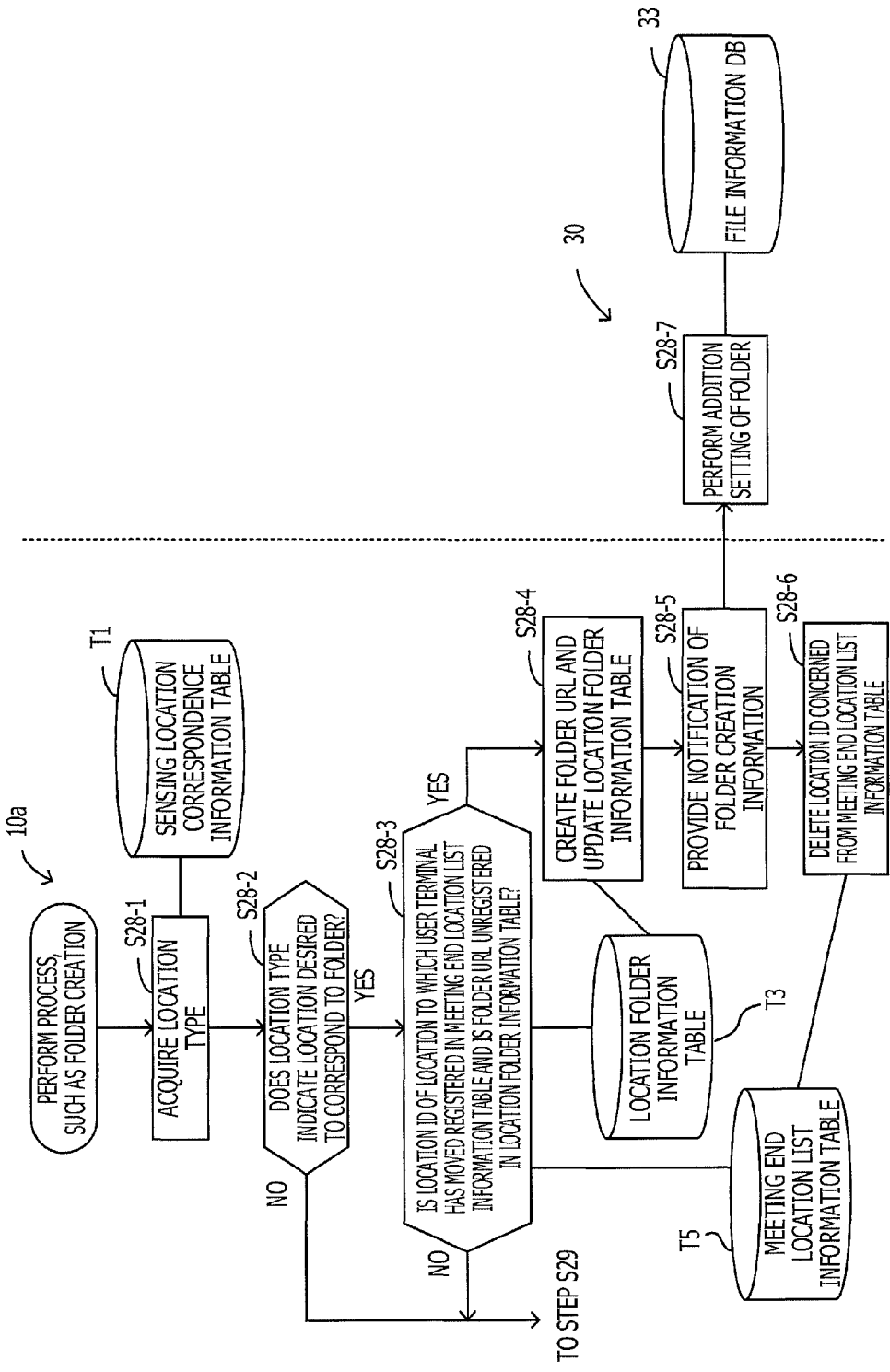
FIG. 21 is a flowchart illustrating operations of a process, such as folder creation, at the time of starting a meeting.

Next, the detailed process relating to the above-described operation of step S28 is described. FIG. 21 is a flowchart illustrating operations of a process, such as folder creation, at the time of starting a meeting.

[S28-1] When the location information table T2 is updated, the folder setting control part 14 acquires the corresponding location type from the sensing location correspondence information table T1 based on the updated location ID.

[S28-2] The folder setting control part 14 determines whether or not the acquired location type indicates a location desired to be caused to correspond to a folder. When the location is not desired to be caused to correspond to the folder, the process proceeds to step S29 in FIG. 19, or when the location is desired to be caused to correspond to the folder, the process proceeds to step S28-3. The operations of steps S28-1 and S28-2 relating to the location type may be omitted.

[S28-3] The folder setting control part 14 determines whether or not the location ID of the location for which the user ID is added, that is, the location to which the user terminal has moved, is registered by referring to the meeting end location list information table T5.

When the location ID of the location for which a user ID is added is registered in the meeting end location list information table T5 and a folder URL for the location ID concerned is unregistered in the location folder information table T3, the process proceeds to step S28-4 by assuming that a meeting will be started in a location of the location ID concerned.

When the location ID of the location for which the user ID is added is registered in the meeting end location list information table T5 and the folder URL for the location ID concerned is registered in the location folder information table T3, the folder creation process is undesired and thus, the process proceeds to step S29 in FIG. 19.

Further, when the location ID of the location for which the user ID is added is not registered in the meeting end location list information table T5, a meeting is being held in the location of the location ID and thus, the folder creation process is not performed and the process proceeds to step S29 in FIG. 19 to move on to a setting process of the access authority for the added user ID.

[S28-4] The folder setting control part 14 creates a new folder URL for the started meeting. After that, the folder setting control part 14 registers the freshly-created folder URL into the folder URL cell in the location folder information table T3, which corresponds to the location ID of the location for which the user ID is added and updates the location folder information table T3.

[S28-5] The folder setting control part 14 generates folder creation information, which indicates that the new folder URL is created, and notifies the file server 30 of the folder creation information.

[S28-6] The folder setting control part 14 deletes the location ID concerned from the meeting end location list information table T5.

[S28-7] The authentication file access part 31 in the file server 30 receives the folder creation information and recognizes the folder URL based on the folder ID included in the folder creation information. After that, the authentication file access part 31 sets the folder that has this folder URL in the file information DB 33.

Figure 22:
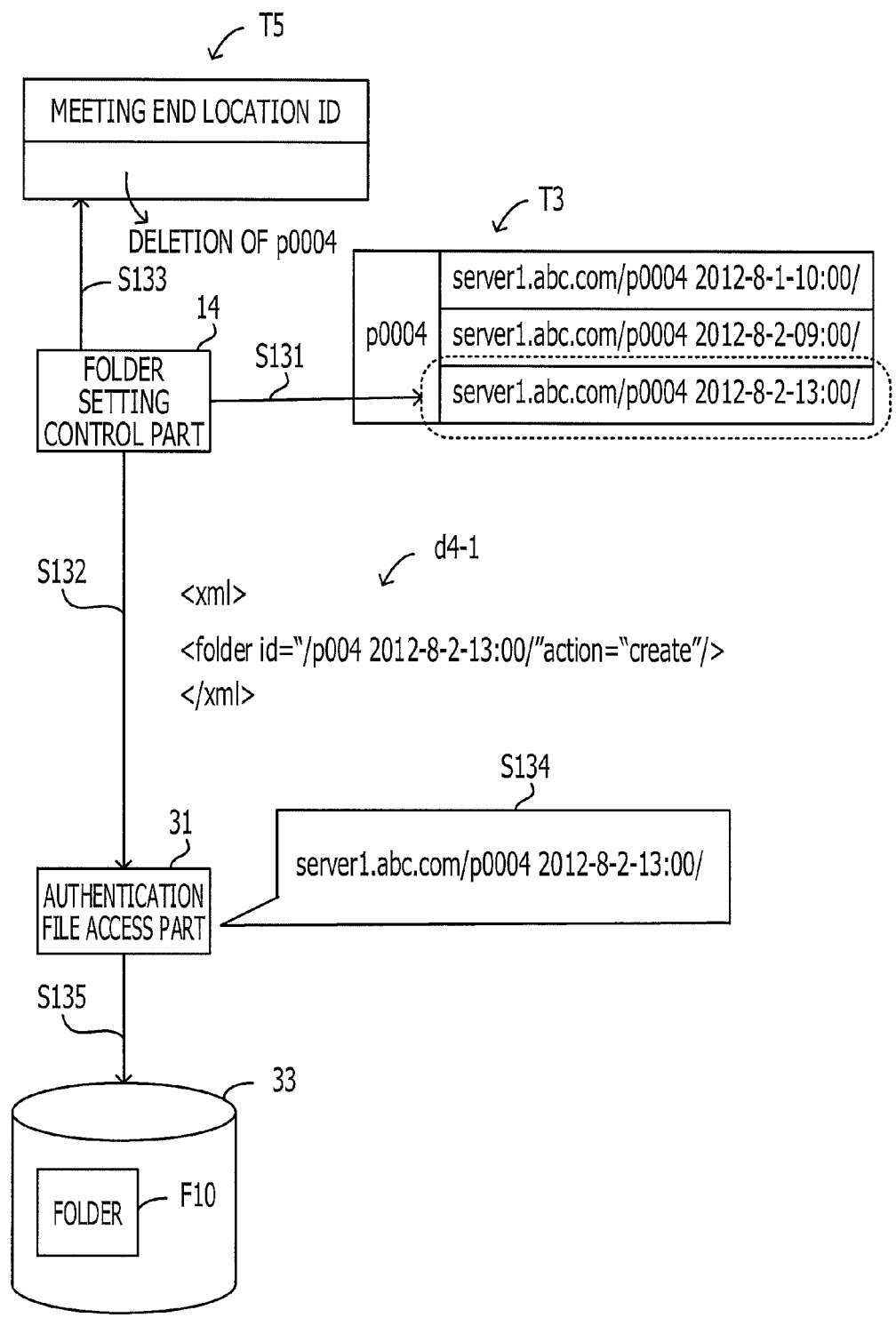
FIG. 22 is an illustration for explaining a specific example of the folder creation process.

FIG. 22 is an illustration for explaining a specific example of the folder creation process. It is assumed, for example, that the folder setting control part 14 creates a folder URL indicating server1.abc.com/p0004 2012-8-2-13:00/for the location ID p0004 as a new folder URL. This folder is a folder for saving a material for a meeting started at 1 pm on Aug. 2, 2012.

[S131] The folder setting control part 14 adds the folder URL server1.abc.com/p0004 2012-8-2-13:00/for the location ID p0004 to the location folder information table T3, and updates the location folder information table T3.

[S132] The folder setting control part 14 creates folder creation information d4-1 and notifies the file server 30 of the folder creation information d4-1. In the folder creation information d4-1, it is described that the folder ID=/p0004 2012-8-2-13:00/, the folder name=action, and the folder setting state=create.

[S133] The folder setting control part 14 deletes the location ID p0004 from the meeting end location list information table T5.

[S134] The authentication file access part 31 receives the folder creation information d4-1 and then recognizes the folder URL indicating server1.abc.com/p0004 2012-8-2-13:00/based on the folder ID included in the folder creation information d4-1.

In the folder URL, server1.abc.com represents a domain name of the file server 30. Accordingly, when the authentication file access part 31 learns the folder ID that indicates p0004 2012-8-2-13:00 and is described in the folder creation information d4-1, the authentication file access part 31 may recognize the added folder URL, server1.abc.com/p0004 2012-8-2-13:00/.

[S135] The authentication file access part 31 sets a folder F10 that has the recognized folder URL, server1.abc.com/p0004 2012-8-2-13:00/in the file information DB 33.

Figure 23:
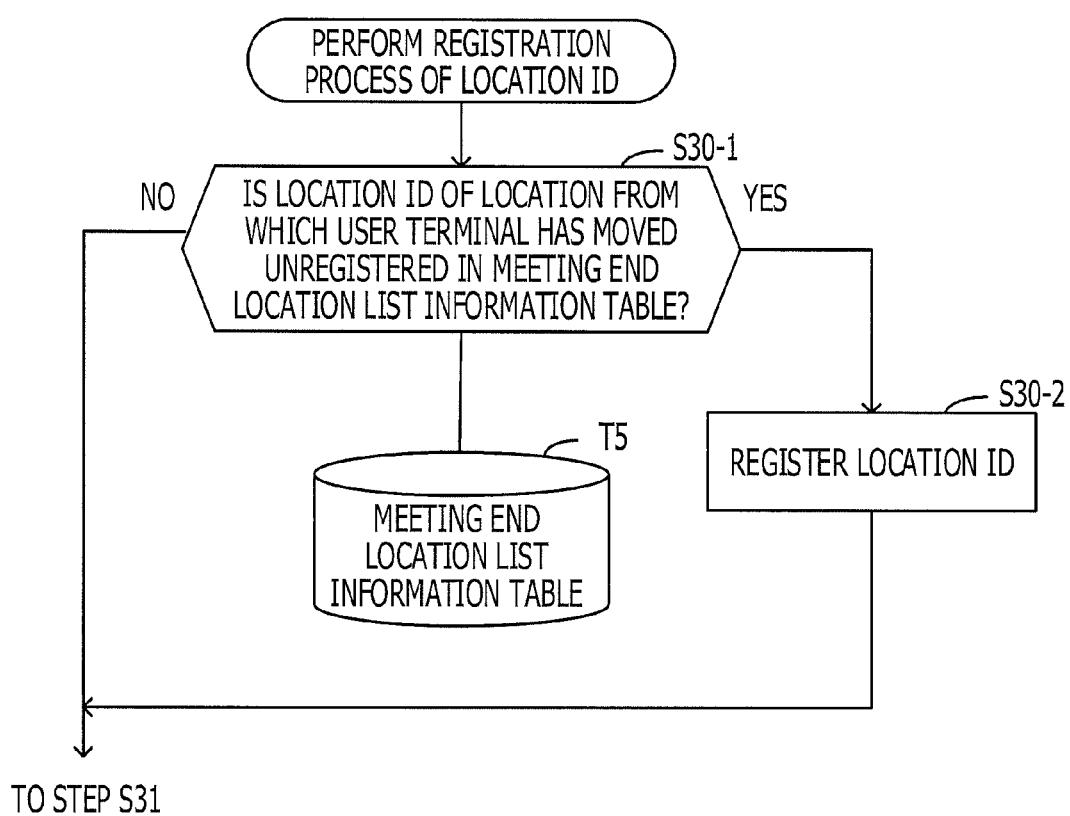
FIG. 23 is a flowchart illustrating a registration process of a location identity (ID) at the time of ending a meeting.

Next, the detailed process relating to the above-described operation of step S30 is described. FIG. 23 is a flowchart illustrating registration process of a location ID at the time of ending a meeting.

[S30-1] The folder setting control part 14 determines whether or not the location ID of the location from which the user ID is deleted is registered by referring to the meeting end location list information table T5.

When the location ID of the location from which the user ID is deleted is unregistered in the meeting end location list information table T5, the process proceeds to step S30-2. When the location ID of the location from which the user ID is deleted is registered in the meeting end location list information table T5, the process proceeds to step S31 in FIG. 19.

[S30-2] The folder setting control part 14 registers the location ID of the location from which the user ID is deleted in the meeting end location list information table T5 by assuming that a meeting has previously ended in the location of the location ID concerned, and the process proceed to step S31.

Figure 24:
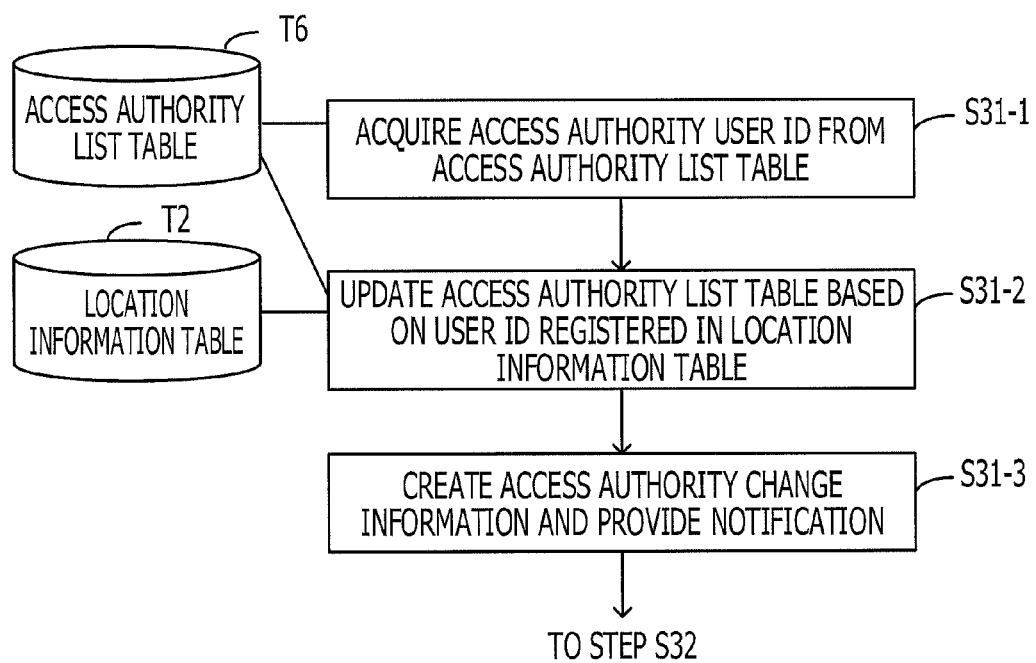
FIG. 24 is a flowchart illustrating a generation and notification process of access authority change information.

Next, the detailed process relating to the above-described operation of step S31 is described. FIG. 24 is a flowchart illustrating a generation and notification process of the access authority change information.

[S31-1] The access authority change notification part 15 acquires a current access authority user ID corresponding to a location ID that is not described in the meeting end location list information table T5 from the access authority list table T6.

[S31-2] The access authority change notification part 15 compares the user ID described in the location information table T2 with the access authority user ID acquired from the access authority list table T6.

After that, when the user ID is added to the location information table T2, the access authority change notification part 15 registers the user ID corresponding to the location ID of the location for which the user ID is added in the access authority list table T6.

[S31-3] The access authority change notification part 15 creates access authority change information and notifies the file server 30 of the access authority change information.

Thus, the access authority change notification part 15 accesses the access authority list table T6 and acquires an access authority user ID corresponding to the location in which a meeting is currently being held. After that, the access authority change notification part 15 compares the acquired access authority user ID with the user ID acquired from the location information table T2, and gives access authority to the freshly-added user ID. Further, the access authority change notification part 15 notifies the file server 30 of the access authority change information.

As a result, a user who was in the meeting room during the meeting obtains access authority for the folder. Further, once the meeting has ended, the meeting attendee may access the folder.

Although in the above-described case, the start of the meeting or the end of the meeting is based on a timing at which a user has left the meeting room, an occupied sign or a vacant sign attached to the door of the meeting room may be detected with a sensor as an example of another method.

Next, first to eighth variations of the present technique are described below. First of all, the first variation is described with reference to FIGS. 25 to 30. In the above-described embodiment, a folder is caused to correspond to one fixed location. However, according to the first variation, a folder is caused to correspond to a plurality of locations.

When in the first variation, a plurality of locations are regarded as one location and a folder is caused to correspond to the plurality of locations, the plurality of locations may be fixedly set as one location by, for example, using radio-frequency (RF) tags and arranging the RF tags having the same ID at the plurality of locations.

Further, it is also possible to hold one meeting at a plurality of locations using, for example, a video conferencing system, that is, to cause one folder to correspond to a plurality of points at which a video conference is held. Described below is a case to which the multipoint video conferencing system is applied.

FIG. 25 illustrates a configuration example of a sensing location correspondence information table T1a. The access authority control server 10 includes the sensing location correspondence information table T1a. The sensing location correspondence information table T1a includes items of a location ID, sensing information, a location type, and an internet protocol (IP) address.

For example, the location ID is an ID of a location, which serves to identify a location, such as a meeting room. The sensing information is information on the position of a video conference terminal, which corresponds to a user terminal, and is, for example, data of radio-frequency identification (RFID). The location type indicates a type of a location, that is, indicates that the location is, for example, a meeting room or an office. The IP address is an IP address of a video conference terminal.

Figure 26:
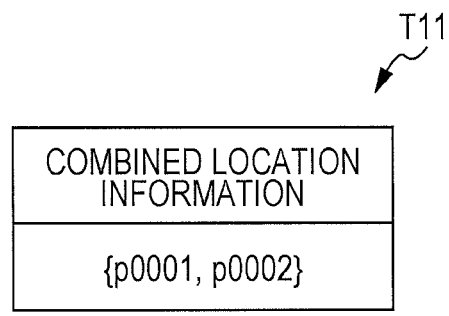
FIG. 26 illustrates a configuration example of a combined location information table.

FIG. 26 illustrates a configuration example of a combined location information table T11. The access authority control server 10 includes the combined location information table T11. Combination location information indicates a combined location ID set when a plurality of locations are combined. The combined location ID is added when a plurality of locations are combined, and deleted when the combination of the plurality of locations is canceled. In FIG. 26, it is registered that the location having the location ID p0001 and the location having the location ID p0002 are regarded as one location, that is, a combined location.

FIG. 27 illustrates a configuration example of an access authority information table T4-3. The file server 30 includes the access authority information table T4-3. The access authority information table T4-3 includes items of the folder ID and the user ID, and user IDs to which access authority is given for each folder ID are registered in the access authority information table T4-3.

Generally, in the video conferencing system, a video conference may be held when another party is selected to start calling up, and the other party receives the call and responds. When the video conferencing system is a system that uses an IP network, the call is made using an IP address.

Thus, to hold a video conference, a video conference terminal transmits the IP address of its own, the IP address of the other party, and a video conference start message to the access authority control server 10 at the time of starting the video conference.

When the access authority control server 10 receives the IP addresses and the video conference start message, the access authority control server 10 recognizes the location IDs described in the sensing location correspondence information table T1a in FIG. 25 based on the received IP addresses. Then, the access authority control server 10 causes the plurality of location IDs to be registered in the combined location information table T11 as the combined location information.

After that, the access authority control server 10 creates access authority change notification in which it is described to give access authority to user IDs corresponding to the combined location ID described in the combined location information table T11, and transmits the access authority change notification to the file server 30.

Referring to FIG. 26, in the combined location information table T11, a set of location IDs p0001 and p0002 is described as a combined location ID {p0001, p0002}. In the location information table T2 in FIG. 4, it is described that the user IDs corresponding to the location ID p0001 are u0001, u0002, u0003, u0004, and u0010, and the user IDs corresponding to the location ID p0002 are u0005, u0008, and u0009.

Accordingly, in this case, access authority is given for the folders /p0001/ and /p0002/ after combining the user IDs corresponding to the location ID p0001 and the user IDs corresponding to the location ID p0002, which are indicated in the location information table T2 in FIG. 4.

That is, the user IDs u0001, u0002, u0003, u0004, u0005, u0008, u0009, and u0010 may access the folders /p0001/ and /p0002/. The correspondence relations among the user IDs and the folders are registered in the access authority information table T4-3 as indicated in FIG. 27.

Figure 28:
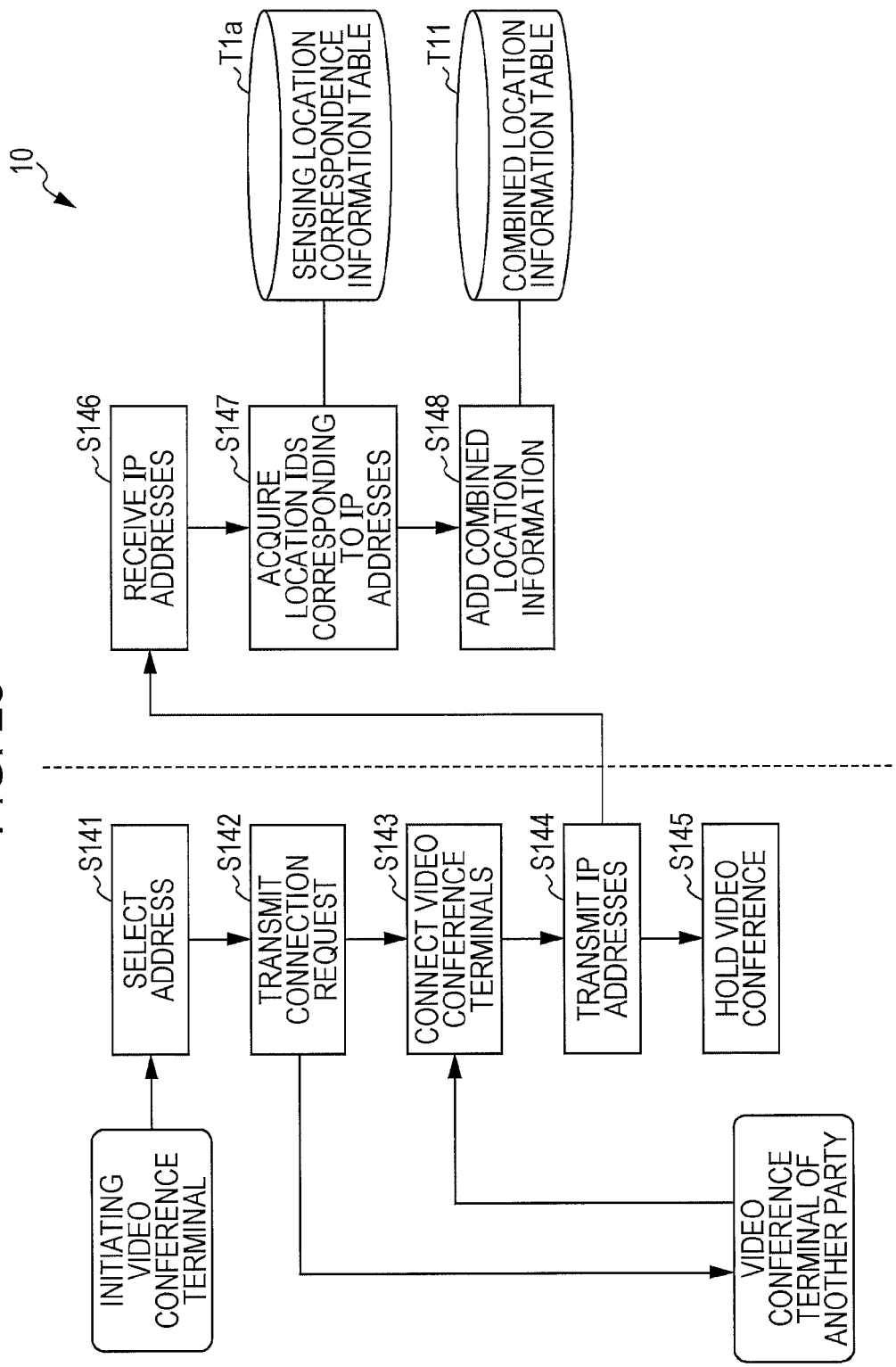
FIG. 28 is a flowchart illustrating operations of creating the combined location information according to a first variation.

Next, operations from the initiation of the video conferencing system to the creation of the combined location information are described with reference to a flowchart. FIG. 28 is a flowchart illustrating operations of creating the combined location information according to the first variation.

[S141] A user initiates a video conferencing system. An initiating video conference terminal selects an address of another party with which the initiating video conference terminal wants to have the video conference.

[S142] The initiating video conference terminal transmits a connection request to a video conference terminal of the other party.

[S143] The initiating video conference terminal connects to the video conference terminal of the other party.

[S144] The initiating video conference terminal acquires an IP address of the video conference terminal of the other party, and transmits the IP address of its own, that is, the IP address of the initiating video conference terminal, and the IP address of the video conference terminal of the other party to the access authority control server 10.

[S145] The video conference is held between the initiating video conference terminal and the video conference terminal of the other party.

[S146] The access authority control server 10 receives the IP addresses transmitted from the video conference terminals.

[S147] The access authority control server 10 recognizes the location IDs described in the sensing location correspondence information table T1a based on the IP addresses of the video conference terminals between which the video conference is held.

[S148] The access authority control server 10 adds the plurality of location IDs that have been recognized to the combined location information table T11 as the combined location information.

Figure 29:
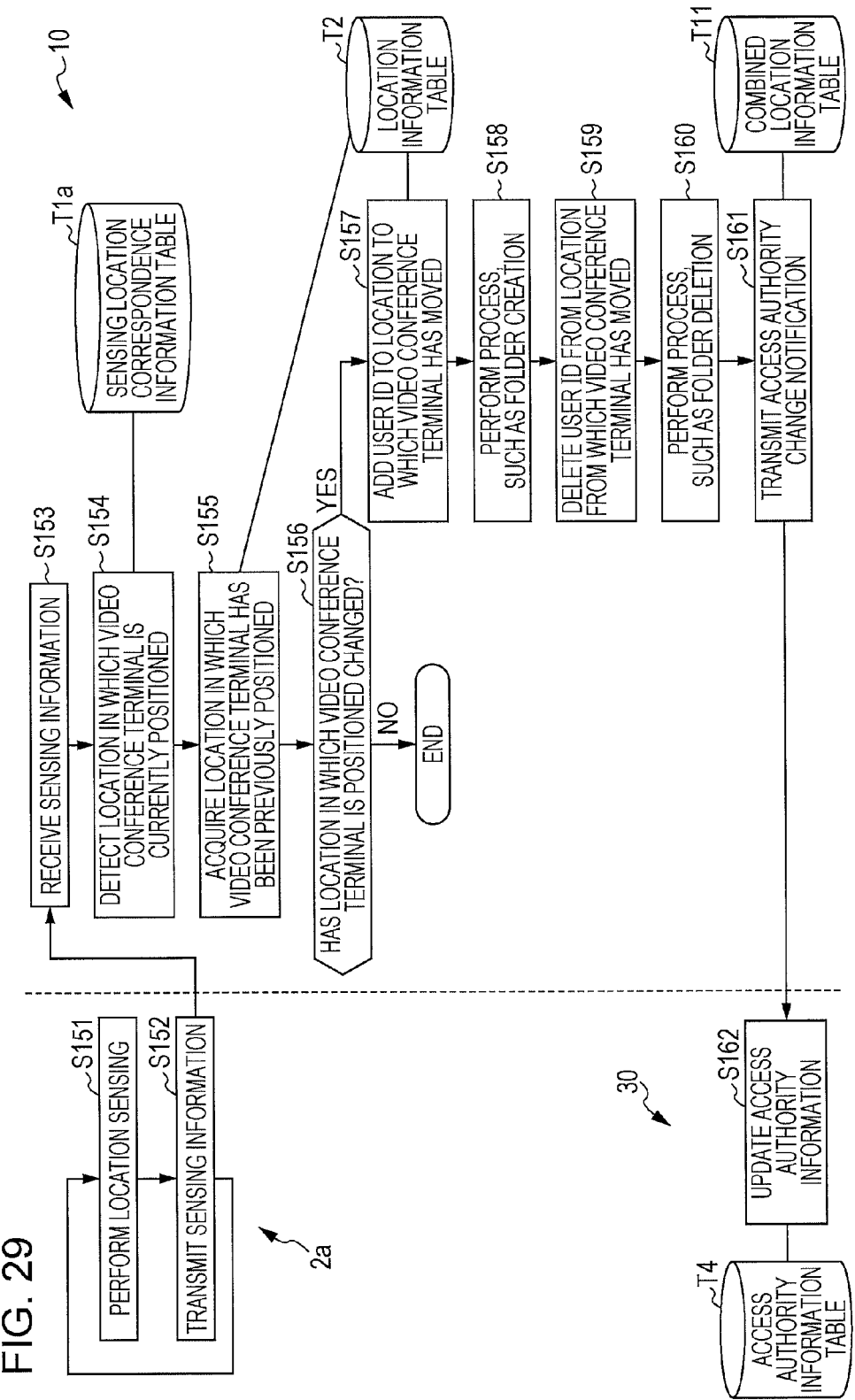
FIG. 29 is a flowchart illustrating operations from location recognition of a plurality of points to updating of access authority.

FIG. 29 is a flowchart illustrating operations from the location recognition of the plurality of points to the updating of the access authority.

[S151] A video conference terminal 2a performs location sensing regarding a location in which the video conference terminal 2a is positioned and acquires sensing information.

[S152] The video conference terminal 2a transmits the acquired sensing information to the access authority control server 10 together with the user ID.

[S153] The sensing information reception part 11 in the access authority control server 10 receives the sensing information and the user ID transmitted from the video conference terminal 2a.

[S154] The location detection part 12 detects the location in which the video conference terminal 2a is currently positioned from the sensing information and the information registered in the sensing location correspondence information table T1a.

[S155] Based on the user ID, the location information updating part 13 acquires information on the location in which the video conference terminal 2a has been previously positioned from the information registered in the location information table T2.

[S156] Based on the location in which the video conference terminal 2a is currently positioned and the location in which the video conference terminal 2a has been previously positioned, the location information updating part 13 determines whether or not the location in which the video conference terminal 2a is positioned has changed.

When the location information updating part 13 determines that the video conference terminal 2a is currently positioned still in the same location as the location in which the video conference terminal 2a has been previously positioned, it is undesired to change the access authority and the process ends. When it is determined that the video conference terminal 2a is currently positioned in a location different from the location in which the video conference terminal 2a has been previously positioned, the process proceeds to step S157.

[S157] The location information updating part 13 adds the user ID of the video conference terminal 2a to the user ID cell in the location information table T2, which corresponds to the location ID of the location to which the video conference terminal 2a has moved, and updates the location information table T2.

[S158] The folder setting control part 14 determines whether or not a folder URL for the location ID of the location to which the video conference terminal 2a has moved is registered by referring to the location folder information table T3.

When no folder URL is registered for the location ID of the location to which the video conference terminal 2a has moved, the folder setting control part 14 creates a new folder URL and updates the location folder information table T3. After that, the folder setting control part 14 notifies the file server 30 of the folder creation information.

[S159] The location information updating part 13 deletes the user ID of the video conference terminal 2a from the user ID cell in the location information table T2, which corresponds to the location ID of the location from which the video conference terminal 2a has moved, and updates the location information table T2.

[S160] The folder setting control part 14 determines whether or not another user ID is registered for the location ID of the location from which the video conference terminal 2a has moved by referring to the location information table T2.

When the deletion of the user ID of the video conference terminal 2a causes an unregistered state of the user ID for the location ID of the location from which the video conference terminal 2a has moved, the folder setting control part 14 deletes the folder URL concerned and updates the location folder information table T3. After that, the folder setting control part 14 notifies the file server 30 of the folder deletion information.

[S161] The updating of the location information table T2 leads the access authority change notification part 15 to recognize the registered contents of the combined location information table T11, create access authority change notification in which it is described to give access authority to the user IDs corresponding to the combined location ID described in the combined location information table T11, and transmits the access authority change notification to the file server 30.

[S162] The access authority control part 32 in the file server 30 receives the transmitted access authority change notification and updates the information registered in the access authority information table T4.

Figure 30:
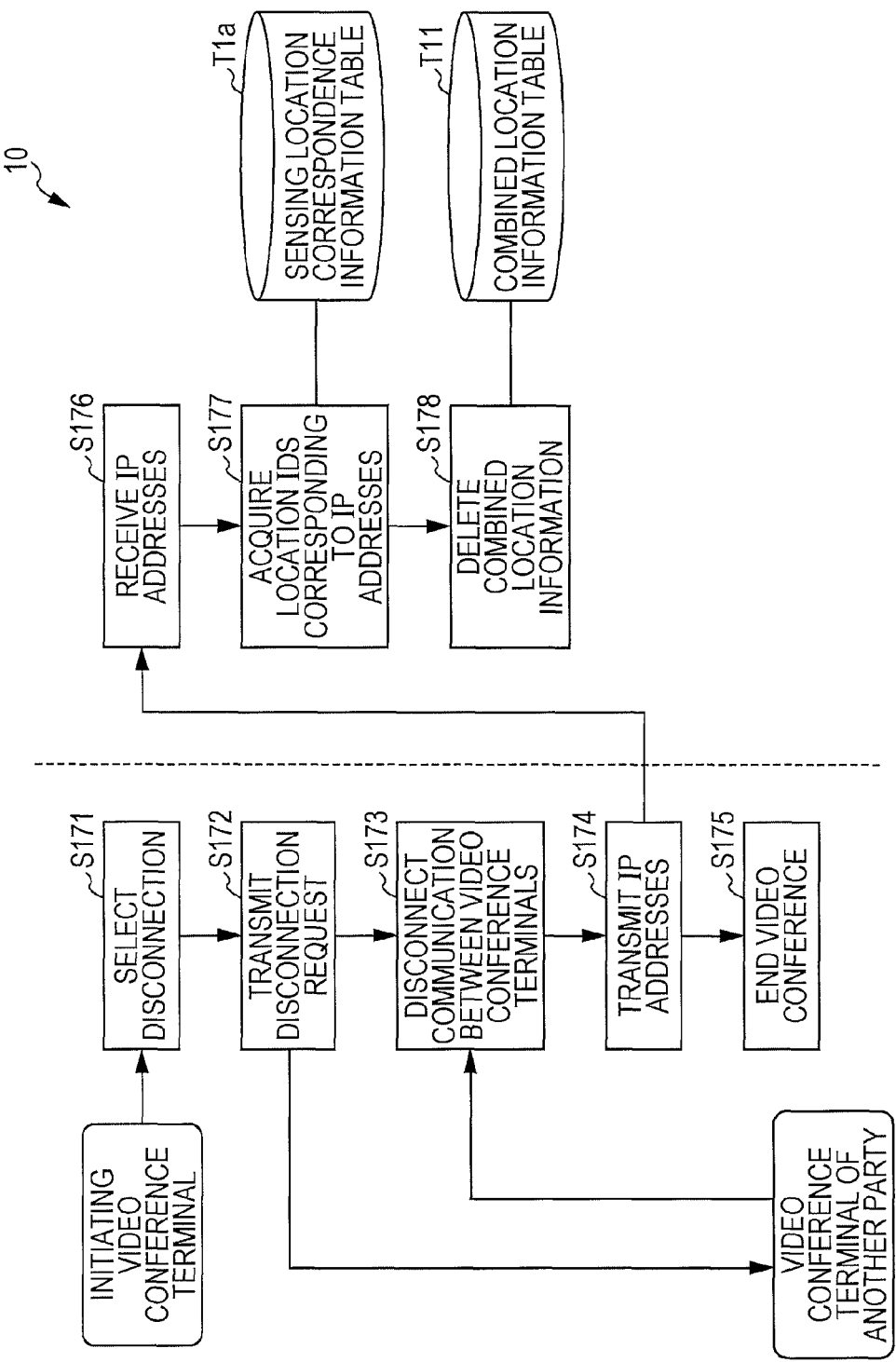
FIG. 30 is a flowchart illustrating operations from communication disconnection of a video conferencing system to deletion of the combined location information.

FIG. 30 is a flowchart illustrating operations from communication disconnection of the video conferencing system to deletion of the combined location information.

[S171] The initiating video conference terminal selects disconnection of communication of the video conference.

[S172] The initiating video conference terminal transmits a disconnection request to the video conference terminal of the other party.

[S173] The communication between the initiating video conference terminal and the video conference terminal of the other party is disconnected.

[S174] The initiating video conference terminal transmits the IP address of its own, that is, the IP address of the initiating video conference terminal, and the acquired IP address of the video conference terminal of the other party to the access authority control server 10.

[S175] The video conference between the initiating video conference terminal and the video conference terminal of the other patty ends and the state returns to the state before the connection.

[S176] The access authority control server 10 receives the IP addresses transmitted from the video conference terminal.

[S177] The access authority control server 10 recognizes the location IDs described in the sensing location correspondence information table T1a based on the IP addresses.

[S178] The access authority control server 10 deletes the combined location information the same as the plurality of location IDs, which have been recognized, from the combined location information table T11.

As described above, according to the first variation, the access authority control server 10 recognizes a plurality of locations in which a plurality of user terminals are positioned as a combined location, and creates a folder for which access authority is given to the plurality of user terminals present in the combined location. Thus, even when a meeting is held over a plurality of locations, users may access the folders corresponding to the plurality of locations and share a meeting material.

When in this case, each location is provided with a folder and therefore inconvenience is caused by the plurality of folders created for the meeting, for example, the plurality of folders may be synchronized by copying a file to make the files in the folders the same, or a link from the inside of the folder to another folder may be added to increase accessibility. In order to perform the synchronization or the link addition, a message for requesting the synchronization or the link is added to the access authority change notification of which the access authority control server 10 notifies the file server 30.

Next, the second variation is described with reference to FIGS. 31 to 35. In the above-described variation, the location of a user is fixedly given by the location sensing. In contrast, according to the second variation, a user explicitly specifies the location in which the user is present. In the second variation, for example, a user terminal includes a function that specifies a distance or a range from the position of the user terminal (or may use a fixed value without specifying any distance or range), and notifies the access authority control server 10 of information on the distance together with the user ID.

The access authority control server 10 calculates the position of the user terminal based on the user ID, the distance information, and the sensing information, of which the access authority control server 10 has been notified, and updates user-specified location information, which is specified by the user, based on the calculated position.

Figure 31:
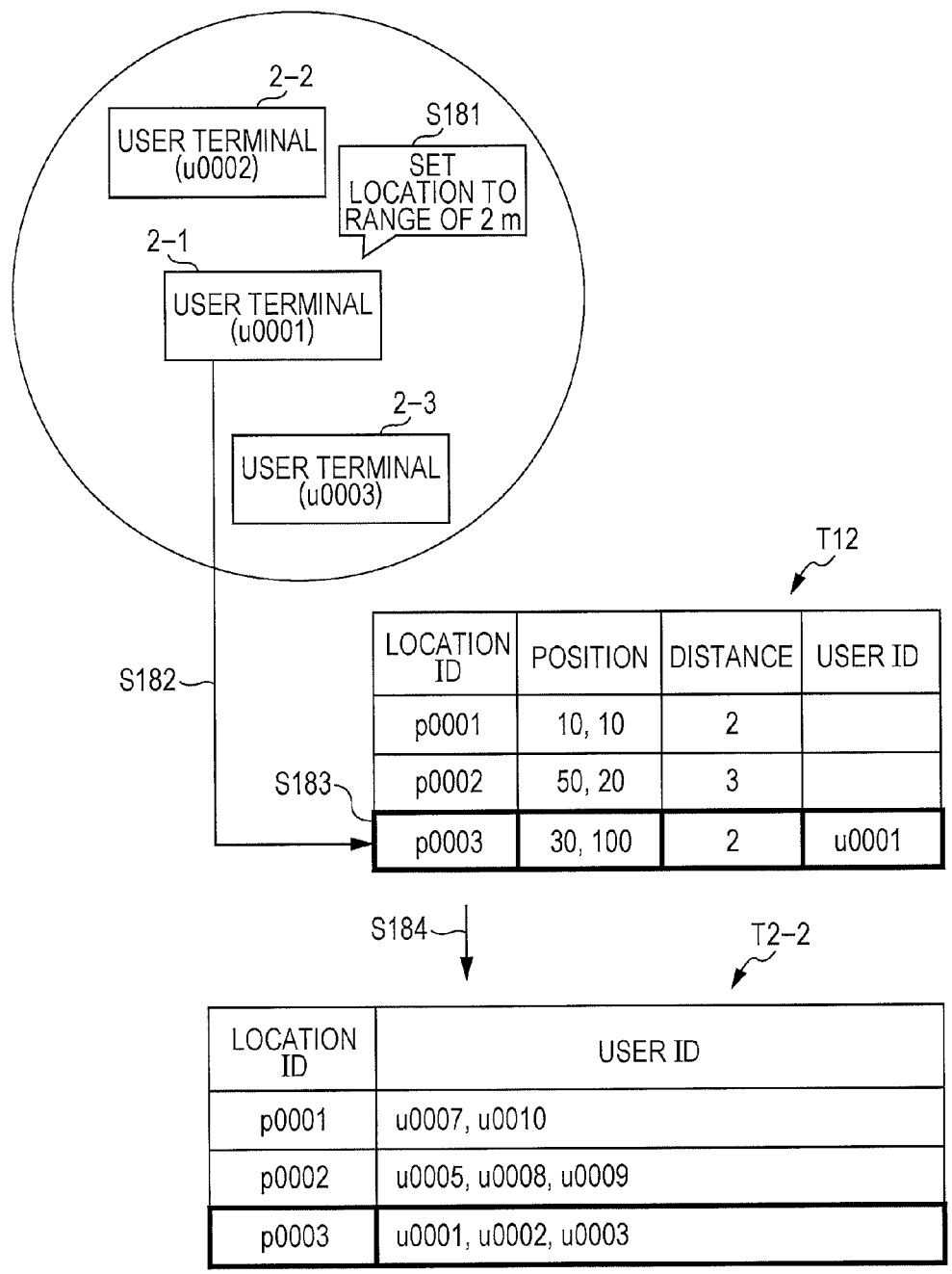
FIG. 31 is an illustration for explaining operations performed when updating user-specified location information.

FIG. 31 is an illustration for explaining operations performed when updating the user-specified location information. It is assumed that the user ID of the user terminal 2-1 indicates u0001, the user ID of the user terminal 2-2 indicates u0002, and the user ID of the user terminal 2-3 indicates u0003. Further, it is assumed that the user terminals 2-1 to 2-3 are positioned in a range of 2 m around the user terminal 2-1 at the center.

[S181] It is assumed that the user terminal 2-1 wants to hold a meeting with user terminals positioned in a range of 2 m around the user terminal 2-1 at the center while sharing a folder.

[S182] The user terminal 2-1 transmits the user ID indicating u0001, the distance information indicating 2 m, and the sensing information, which is a result of the location sensing, to the access authority control server 10.

[S183] The access authority control server 10 adds contents to be registered in a user-specified location information table T12 based on the information transmitted from the user terminal 2-1.

The access authority control server 10 includes the user-specified location information table T12. The user-specified location information table T12 includes items of a location ID, a position, a distance, and a user ID. The distance indicates a value of the distance information transmitted from the user terminal 2-1 and the position indicates coordinate information of the user terminal 2-1 that has transmitted the distance information and the like.

Since in the case illustrated in FIG. 31, the user ID indicating u0001 and the distance information indicating 2 m are transmitted from the user terminal 2-1, the access authority control server 10 causes the corresponding values to be registered in addition with respect to the items concerned in the user-specified location information table T12, and sets the coordinate information and p0003 as a freshly-created location ID.

[S184] The access authority control server 10 detects whether or not a user terminal is present in the range of 2 m around positions 30 and 100. When the access authority control server 10 detects that a user terminal is present, the access authority control server 10 recognizes the user ID of the detected user terminal and causes the recognized user ID to correspond to a location ID in a location information table T2-2 and to be registered in the location information table T2-2.

In the case illustrated in FIG. 31, the user terminals 2-2 and 2-3 are present in the range of 2 m around the positions 30 and 100 and therefore, u0001, u0002, and u0003 are registered in the user ID cell corresponding to the location ID p0003 in the location information table T2-2.

Figure 32:
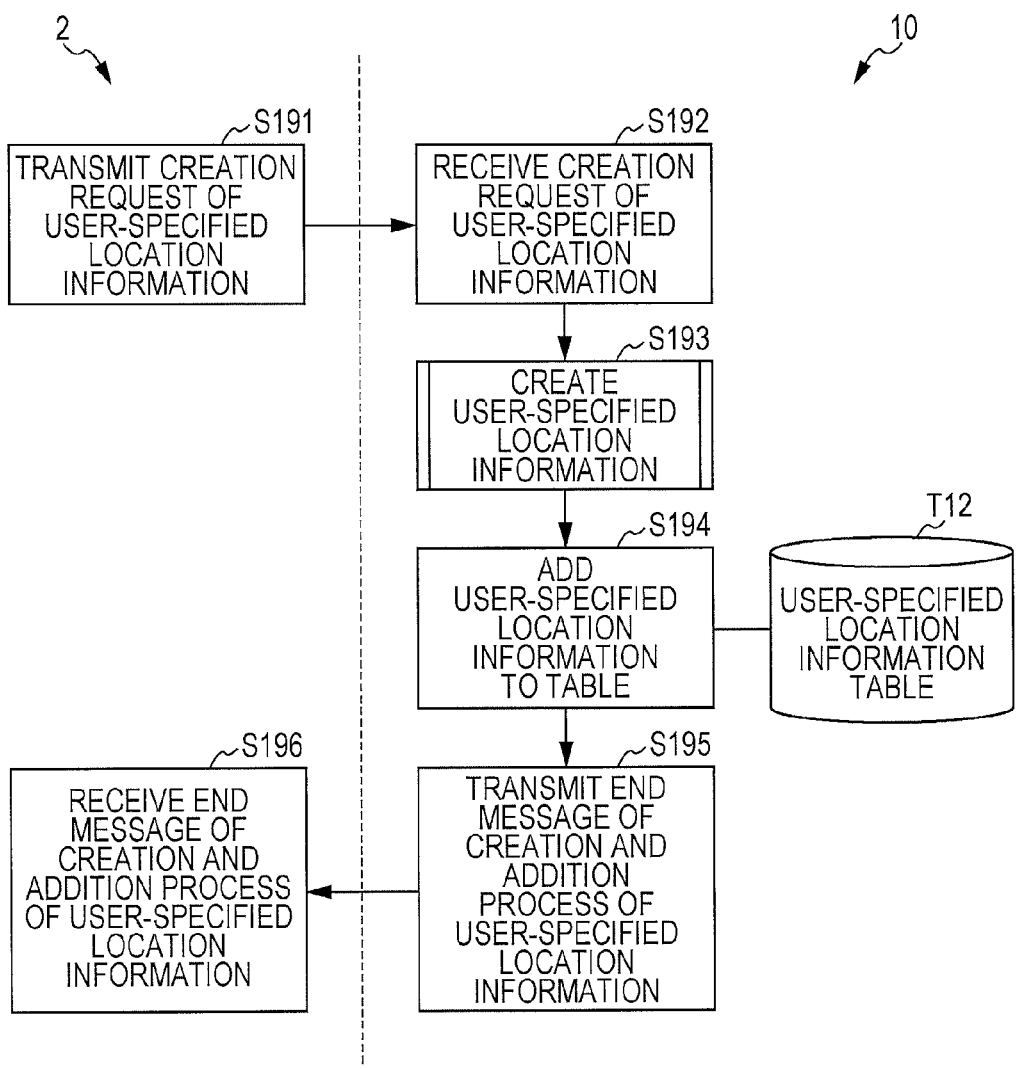
FIG. 32 is a flowchart illustrating operations of adding the user-specified location information.

FIG. 32 is a flowchart illustrating operations of adding the user-specified location information.

[S191] The user terminal 2 transmits a creation request of the user-specified location information to the access authority control server 10.

[S192] The access authority control server 10 receives the creation request of the user-specified location information.

[S193] The access authority control server 10 creates the user-specified location information.

[S194] The access authority control server 10 adds the created user-specified location information to the user-specified location information table T12.

[S195] The access authority control server 10 transmits an end message of the creation and addition process of the user-specified location information to the user terminal 2.

[S196] The user terminal 2 receives the end message of the creation and addition process of the user-specified location information from the access authority control server 10.

Figure 33:
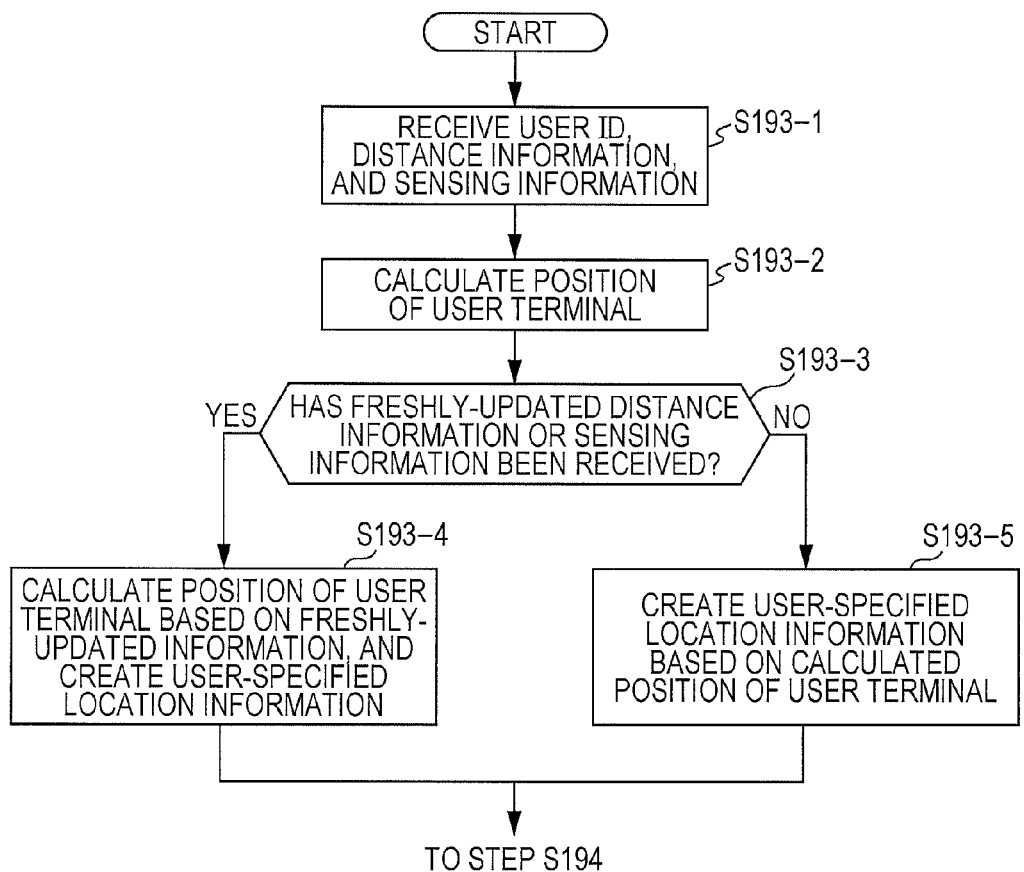
FIG. 33 is a flowchart illustrating operations of creating the user-specified location information.

FIG. 33 is a flowchart illustrating operations of creating the user-specified location information. The operation of step S193 in FIG. 32 is illustrated in detail.

[S193-1] The access authority control server 10 receives a user ID, distance information, and sensing information from the user terminal 2.

[S193-2] The access authority control server 10 calculates the coordinates of the user terminal 2 based on the distance information and the sensing information transmitted from the user terminal 2.

[S193-3] The access authority control server 10 determines whether or not the distance information and the sensing information, which has been transmitted again from the user terminal 2 having the same user ID and freshly updated, is received. When the freshly-updated information is received, the process proceeds to step S193-4. When the freshly-updated information is not received, the process proceeds to step S193-5.

[S193-4] The access authority control server 10 recalculates the coordinates of the user terminal 2 and creates the user-specified location information based on the freshly-updated distance information and the freshly-updated sensing information.

[S193-5] The access authority control server 10 creates the user-specified location information based on the calculated coordinates of the user terminal 2.

Next, operations of deleting the user-specified location information are described. In the above-described variation, when nobody is present in the location, the folder is deleted and the process ends. In the second variation, the added user-specified location information is also deleted. The deletion may avoid increase in undesired location IDs.

Figure 34:
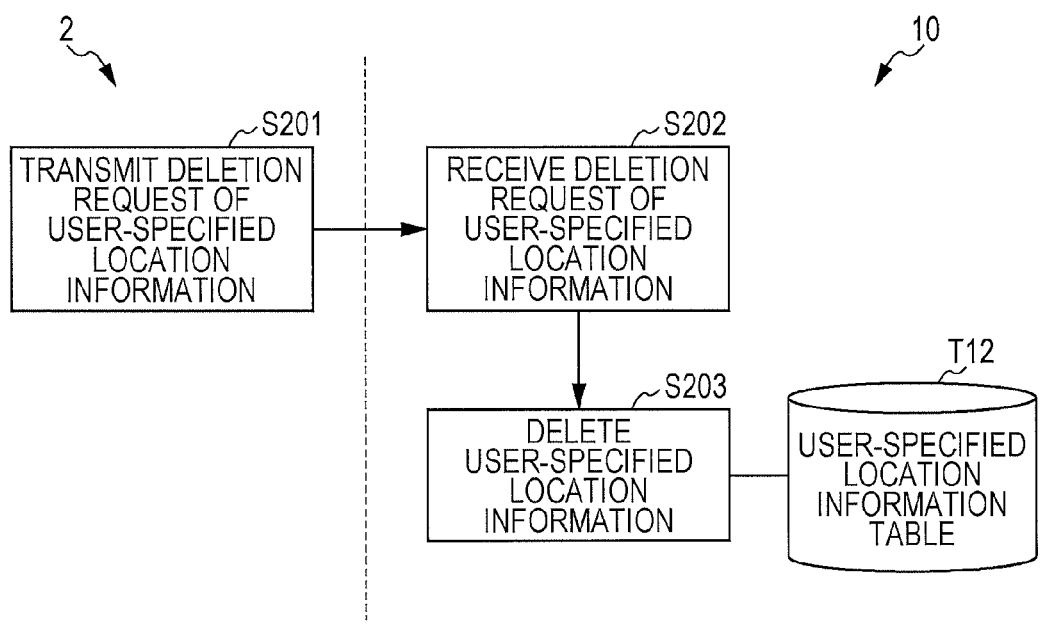
FIG. 34 is a flowchart illustrating operations of deleting the user-specified location information.

FIG. 34 is a flowchart illustrating the operations of deleting the user-specified location information. The operations performed when the user-specified location information is deleted in accordance with a user's instruction regarding the deletion are illustrated.

[S201] The user terminal 2 transmits a deletion request of the user-specified location information, which includes a location ID and a deletion message, to the access authority control server 10.

[S202] The access authority control server 10 receives the deletion request of the user-specified location information.

[S203] The access authority control server 10 deletes the user-specified location information concerned from the user-specified location information table T12 using the location ID as a key.

Figure 35:
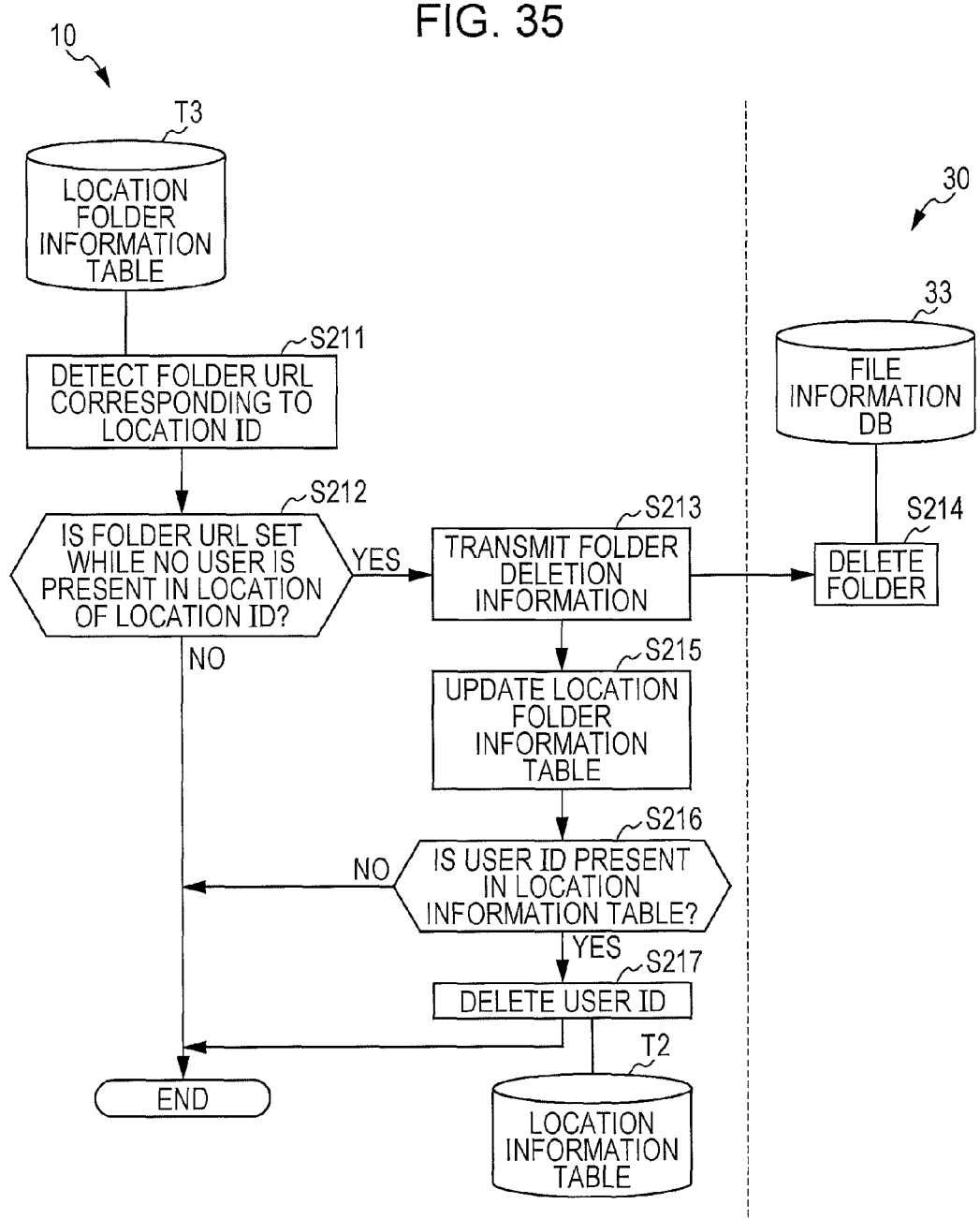
FIG. 35 is a flowchart illustrating operations of deleting a folder, which accompany the deletion of the user-specified location information.

FIG. 35 is a flowchart illustrating operations of deleting a folder, which accompany the deletion of the user-specified location information.

[S211] The access authority control server 10 detects a folder URL corresponding to a location ID included in the deleted user-specified location information by referring to the location folder information table T3.

[S212] The access authority control server 10 determines whether or not the folder URL is set while no user terminal is present in the location of the location ID. When no folder URL is set, the process ends. When the folder URL is set, the process proceeds to step S213.

[S213] The access authority control server 10 transmits folder deletion information to the file server 30.

[S214] When the file server 30 receives the folder deletion information, the file server 30 recognizes the folder URL based on the folder ID included in the folder deletion information. After that, the file server 30 deletes the folder having the folder URL from the file information DB 33.

[S215] The access authority control server 10 deletes the folder URL corresponding to the location ID concerned and updates the location folder information table T3.

[S216] The access authority control server 10 determines whether or not the user ID included in the deleted user-specified location information is present in the location information table T2. When the user ID included in the deleted user-specified location information is not present in the location information table T2, the process ends. When the user ID included in the deleted user-specified location information is present in the location information table T2, the process proceeds to step S215.

[S217] The access authority control server 10 deletes the user ID concerned from the location information table T2.

As described above, in the second variation, the access authority control server 10 calculates the coordinates of a transmitting user terminal, which is the user terminal that has transmitted distance information when the distance information is transmitted from the user terminal.

Further, the access authority control server 10 creates a folder for which access authority is given to another user terminal present in a range of a certain distance indicated by the distance information around the coordinates of the transmitting user terminal at the center, and to the transmitting user terminal. Thus, a folder may be created flexibly so as to correspond to a location specified by a user.

Next, the third variation is described with reference to FIGS. 36 and 37. In the above-described second variation, a user explicitly specifies a location in which the user is present and the access authority control server 10 creates location information. In the third variation, the access authority control server 10 creates location information without a user specifying a location.

The access authority control server 10 calculates a distance between user terminals based on the information on the positions of the user terminals, which have been detected, and creates the location information by regarding the user terminals present in a certain distance range as a group. When a user terminal approaches the certain distance range and enters the certain distance range, the access authority control server 10 causes the user terminal to join the group and adds the location information.

Figure 36:
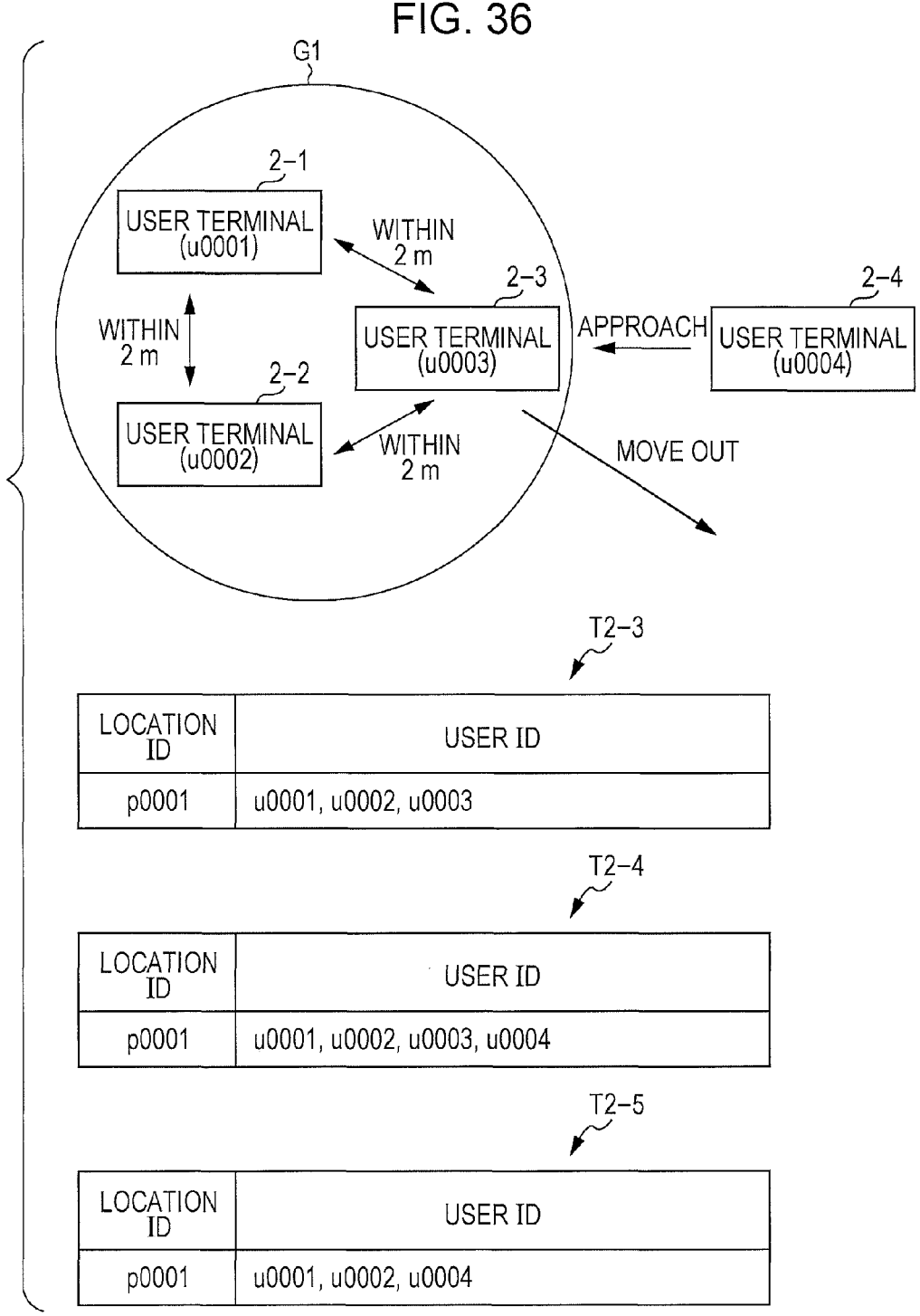
FIG. 36 is an illustration for explaining operations according to a third variation.

FIG. 36 is an illustration for explaining operations according to the third variation. It is assumed that the user terminals 2-1 to 2-4, which have the user IDs u0001, u0002, u0003, and u0004, respectively, are present.

The access authority control server 10 calculates each distance among the user terminals 2-1 to 2-4 based on information on the position of each of the user terminals 2-1 to 2-4. After that, when the access authority control server 10 recognizes that the user terminals 2-1 to 2-3 are present in a certain distance range, which is for example, a range of 2 m, the access authority control server 10 creates the location information by regarding the user terminals 2-1 to 2-3 as one group G1.

In this case, the location ID p0001 is assigned to the user IDs u0001, u0002, and u0003, and the location information indicating that the user IDs u0001, u0002, and u0003, and the location ID p0001 are caused to correspond to each other is created and registered as illustrated in a location information table T2-3.

After the creation of the location information, a folder is created for the group G1 of the user IDs u0001, u0002, and u0003, and access authority is given to each user in the group G1.

Now, it is assumed that the user terminal 2-4 approaches the user terminal 2-3 and the distance between the user terminal 2-3 and the user terminal 2-4 becomes within a certain distance range. That is, it is assumed in the case of this example that the distance between the user terminal 2-3 and the user terminal 2-4 becomes within 2 m.

When the access authority control server 10 recognizes by a position detection function that the distance between the user terminal 2-3 and the user terminal 2-4 becomes within the certain distance range, the access authority control server 10 causes the user terminal 2-4 to join the group G1 and creates the location information that includes the user terminal 2-4.

In this case, the location information in which the user IDs u0001, u0002, u0003, and u0004, and the location ID p0001 are caused to correspond to each other is created and registered as illustrated in a location information table T2-4. After the creation of the location information, a folder is created for the group G1 of the user IDs u0001, u0002, u0003, and u0004, and access authority is given to each user in the group G1.

Then, it is assumed that the user terminal 2-3 leaves the group G1 and moves out of the certain distance range. That is, it is assumed in the case of this example that the distance from the user terminal 2-3 to each of the user terminals 2-1, 2-2, and 2-4 exceeds 2 m.

When the access authority control server 10 recognizes by the position detection function that the user terminal 2-3 has moved out of the certain distance range, the access authority control server 10 removes the user terminal 2-3 from the group G1 and creates the location information that does not include the user terminal 2-3.

In this case, the location information in which the user IDs u0001, u0002, and u0004, and the location ID p0001 are caused to correspond to each other is created and registered as illustrated in a location information table T2-5. After the creation of the location information, a folder is created for the group G1 of the user IDs u0001, u0002, and u0004, and access authority is given to each user in the group G1.

When the user terminals are divided into a plurality of groups, it may be determined to cause the folder to belong to one of the groups. Alternatively, an owner may be set and the folder may be caused to correspond to the owner. In setting the owner, for example, a user that places a file into the folder first may be set as the owner.

Figure 37:
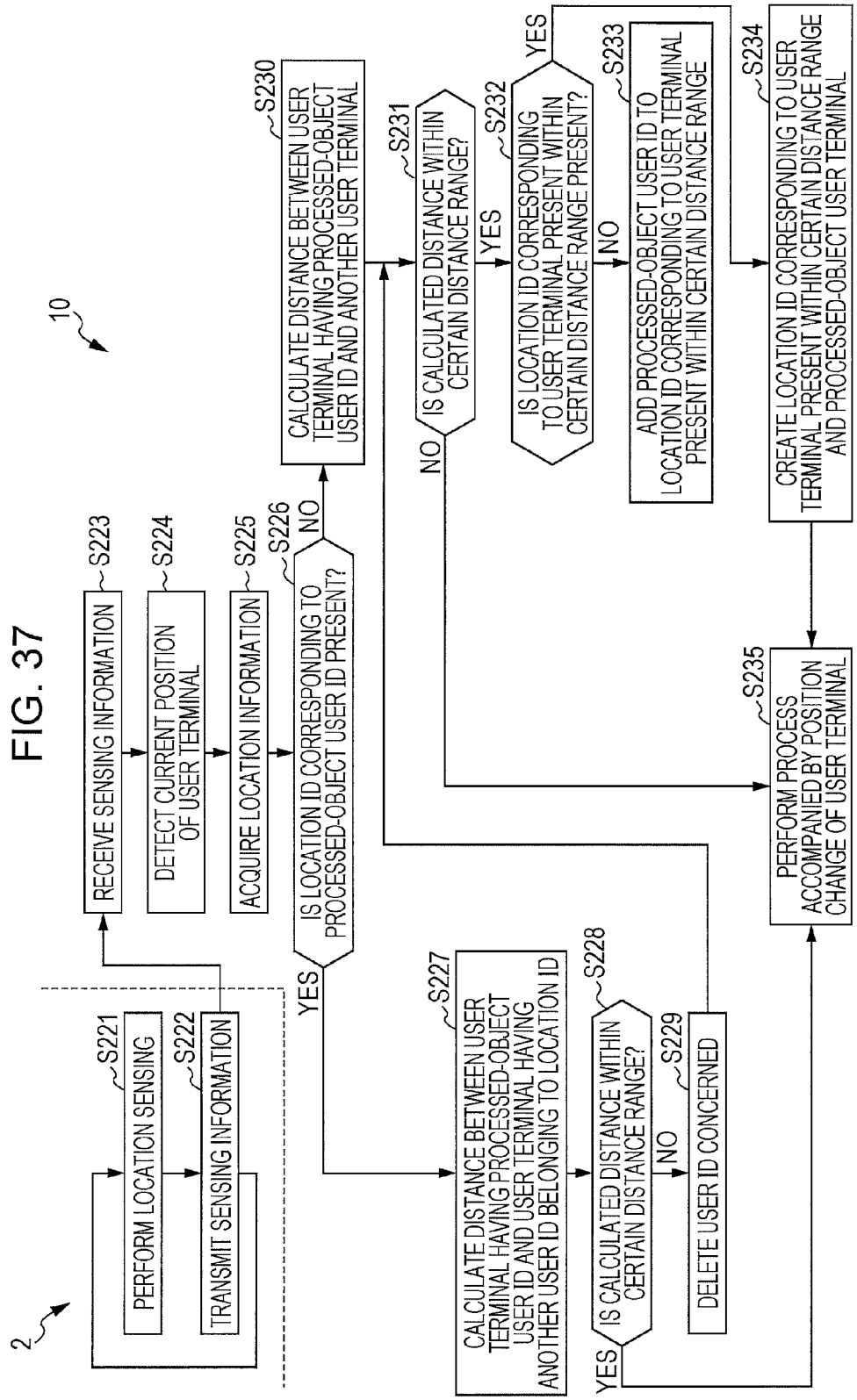
FIG. 37 is a flowchart illustrating operations of creating location information according to the third variation.

FIG. 37 is a flowchart illustrating operations of creating location information according to a third variation.

[S221] The user terminal 2 performs location sensing regarding the location in which the user terminal 2 is positioned and acquires sensing information.

[S222] The user terminal 2 transmits the acquired sensing information to the access authority control server 10 together with the user ID.

[S223] The sensing information reception part 11 in the access authority control server 10 receives the sensing information and the user ID transmitted from the user terminal 2.

[S224] The location detection part 12 detects the location in which the user terminal 2 is currently positioned based on the sensing information and the information registered in the sensing location correspondence information table T1.

[S225] The access authority control server 10 acquires the location information from the location information table T2.

[S226] The access authority control server 10 determines whether or not the location ID corresponding to the received user ID, which is a processed-object user ID, is present. When the location ID corresponding to the received user ID is present, the process proceeds to step S227. When the location ID corresponding to the received user ID is not present, the process proceeds to step S230.

[S227] The access authority control server 10 calculates a distance from a user terminal having another user ID that belongs to the location ID.

[S228] The access authority control server 10 determines whether or not the calculated distance is within a certain distance range that has been set in advance. When the calculated distance is within the certain distance range, the process proceeds to step S235. When the calculated distance is not within the certain distance range, the process proceeds to step S229.

[S229] The access authority control server 10 deletes the user ID concerned from the location information. When no user ID is left in the location information, the location ID concerned is also deleted. Then, the process proceeds to step S231.

[S230] The access authority control server 10 calculates a distance between the user terminal having the received user ID and another user terminal.

[S231] The access authority control server 10 determines whether or not the calculated distance is within a certain distance range that has been set in advance. When the calculated distance is within the certain distance range, the process proceeds to step S232. When the calculated distance is not within the certain distance range, the process proceeds to step S235.

[S232] The access authority control server 10 determines whether or not the location ID corresponding to the user terminal present within the certain distance range is present. When the location ID is present, the process proceeds to step S234. When the location ID is not present, the process proceeds to step S233.

[S233] The access authority control server 10 adds the received user ID to the location ID corresponding to the user terminal present within the certain distance range and updates the location information.

[S234] The access authority control server 10 creates a location ID corresponding to the user terminal present within the certain distance range and the user terminal of the received user ID and updates the location information.

[S235] A process accompanied by the position change of the user terminal is performed. That is, in step S235, the operation of step S6 and the operations after step S6 in FIG. 9 are performed.

As described above, in the third variation, the access authority control server 10 calculates distances among a plurality of user terminals based on the positions of the user terminals. Then, based on the calculated distances, the access authority control server 10 regards the user terminals present within a certain distance range as a group, and creates a folder for which access authority is given to the user terminals included in the group. Thus, even when a user does not specify a location, the location is set flexibly between adjacent users and a folder corresponding to the location may be created.

Next, the fourth variation is described with reference to FIGS. 38 to 41. In the above-described variation, the location in which the user terminal is positioned is a physical location, which actually exists. However, in the fourth variation, the location in which the user terminal is positioned is a logical location, which is for example, a name of a meeting.

In this case, it is assumed that the user terminal checks in at and checks out of the logical location specified by a user, that is, enters and leaves the logical location, and the logical location, which the user terminal checks in at and checks out of, is transmitted to the access authority control server 10.

The access authority control server 10 performs an updating process on the location information based on the logical location transmitted from the user terminal. Since the logical location is defined in a logical location information table in advance, the logical location may be treated in the access authority control server 10 as similar to the physical location.

FIG. 38 illustrates a configuration example of a logical location information table T13. The access authority control server 10 includes the logical location information table T13. The logical location information table T13 includes items of a location ID and a logical location.

In the example of FIG. 38, a departmental meeting as a logical location is caused to correspond to the location ID p0001, a sales promotion meeting as a logical location is caused to correspond to the location ID p0002, and a patent review meeting as a logical location is caused to correspond to the location ID p0003.

Figure 39:
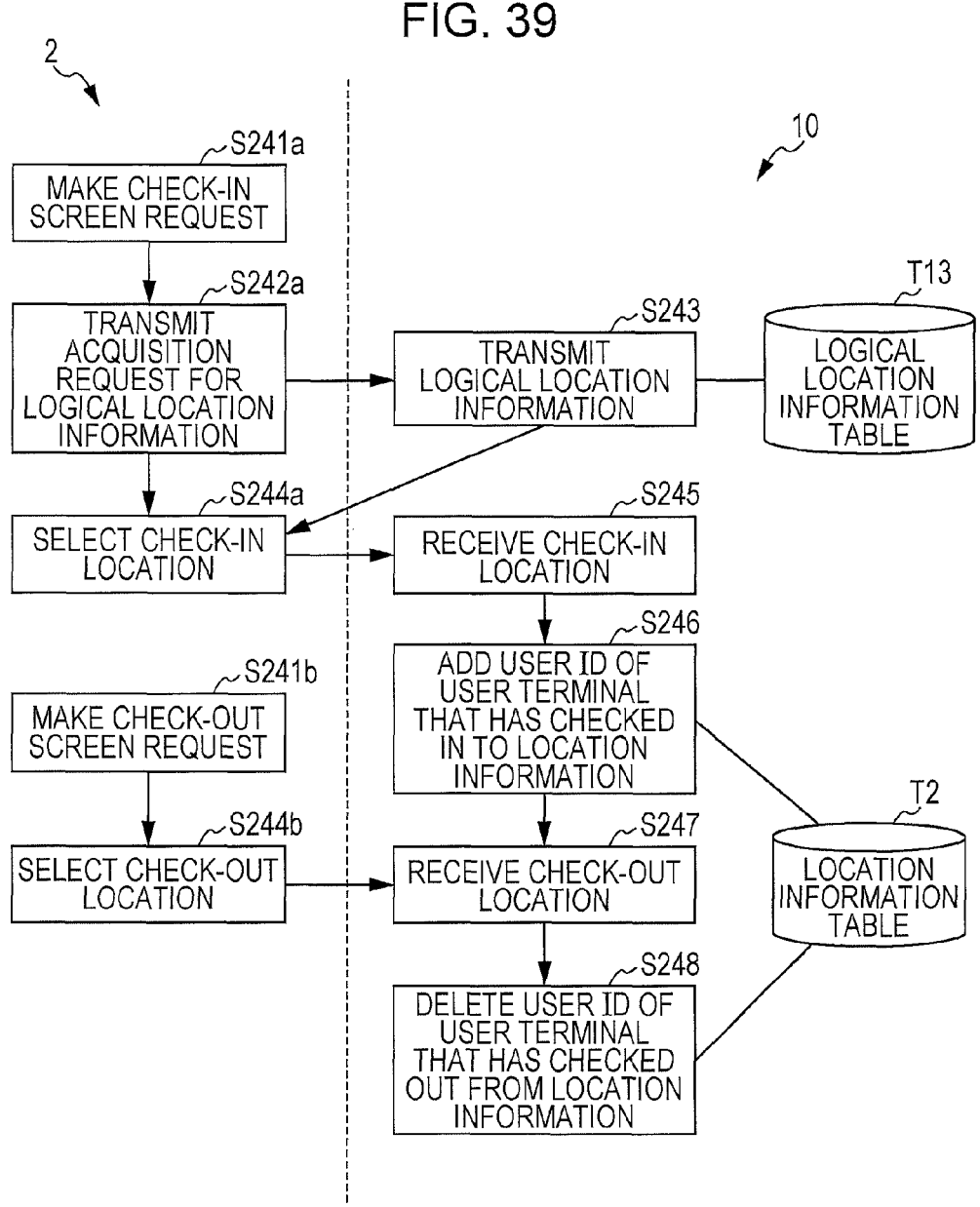
FIG. 39 is a flowchart illustrating operations of updating location information according to a fourth variation.

FIG. 39 is a flowchart illustrating operations of updating location information according to the fourth variation.

[S241*a*] When the user terminal 2 checks in at a certain logical location, the user terminal 2 makes a check-in screen request based on a user's instruction and causes a check-in screen to be displayed.

[S242*a*] The user terminal 2 transmits an acquisition request for logical location information to the access authority control server 10.

[S243] The access authority control server 10 transmits the logical location information to the user terminal 2.

[S244*a*] The user terminal 2 selects the logical location at which the user terminal 2 checks in, that is, a check-in location based on the user's instruction. Specifically, the user terminal 2 selects the location ID of the check-in location. Then, the process proceeds to step S245.

[S241*b*] When the user terminal 2 checks out, the user terminal 2 makes a check-out screen request based on the user's instruction and causes a check-out screen to be displayed.

[S244*b*] The user terminal 2 selects the logical location of which the user terminal 2 checks out, that is, a check-out location based on the user's instruction. Then, the process proceeds to step S247.

[S245] The access authority control server 10 receives the location ID of the check-in location transmitted from the user terminal 2.

[S246] The access authority control server 10 adds the user ID of the user terminal 2 that has checked in to the user ID cell corresponding to the received location ID by referring to the location information table T2 and updates the location information.

[S247] The access authority control server 10 receives the location ID of the check-out location transmitted from the user terminal 2.

[S248] The access authority control server 10 deletes the user ID of the user terminal 2 that has checked out from the user ID cell corresponding to the received location ID by referring to the location information table T2 and updates the location information.

Although in the description above, the check-in and the check-out are based on a user's instruction, the check-in and the check-out may be recognized with a sensor provided in the logical location.

Next, the creation and indication of user list information according to the fourth variation is described. The access authority control server 10 creates the user list information on the user that has checked in at a logical location and transmits the user list information to the user terminal 2.

FIG. 40 illustrates a configuration example of a user list information table T14. The access authority control server 10 includes the user list information table T14. The user list information table T14 includes items of a user ID, a name indicating the name of a user, and an icon URL.

Figure 41:
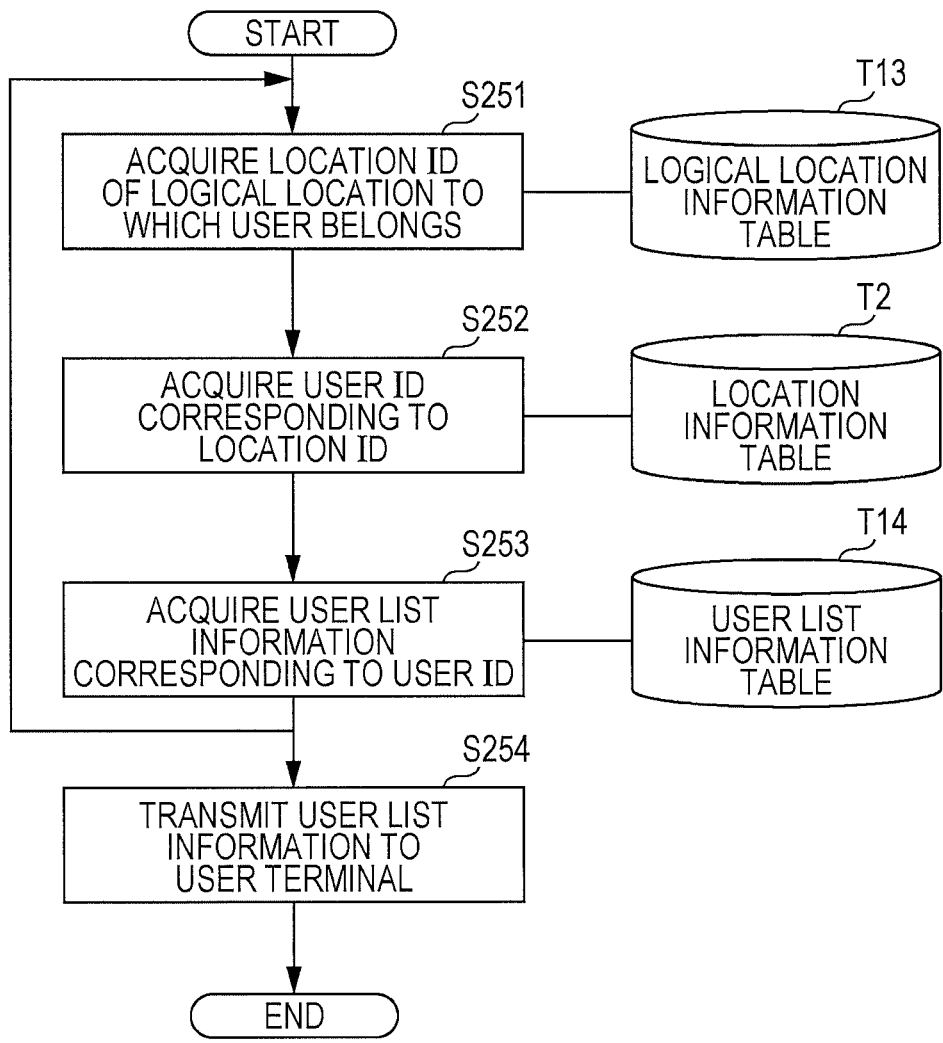
FIG. 41 is a flowchart illustrating operations of indicating user list information.

FIG. 41 is a flowchart illustrating operations of indicating the user list information.

[S251] The access authority control server 10 acquires a location ID of the logical location to which a user belongs to by referring to the logical location information table T13.

[S252] The access authority control server 10 acquires the user ID of the user that belongs to the location of the acquired location ID by referring to the location information table T2.

[S253] The access authority control server 10 acquires the user list information corresponding to the acquired user ID by referring to the user list information table T14.

[S254] The access authority control server 10 transmits the acquired user list information to the user terminal 2. The acquisition operations of steps S251 to S253 are performed at certain period intervals.

As described above, in the fourth variation, the access authority control server 10 recognizes the logical location specified by a user terminal and creates a folder for which access authority is given to the user terminal present in the logical location. Thus, a folder corresponding to not only a physical location but to a logical location, such as a name of a meeting, may also be created.

When using a physical location that actually exists, attendees may be visually checked. However, when using a logical location, it may be impossible to visually check attendees. Accordingly, in the fourth variation, when a logical location is set by a user terminal, the access authority control server 10 creates a list of the users that have checked in at the logical location, which includes a name or a photograph of a face, and transmits the list to the user terminal. Thus, the user may easily check the attendees even in a logical location.

In contrast, although in the description above, the location is defined as a physical location or a logical location, the location may be set to be hierarchical. For example, the access authority control server 10 organizes the location into levels in the order of the name of a building, the floor number, and the room number, such as Office Building A>5th Floor>Room 501, causes the location ID to correspond to the hierarchical location, and manages the hierarchical location and the location ID. In this case, for example, when a user terminal enters Room 501, three folders may be created with respect to Office Building A, 5th Floor, and Room 501.

Next, the fifth variation is described with reference to FIGS. 42 to 45. For example, it may happen that a user attending a plurality of meetings in parallel wants to access a folder from another location by leaving the previous location. In the fifth variation, even when a user who was utilizing a folder in a certain location leaves the location once, the user may access the folder from another location under certain restrictions.

Specifically, even when the user moves out of the location to which access authority is given for the folder, authority to access the folder concerned is lent to the user who has moved out and the user is enabled to access the folder also from the outside of the location.

Figure 42:
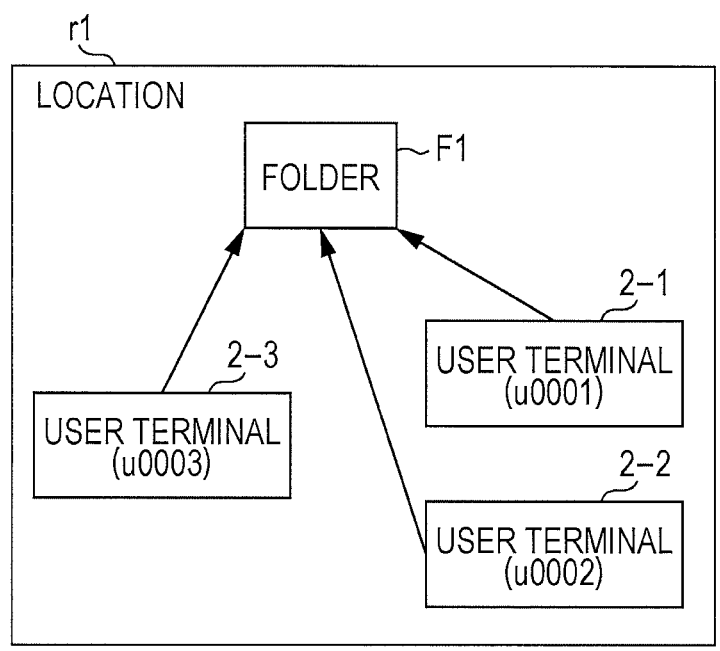
FIG. 42 is an illustration for explaining operations according to a fifth variation.

FIGS. 42 and 43 are illustrations for explaining operations according to the fifth variation. In FIG. 42, it is assumed that the user terminals 2-1 to 2-3 are present in the location r1 having the location ID p0001 and the user terminals 2-1 to 2-3 have access authority for the folder F1.

In FIG. 43, it is assumed that the user terminal 2-1 leaves the location r1 once and accesses the folder F1 from another location. In this case, the user terminal 2-1 borrows authority from one of the other user terminals 2-2 to 2-4 that belong to the same location r1 so as to be able to access the folder F1 also from the outside of the location r1. For example, the user terminal 2-2 lends the authority to the user terminal 2-1. That is, the user terminal 2-2 is an authority lending user.

The user terminal 2-2 has become the authority lending user who lends the user terminal 2-1 the authority with which the folder F1 is accessible also from the outside of the location r1 and then, the user terminal 2-1 is enabled to access the folder F1 also from the outside of the location r1.

However, the lending period of the authority is set to be a period during which the authority lending user belongs to the location r1. That is, when the user terminal 2-2 that lends the authority to the user terminal 2-1 moves out of the location r1, the authority vanishes and the user terminal 2-1 is unable to access the folder F1 from the outside of the location r1.

FIG. 44 illustrates a configuration example of an authority lending information table T15. The access authority control server 10 includes the authority lending information table T15. The authority lending information table T15 includes items of an authority borrowing user ID and an authority lending user ID.

In the case of FIG. 44, the user having the user ID u0001 corresponds to the user terminal 2-1 in FIGS. 43 and 44. The user having the user ID u0002 corresponds to the user terminal 2-2 in FIGS. 43 and 44.

Figure 45:
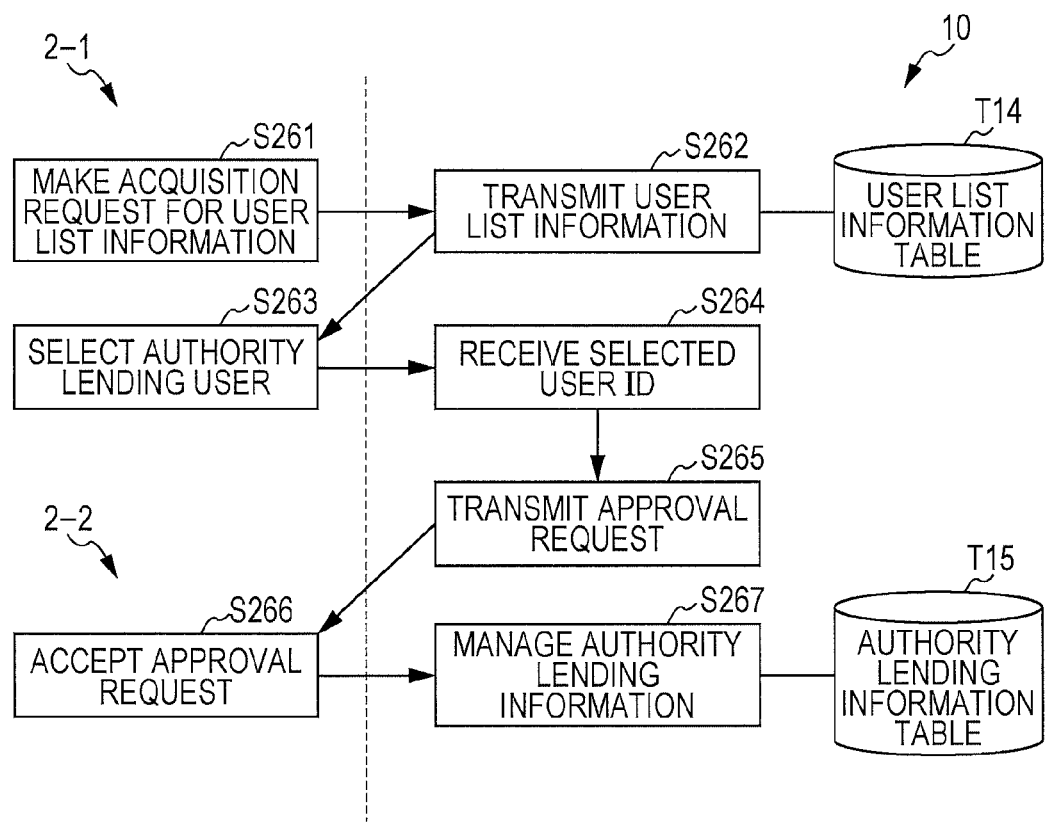
FIG. 45 is a flowchart illustrating operations of setting an authority lending user according to the fifth variation.

FIG. 45 is a flowchart illustrating operations of setting the authority lending user according to the fifth variation.

[S261] The user terminal 2-1 that wants to borrow authority requests user list information of another user terminal that belongs to the location in which the user terminal 2-1 is positioned from the access authority control server 10.

[S262] The access authority control server 10 transmits the requested user list information to the user terminal 2-1 by referring to the user list information table T14.

[S263] The user terminal 2-1 selects a user ID of a desirable authority lending user from users indicated in the received user list information and transmits the selected user ID to the access authority control server 10.

[S264] The access authority control server 10 receives the selected user ID.

[S265] The access authority control server 10 transmits an approval request for becoming an authority lending user to the user terminal 2-2 having the received user ID.

[S266] When the user terminal 2-2 to which the request for lending authority is transmitted accepts the approval request, the user terminal 2-2 transmits an approval request acceptance message to the access authority control server 10.

[S267] The access authority control server 10 causes the user ID of the user terminal 2-2, which is the authority lending user, and the user ID of the user terminal 2-1, which is the authority borrowing user, to be registered in the authority lending information table T15 and manages the user IDs.

When the access authority change notification is provided after that, the authority is also given to the user that has made the authority lending request by referring to the authority lending information as long as the user that grants the approval has the authority.

As described above, in the fifth variation, the access authority control server 10 requests a second user terminal present in a first location to lend authority when giving access authority for a folder created by causing the folder to correspond to the first location to a first user terminal positioned in a second location.

Then, the access authority control server 10 gives the access authority for the folder caused to correspond to the first location to the first user terminal while the second user terminal that has become the authority lending user after the lending of the authority had been accepted is present in the first location.

Thus, even when a user that has utilized a folder in a certain location leaves the location once, the folder is accessible from another location until the user that has lent the authority moves out of the location.

Next, the sixth variation is described with reference to FIGS. 46 to 48. For example, it may happen that a meeting is being held and the meeting is continued after moving to another location for reasons related to a location reservation or the like. In this case, according to the above-described variation, it may happen that the folder set for the location concerned is inaccessible when everyone moves. According the sixth variation, even when everyone moves, the folder set for the location before the move is accessible.

Figure 46:
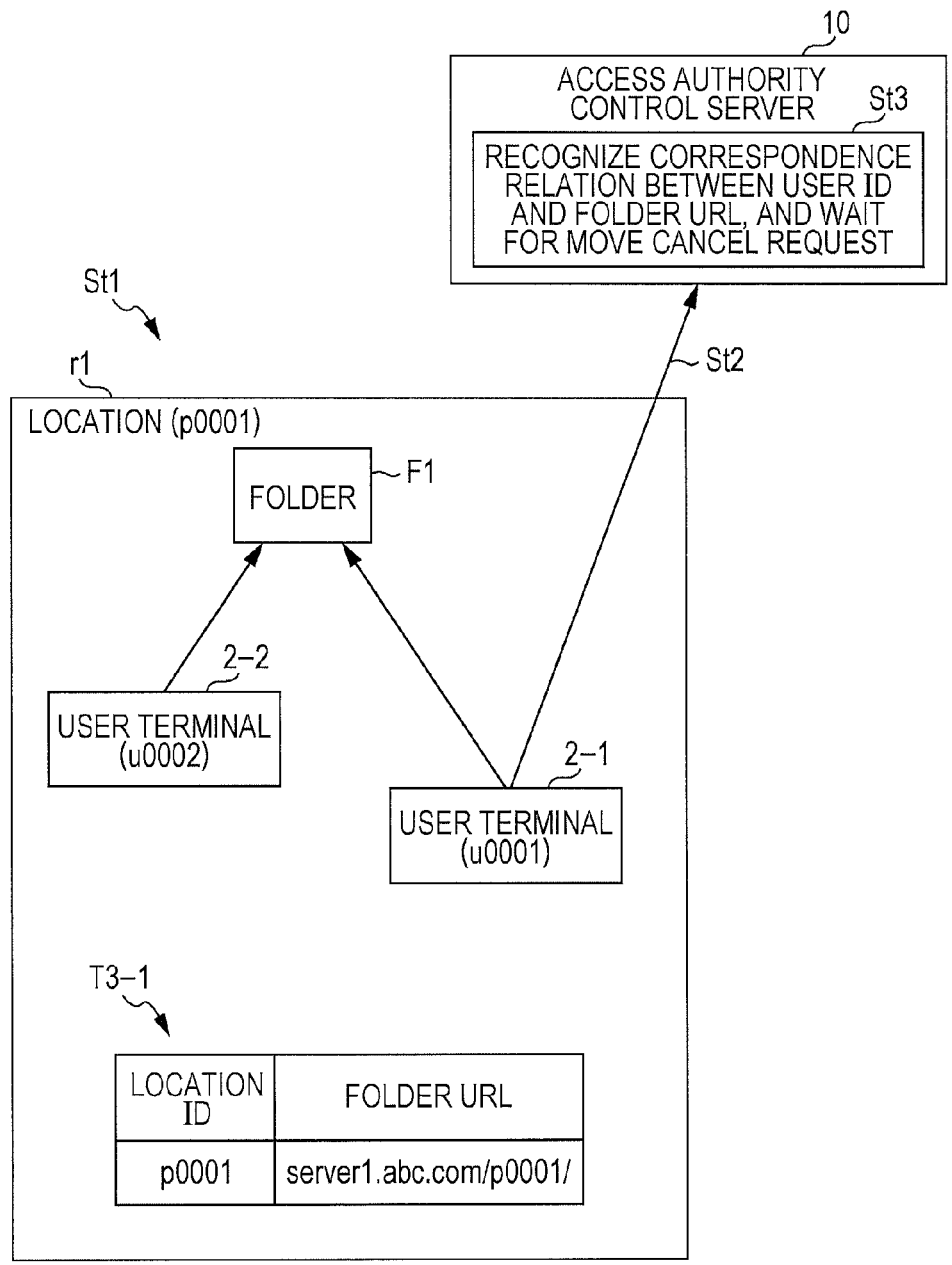
FIG. 46 is an illustration for explaining operations according to a sixth variation.
Figure 47:
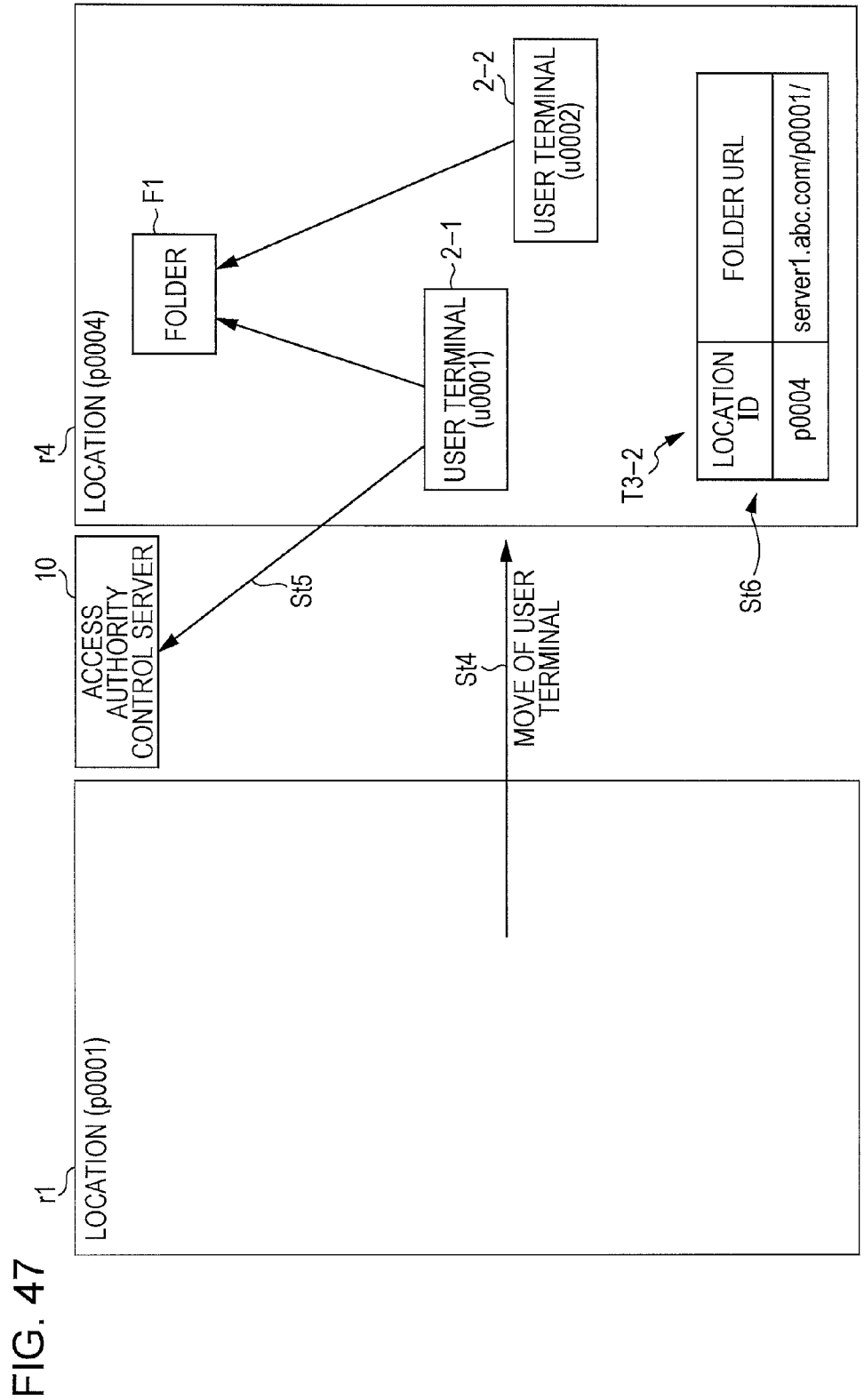
FIG. 47 is an illustration for explaining the operations according to the sixth variation.

FIGS. 46 and 47 are illustrations for explaining operations of the sixth variation.

[St1] The user terminals 2-1 and 2-2 are positioned in the location r1 of the location ID p0001 and the access authority for the folder F1, which is referred to as a source folder, is given to the user terminals 2-1 and 2-2. The registered contents of a location folder information table T3-1 indicate that the location ID p0001 and the folder URL server1.abc.com/p0001/are caused to correspond to each other in a state ST1.

It is assumed that when the user terminals 2-1 and 2-2 leave the location r1 and move to another location after that, which is a location r4, the user terminals 2-1 and 2-2 want to continue to use the folder F1 even after the move.

[St2] The user terminal 2-1 transmits a move request indicating that the user terminal 2-1 moves to the other location r4 from the location r1 in which the user terminal 2-1 is currently positioned to the access authority control server 10.

[St3] When the access authority control server 10 receives the move request, the access authority control server 10 recognizes a correspondence relation among the user IDs of the user terminals 2-1 and 2-2, the location ID of the location in which the user terminals 2-1 and 2-2 have been positioned, and the folder URL, and waits for a move cancel request transmitted from the user terminal 2-1 that has transmitted the move request.

[St4] The user terminals 2-1 and 2-2 leave the location r1 and move to the location r4.

[St5] The user terminal 2-1 transmits the move cancel request to the access authority control server 10 after the move.

[St6] When the access authority control server 10 receives the move cancel request, the access authority control server 10 sets the URL of the folder F1 for the location ID of the location r4 in which the user terminal that has transmitted the move cancel request with respect to the location folder information table T3-2. Since the access authority control server 10 detects the position of the user terminal 2-1, the location ID of the location after the move may be recognized.

As a result, the registered contents of the location folder information table T3 indicate that the location ID p0004 and the folder URL server1.abc.com/p0001/are caused to correspond to each other. Thus, the user terminals 2-1 and 2-2 are enabled to use the folder F1 that the user terminals 2-1 and 2-2 have used in the location r1 also in the location r2.

Figure 48:
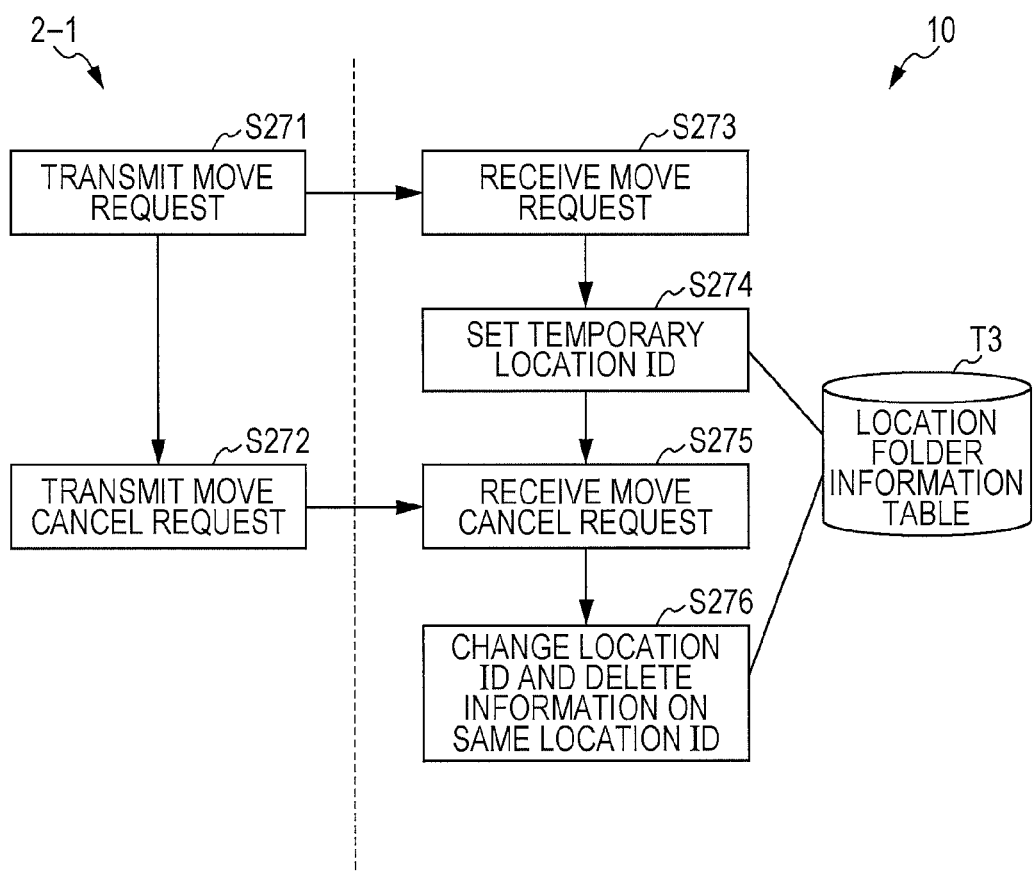
FIG. 48 is a flowchart illustrating operations of rewriting location folder information according to the sixth variation.

FIG. 48 is a flowchart illustrating operations of rewriting the location folder information according to the sixth variation.

[S271] When the user terminal 2-1 moves from the location r1 in which the user terminal 2-1 is currently positioned to the other location r4, the user terminal 2-1 transmits the move request to the access authority control server 10.

[S272] When the user terminal 2-1 finishes moving to the other location r4, the user terminal 2-1 transmits the move cancel request to the access authority control server 10.

[S273] The access authority control server 10 receives the move request.

[S274] The access authority control server 10 sets a value of a temporary location ID in the location ID cell of the folder URL indicating server1.abc.com/p0001/. Since as a result, another folder for a next meeting held in the previous location r1 is created during the move of the user, it is desired to set the value of the temporary location ID in the location folder information table T3 during the move of the user.

[S275] The access authority control server 10 receives the move cancel request.

[S276] The access authority control server 10 changes the temporary location ID to the location ID of the location r4 obtained after the move and deletes another folder URL of the same location ID as the location ID of the location r4.

As described above, in the sixth variation, when the access authority control server 10 receives the move request transmitted from the user terminal positioned in the first location, the access authority control server 10 recognizes the source folder, which is the folder created so as to correspond to the first location. Then, when the access authority control server 10 receives the move cancel request transmitted from the user terminal after the user terminal has moved to the second location, the access authority control server 10 causes the source folder to correspond to the second location.

In addition, the access authority control server 10 rewrites the correspondence relation between the first location and the source folder into the correspondence relation between the second location and the source folder. As a result, even when everyone moves from a certain location, the folder set for the location before the move is accessible.

Next, the seventh variation is described with reference to FIGS. 49 to 51. For example, when a meeting is being held in one location, it may happen that members are divided into small groups and each of the groups wants to continue the meeting in another location using a previous meeting material continuously. According to the seventh variation, when a small group moves to another location, a folder of a previous meeting may be accessed and continuously used.

Figure 49:
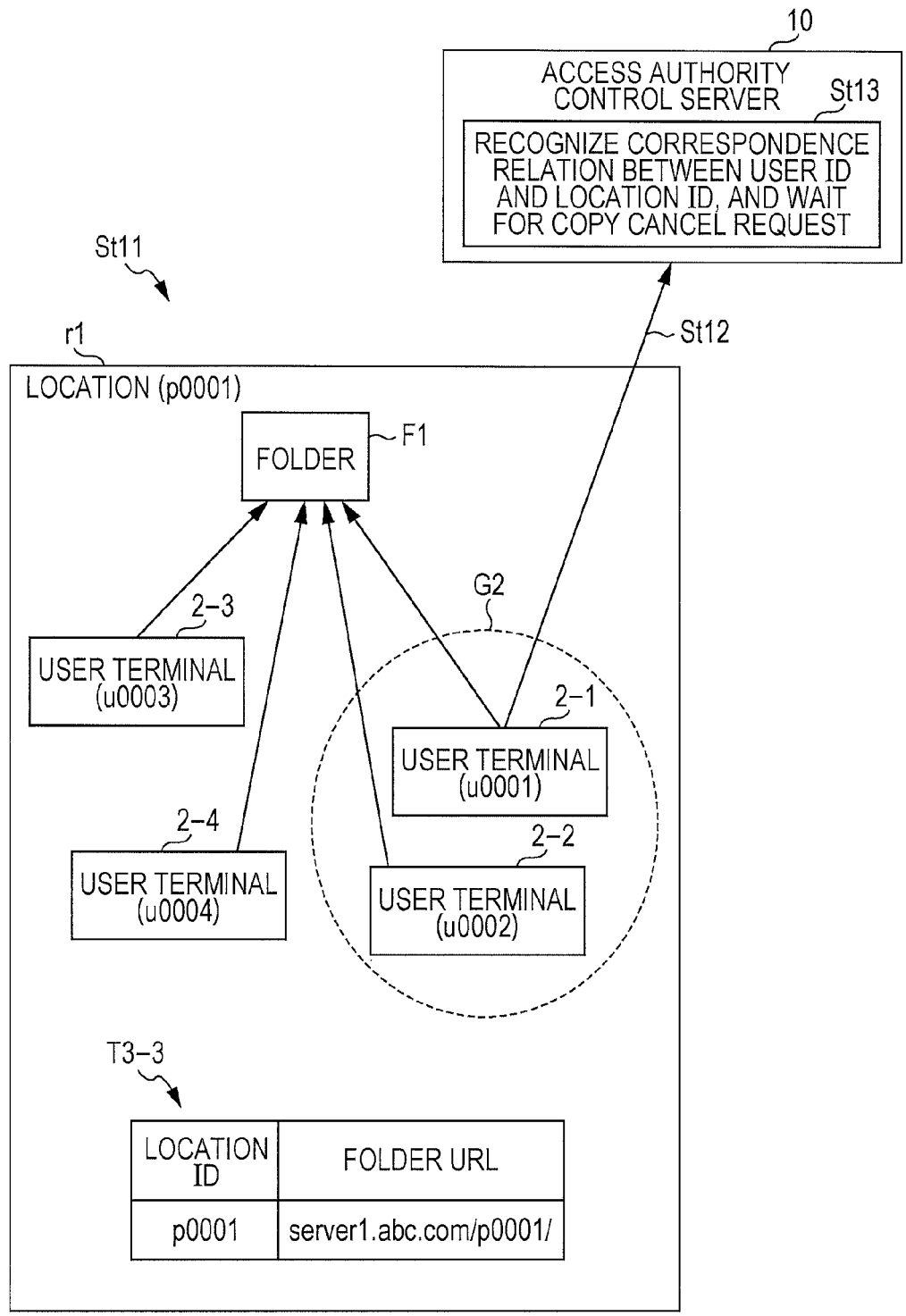
FIG. 49 is an illustration for explaining operations according to a seventh variation.
Figure 50:
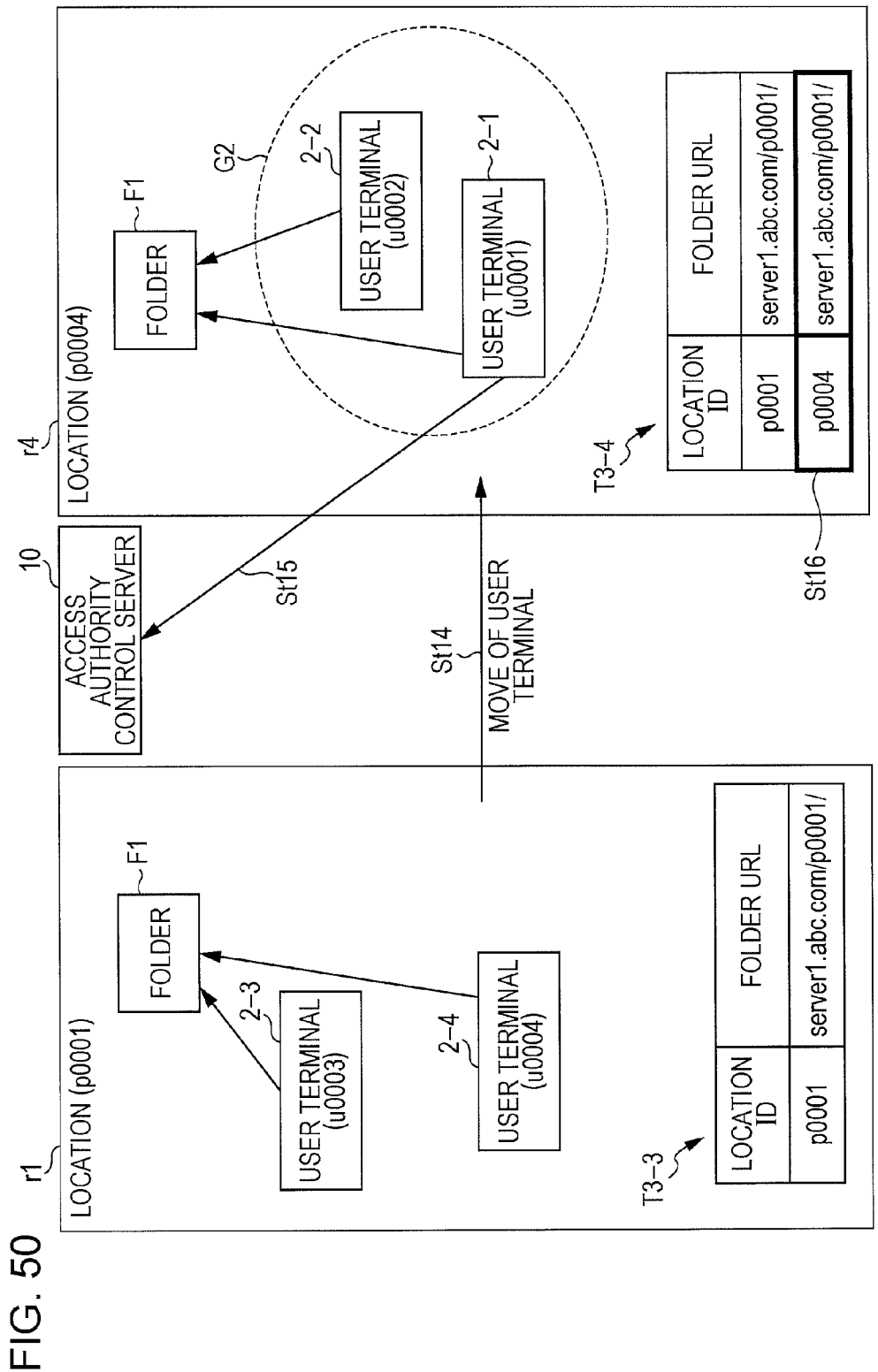
FIG. 50 is an illustration for explaining the operations according to the seventh variation.

FIGS. 49 and 50 are illustrations for explaining operations according to the seventh variation.

[St11] The user terminals 2-1 to 2-4 are positioned in the location r1 having the location ID p0001 and the access authority for the folder F1, which is a copied-object folder, is given to the user terminals 2-1 to 2-4. The registered contents of a location folder information table T3-3 indicate that the location ID p0001 and the folder URL server1.abc.com/p0001/are caused to correspond to each other.

It is assumed that after that, a group G2 of the user terminals 2-1 and 2-2 leaves the location r1, moves to another location, which is for example, the location r4, and continues the same meeting. It is also assumed that the user terminals 2-1 and 2-2 want to continue to use the folder F1 also in the location r4.

[St12] The user terminal 2-1 in the group G2 transmits a copy request of the folder F1 to the access authority control server 10.

[St13] When the access authority control server 10 receives the copy request, the access authority control server 10 recognizes a correspondence relation among the user IDs of the user terminals 2-1 and 2-2, the location ID of the location r1 in which the user terminals 2-1 and 2-2 are positioned, and the folder URL, and waits for a copy cancel request transmitted from the user terminal 2-1 that has transmitted the copy request.

[St14] The user terminals 2-1 and 2-2 of the group G2 leave the location r1 and move to the location r4.

[St15] The user terminal 2-1 transmits the copy cancel request to the access authority control server 10 after the move.

[St16] When the access authority control server 10 receives the copy cancel request, the access authority control server 10 recognizes the location ID p0004 of the location r4 in which the user terminal 2-1 is positioned. Then, the access authority control server 10 adds the correspondence relation between the location ID p0004 and the folder URL server1.abc.com/p0001/to a location folder information table T3-4. As a result, even when the user terminals 2-1 and 2-2 of the group G2 move to another location, the folder of the previous meeting may be accessed and continuously used.

Figure 51:
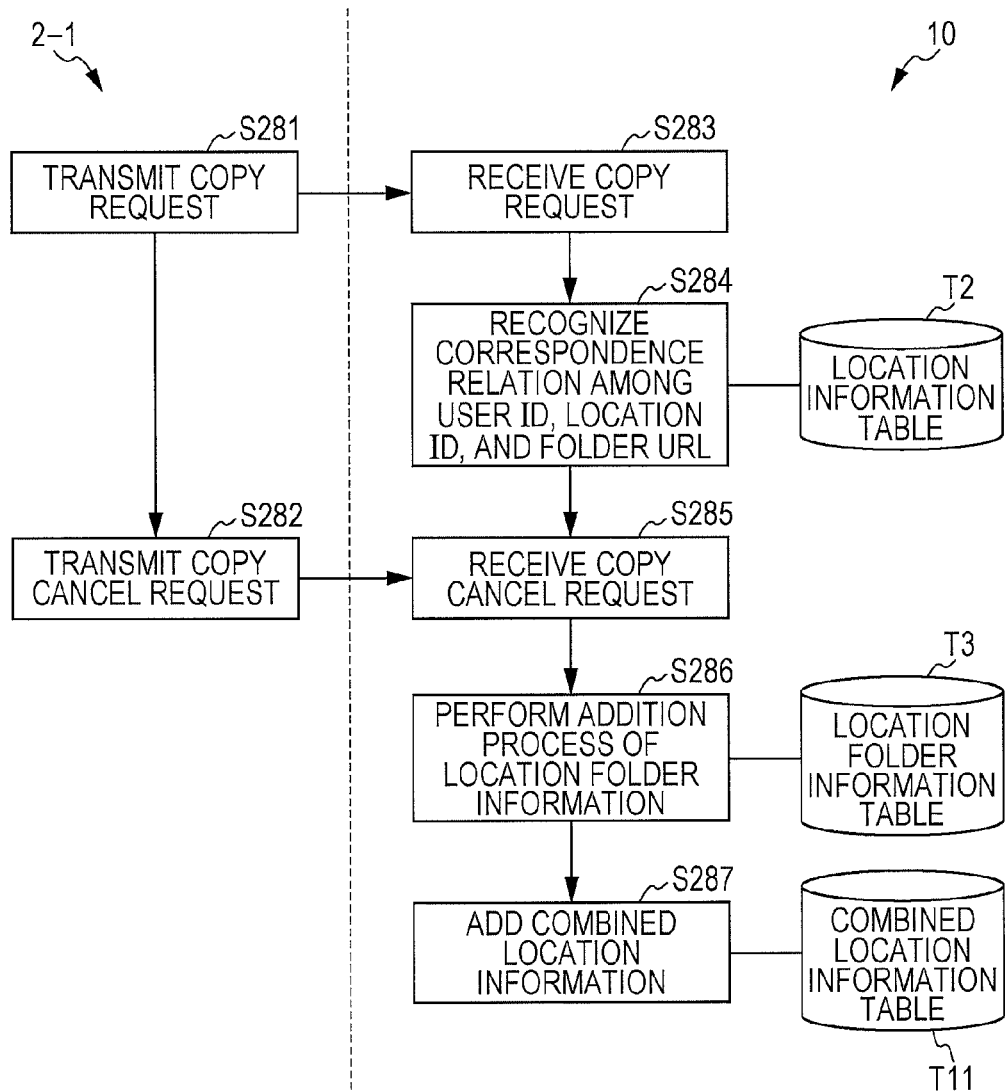
FIG. 51 is a flowchart illustrating operations of adding location folder information according to the seventh variation.

FIG. 51 is a flowchart illustrating operation of adding the location folder information according to the seventh variation.

[S281] The user terminal 2-1 moves from the location r1 in which the user terminal 2-1 is currently positioned and moves to the location r4, and transmits the copy request to the access authority control server 10 when the folder F1 used in the location r1 is also used in the location r4.

[S282] When the user terminal 2-1 finishes moving to the other location r4, the user terminal 2-1 transmits a copy cancel request to the access authority control server 10.

[S283] The access authority control server 10 receives the copy request.

[S284] The access authority control server 10 recognizes a correspondence relation among the user ID, the location ID, and the folder URL.

[S285] The access authority control server 10 receives a copy cancel request.

[S286] The access authority control server 10 recognizes the location ID p0004 of the location r4 in which the user terminal 2-1 is positioned. Then, the access authority control server 10 adds the correspondence relation between the location ID p0004 and the folder URL server1.abc.com/p0001/to the location folder information table T3.

[S287] The access authority control server 10 adds the location ID before the move, that is, before the user terminal has transmitted the copy request, and the location ID after the move, that is, after the user terminal has transmitted the copy cancel request, to the combined location information table T11 and manages the location IDs.

As described above, in the seventh variation, when the access authority control server 10 receives the copy request transmitted from the user terminal positioned in the first location, the access authority control server 10 recognizes the copied-object folder, which is the folder created so as to correspond to the first location.

Then, when the access authority control server 10 receives the copy cancel request transmitted from the user terminal after the user terminal has moved to the second location, the access authority control server 10 causes the copied-object folder to correspond to the second location.

Further, the access authority control server 10 adds the correspondence relation between the second location and the copied-object folder to the correspondence relation between the location and the folder. As a result, even when a small group moves to another location, the folder of the previous meeting may be accessed and continuously used.

Next, the eighth variation is described with reference to FIGS. 52 and 53. According to the eighth variation, before a user enters a meeting room, copy of a file into a folder for the meeting room concerned is reserved in advance.

Figure 52:
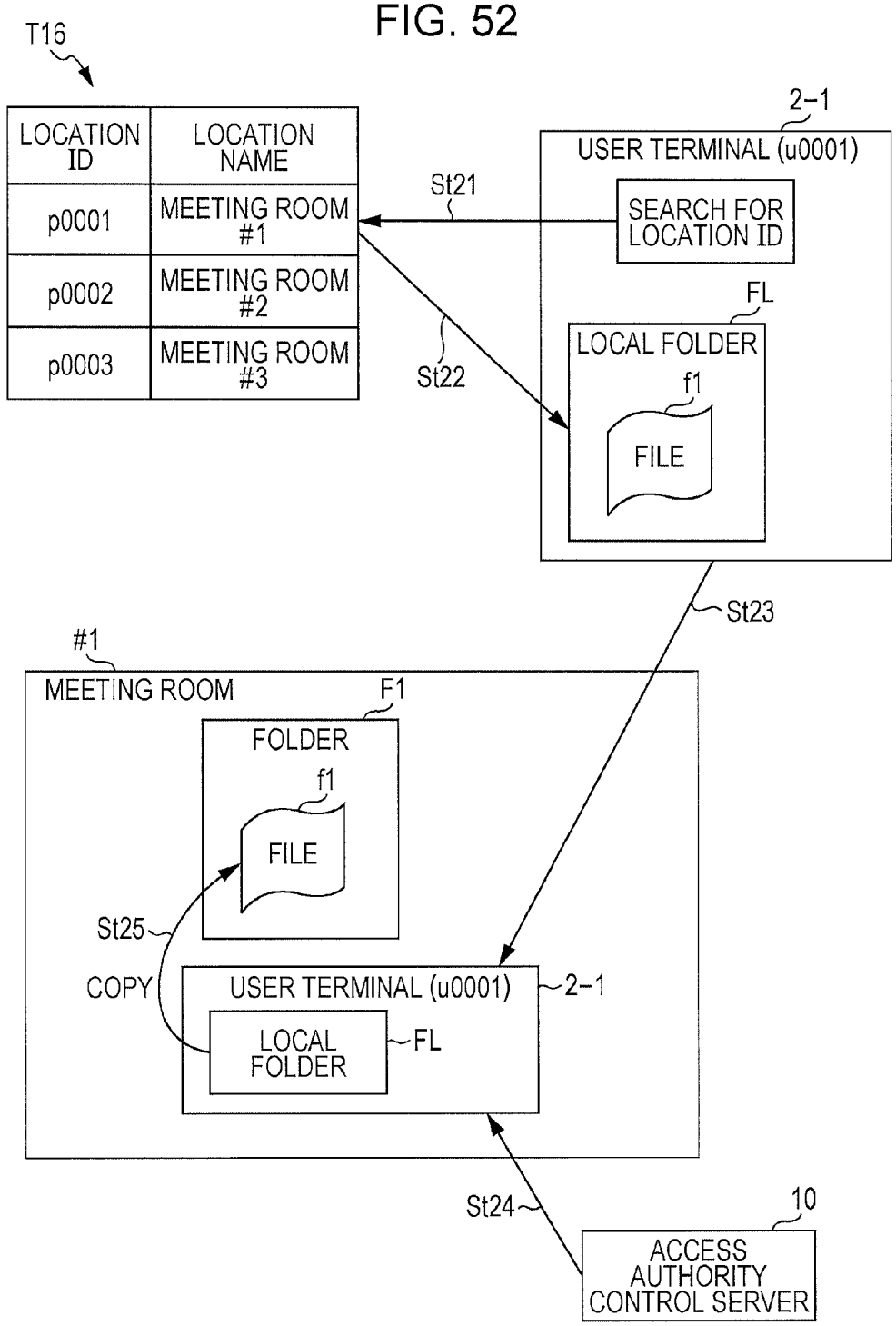
FIG. 52 is an illustration for explaining operations according to an eighth variation.

FIG. 52 is an illustration for explaining operations according to the eighth variation.

[St21] The user terminal 2-1 causes a location information list to be indicated and searches for a location ID based on a location name specified by a user. It is assumed that the meeting room #1 is specified and the user terminal 2-1 searches for the location ID p0001.

The access authority control server 10 includes a location list information table T16. The location list information table T16 includes items of a location ID and a location name, and manages a correspondence relation between the location ID and the location name.

[St22] The user terminal 2-1 creates a local folder FL corresponding to the location ID p0001 that the user terminal 2-1 has searched for, and sets a file f0 based on the user's instruction for the local folder FL.

[St23] The user terminal 2-1 moves to the meeting room #1.

[St24] When the access authority control server 10 recognizes that the user terminal 2-1 is positioned in the meeting room #1, the access authority control server 10 notifies the user terminal 2-1 of the location ID of the meeting room #1 and the folder URL by referring to the location folder information table T3.

[St25] The access authority control server 10 copies a file f1 placed in the local folder FL into the folder F1 having the folder URL.

Figure 53:
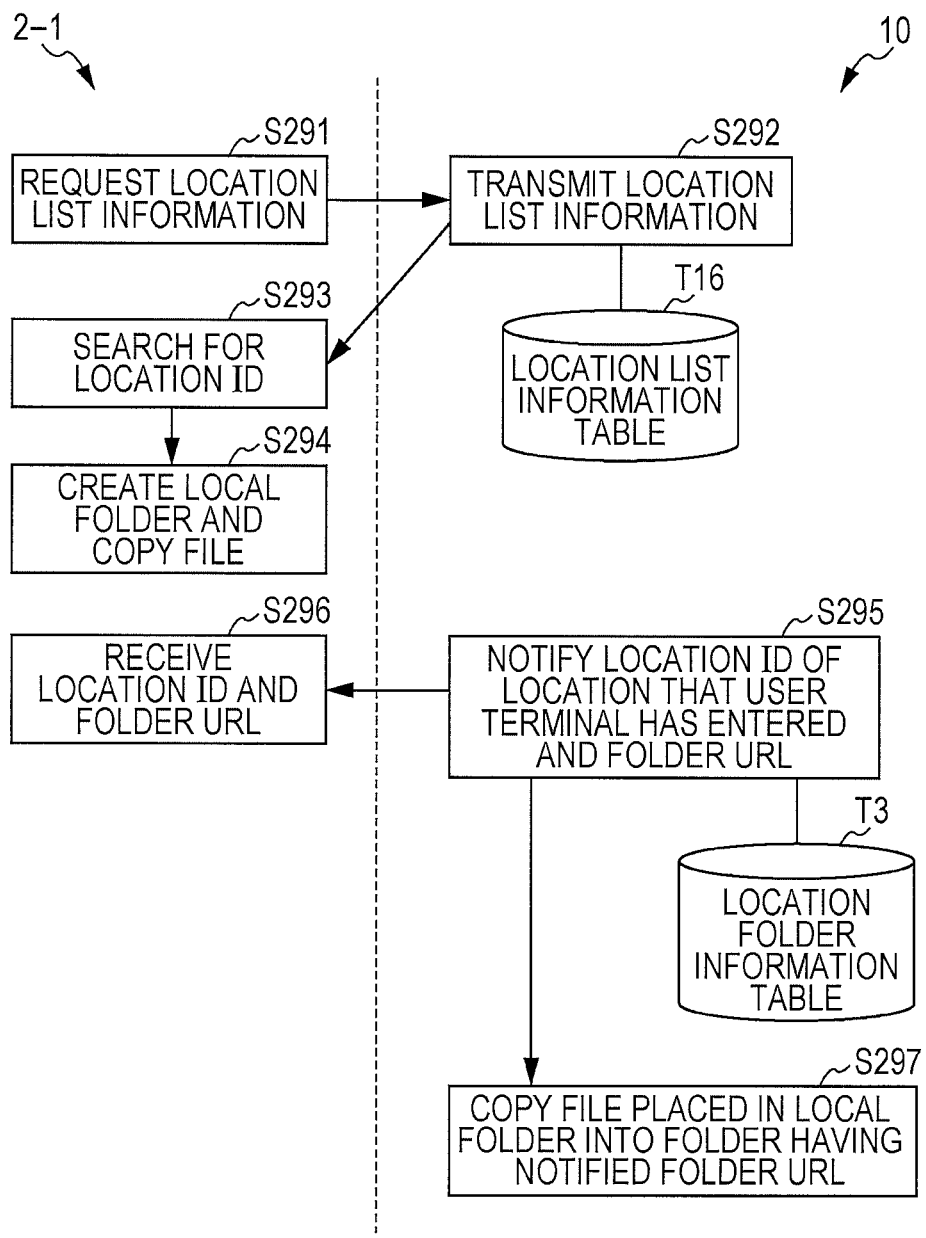
FIG. 53 is a flowchart illustrating the operations according to the eighth variation.

FIG. 53 is a flowchart illustrating operations according to the eighth variation.

[S291] The user terminal 2-1 requests location list information from the access authority control server 10.

[S292] The access authority control server 10 refers to the location list information table T16 and transmits the location list information to the user terminal 2-1.

[S293] The user terminal 2-1 causes the location list information to be indicated and searches for the location ID based on the location name specified by the user. It is assumed that the meeting room #1 is specified and the user terminal 2-1 searches for the location ID p0001.

[S294] The user terminal 2-1 creates the local folder FL corresponding to the location ID p0001 that the user terminal 2-1 has searched for and copies the file f1 based on the user's instruction into the local folder FL.

[S295] When the access authority control server 10 recognizes that the user terminal 2-1 is positioned in the meeting room #1, the access authority control server 10 reserves folder creation and notifies the user terminal 2-1 of the location ID of the meeting room #1 and the folder URL by referring to the location folder information table T3.

[S296] The user terminal 2-1 receives the location ID and the folder URL.

[S297] The access authority control server 10 copies the file f1 placed in the local folder FL of the user terminal 2-1 into the folder F1 having the notified folder URL.

As described above, according to the eighth variation, when a location is specified by a user terminal, the access authority control server 10 reserves the creation of a folder caused to correspond to the location, and when the access authority control server 10 recognizes that the user terminal enters the location, the access authority control server 10 copies a file stored in a local folder of the user terminal into the folder caused to correspond to the location. As a result, a user is enabled to reserve the copy of a file into a folder for a meeting room in advance before entering the meeting room.

In the description above, a timing of one certain user's entrance or a timing at which no user is left is based as an example of a timing for creating and deleting a shared folder. However, a plurality of people may be based by using, for example, a timing of two users' entrance or a timing at which the number of users who are left becomes two or less. Also, time may be included in the conditions by, for example, performing the creation and the deletion after a certain period of time has passed.

In addition, the description above is made by taking a meeting as an example. However, use on another scene is also possible. For example, it is possible that RF tags are placed at a street corner or a tourist site and access authority is added only to people who touch the RF tags, and then a folder corresponding to the location is accessed to view some information. Further, use for a purpose, such as exchanging pictures taken by each when people gather together, is also possible by utilizing the second variation or the like.

Figure 54:
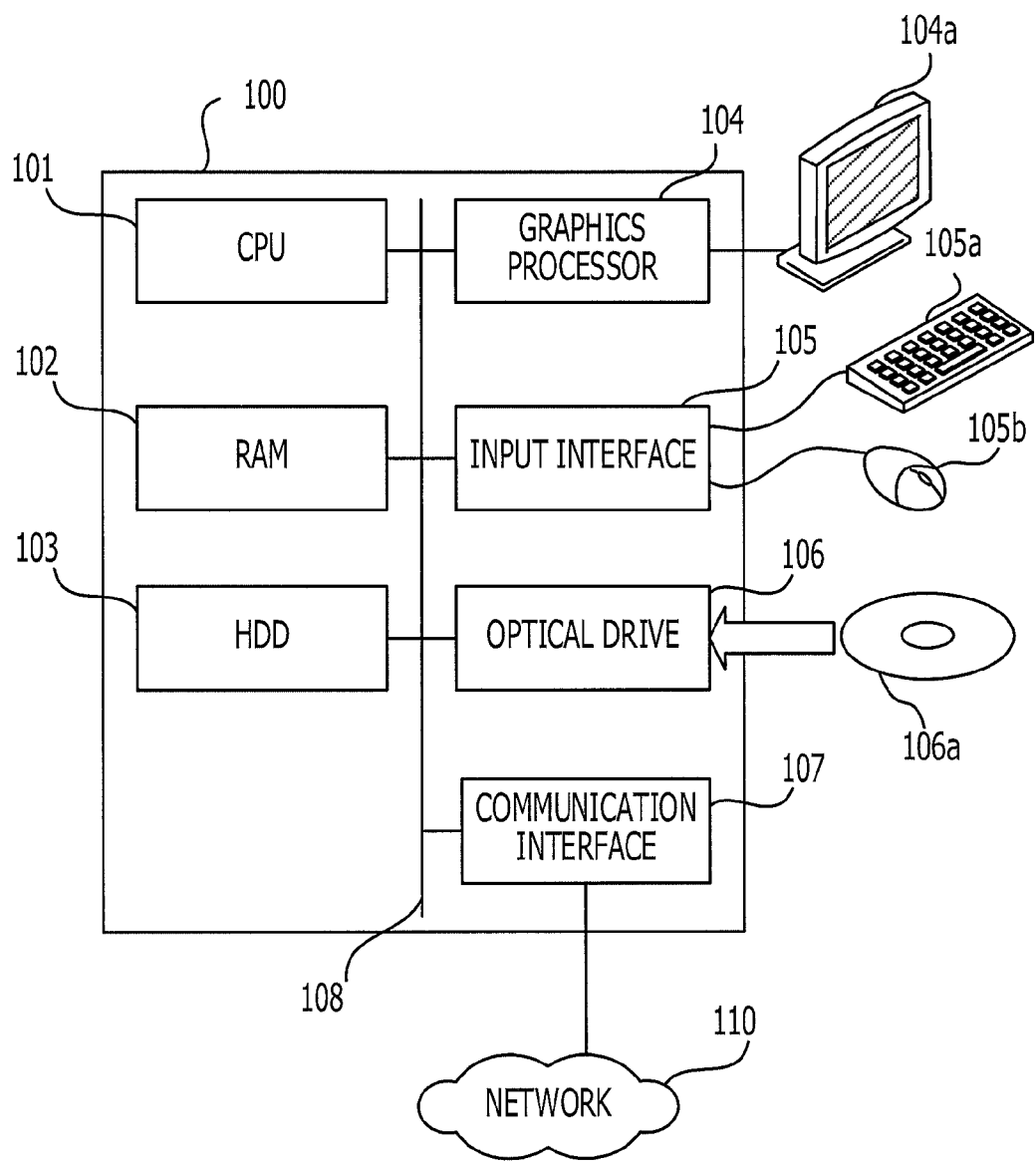
FIG. 54 illustrates an example of a hardware configuration of a computer used in an embodiment.

The above-described processing functions may be implemented using a computer. FIG. 54 illustrates an example of a hardware configuration of a computer 100 used in the present embodiment. The whole of the computer 100 is controlled by a central processing unit (CPU) 101. Random access memory (RAM) 102 and a plurality of peripheral devices are coupled to the CPU 101 via a bus 108.

The RAM 102 is used as primary memory of the computer 100. A program of an operating system (OS) or an application program that the CPU 101 is caused to execute is at least partially stored in the RAM 102 temporarily. Further, various data for processes performed by the CPU 101 are stored in the RAM 102.

Examples of the peripheral device coupled to the bus 108 include a hard disk drive (HDD) 103, a graphic processor 104, an input interface 105, an optical drive 106, and a communication interface 107.

The HDD 103 magnetically writes and reads data with respect to an internal disk. The HDD 103 is used as secondary memory of the computer 100. The program of the OS, the application program, and the various data are stored in the HDD 103. Semiconductor memory, such as flash memory, may be used as the secondary memory.

A monitor 104a is coupled to the graphic processor 104. The graphic processor 104 causes an image to be displayed on a screen of the monitor 104a in accordance with a command from the CPU 101. Examples of the monitor 104a include a display using a cathode ray tube (CRT) and a liquid crystal display.

A keyboard 105a and a mouse 105b are coupled to the input interface 105. The input interface 105 transmits a signal sent from the keyboard 105a or the mouse 105b to the CPU 101. The mouse 105b is an example of a pointing device and another pointing device may be used. Examples of another pointing device include a touch panel, a tablet, a touch pad, and a trackball.

The optical drive 106 reads data recorded on an optical disc 106a using laser light or the like. The optical disc 106a is a portable recording medium in which data is recorded so as to be readable through reflection of light. Examples of the optical disc 106a include a digital versatile disc (DVD), a DVD-RAM, a compact disc read-only memory (CD-ROM), a compact disc-recordable (CD-R), and a compact disc-rewritable (CD-RW).

The communication interface 107 is coupled to a network 110. The communication interface 107 transmits data to or receives data from another computer or a communication device via the network 110.

According to the above-described hardware configuration, the processing functions of the present embodiment may be implemented. When the processing functions of the present embodiment are implemented using a computer, a program in which the processing contents of functions that the information processing unit 1 has are described is provided.

The above-described processing functions are implemented on a computer by causing the computer to execute the program. The program in which the processing functions are described may be recorded in a computer-readable recording medium. Examples of the computer-readable recording medium include a magnetic storage device, an optical disc, a magneto-optical recording medium, and a semiconductor memory. Examples of the magnetic storage device include an HDD, a flexible disk (FD), and a magnetic tape. Examples of the optical disc include a DVD, a DVD-RAM, a CD-ROM, and a CD-RW. Examples of the magneto-optical recording medium include a magneto-optical disc (MO). Examples of the recording medium that records the program do not include a temporary propagation signal itself.

When distributing the program, for example, a portable recording medium, such as a DVD or a CD-ROM, in which the program is recorded is sold. Also, the program may be stored in memory of the server computer and then transferred via a network from a server computer to another computer.

For example, the computer that executes the program stores the program recorded in a portable recording medium or the program transferred from the server computer in its own memory. After that, the computer reads the program from the memory and executes a process according to the program. The computer may also read the program directly from the portable recording medium and execute a process according to the program. Further, every time a program is transferred from the server computer, the computer may also execute processes according to the received programs, one by one.

Further, at least part of the above-described processing functions may be implemented using an electronic circuit, such as a digital signal processor (DSP), an application specific integrated circuit (ASIC), or a programmable logic device (PLD).

As described above, the present techniques may realize file sharing for a meeting while an appropriate access restriction is set. Specifically, access by a user outside a meeting room may be avoided and a meeting material may be shared only by users in the meeting room. Further, some work, such as preparing an attendee list of a meeting or a folder for which access control is set based on the starting time and the ending time in advance, may be omitted so as to increase convenience.

Although the embodiment of the present application is described above as an example, the configuration of each part mentioned in the embodiment may be replaced with other elements that have similar functions. Further, other optional constituents or processes may be added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
   a memory; and
   a processor, configured to execute a program stored in the memory to cause the processor to:
   determine a location in which a terminal is located, and
   create a folder to which access authority is given to the terminal, the folder being associated with the location.

2. The information processing apparatus according to claim 1, wherein the processor is configured to:
   determine whether a folder is associated with a location to which the terminal has moved based on a correspondence relation between a location and a folder, and
   create a folder associated with the location to which the terminal has moved when the folder is not associated with the location to which the terminal has moved.

3. The information processing apparatus according to claim 1, wherein the processor is configured to:
   determine whether another terminal is associated with a location from which the terminal has moved based on a correspondence relation between a location and a terminal, and
   delete a folder associated with the location from which the terminal has moved when the other terminal is not associated with the location from which the terminal has moved.

4. The information processing apparatus according to claim 1, wherein the processor is configured to:

determine whether to create the folder based on a type of a location to which the terminal has moved.

5. The information processing apparatus according to claim 1, wherein the processor is configured to:
determine a combined location including a plurality of locations in which a plurality of terminals are located, and
create a folder to which access authority is given to the terminals in the combined location.

6. The information processing apparatus according to claim 1, wherein the processor is configured to:
calculate a coordinate of the terminal when the terminal has transmitted distance information, and
create a folder to which access authority is given to the terminal and another terminal in a given distance range around the coordinate of the terminal, the given distance range being corresponding to the distance information.

7. The information processing apparatus according to claim 1, wherein the processor is configured to:
calculate a distance between a terminal and another terminal based on a location of the terminal and another location of the other terminal, and
create a folder to which access authority is given to the terminal and the other terminal when the distance is within a given distance.

8. The information processing apparatus according to claim 1, wherein the processor is configured to:
determine a logical location specified by a terminal, and
create a folder to which access authority is given to the terminal in the logical location.

9. The information processing apparatus according to claim 8, wherein the processor is configured to:
create a list of a terminal checking in the logical location, and
transmit the list to the terminal.

10. The information processing apparatus according to claim 1, wherein the processor is configured to:
request a terminal in a first location to lend access authority associated with the first location, and
give the access authority to another terminal in a second location when the terminal accepts to lend the access authority.

11. The information processing apparatus according to claim 1, wherein the processor is configured to:
determine a folder associated with a first location upon receiving a move request transmitted from the terminal in the first location, and
change a location to be associated with the folder from the first location to a second location upon receiving a move cancel request transmitted from the terminal after the terminal has moved to the second location.

12. The information processing apparatus according to claim 1, wherein the processor is configured to:
determine a folder associated a first location upon receiving a copy request transmitted from the terminal in the first location, and
associate a second location with the folder upon receiving a copy cancel request transmitted from the terminal after the terminal has moved to the second location.

13. The information processing apparatus according to claim 1, wherein the processor is configured to:
reserve creation of a folder associated with a location when the location is specified by the terminal, and
copy a file stored in a local folder of the terminal into the folder associated with the location upon recognizing that the terminal has entered the location.

14. The information processing apparatus according to claim 1, wherein the processor is configured to:
set identifiers different from each other to folders which are associated with the location.

15. The information processing apparatus according to claim 14, wherein the processor is configured to:
set identifiers different for each meeting held in the location to the folders which are associated with the location.

16. The information processing apparatus according to claim 15, wherein the processor is configured to:
record, in a list, a location in which a first meeting has ended and a second meeting subsequent to the first meeting is not started, and
create a folder associated with the location to which the terminal has moved and delete, from the list, the location to which the terminal has moved when the location to which the terminal has moved is recorded in the list and a folder is not associated with the location to which the terminal has moved.

17. The information processing apparatus according to claim 16, wherein the processor is configured to:
determine whether another terminal is associated with a location from which the terminal has moved based on a correspondence relation between a location and a terminal, and
record, in the list, the location from which the terminal has moved when the other terminal is not associated with the location from which the terminal has moved and the location from which the terminal has moved is not recorded in the list.

18. A control method of an information processing apparatus, the control method comprising:
determining a location in which a terminal is located; and
creating, using a processor, a folder to which access authority is given to the terminal, the folder being associated with the location.

19. A non-transitory medium that stores a control program of an information processing apparatus, the control program causing the information processing apparatus to execute a procedure, the procedure comprising:
determining a location in which a terminal is located, and
creating a folder to which access authority is given to the terminal, the folder being associated with the location.

* * * * *